(12) United States Patent
Ware et al.

(10) Patent No.: US 11,201,002 B2
(45) Date of Patent: Dec. 14, 2021

(54) MOVABLE PLUG EXTENSION-CABLE SYSTEM AND METHODS THEREOF

(71) Applicants: Joshua Taylor Ware, Cumming, GA (US); Michael Selimo, Cumming, GA (US)

(72) Inventors: Joshua Taylor Ware, Cumming, GA (US); Michael Selimo, Cumming, GA (US)

( * ) Notice: Subject to any disclaimer, the term of this patent is extended or adjusted under 35 U.S.C. 154(b) by 136 days.

(21) Appl. No.: 16/533,478

(22) Filed: Aug. 6, 2019

(65) Prior Publication Data

US 2020/0051711 A1 Feb. 13, 2020

Related U.S. Application Data

(60) Provisional application No. 62/715,870, filed on Aug. 8, 2018, provisional application No. 62/777,458, filed on Dec. 10, 2018, provisional application No. 62/810,576, filed on Feb. 26, 2019.

(51) Int. Cl.
*H01B 9/00* (2006.01)
*H01B 13/008* (2006.01)
*G06F 1/26* (2006.01)

(52) U.S. Cl.
CPC ............ *H01B 9/003* (2013.01); *H01B 9/006* (2013.01); *H01B 13/008* (2013.01); *G06F 1/266* (2013.01); *H04B 2203/5454* (2013.01)

(58) Field of Classification Search
CPC ...... H01B 9/003; H01B 9/006; H01B 13/008; H01R 31/06; H01R 41/00; H01R 9/031; H01R 9/03; H01R 9/26; H01R 25/0036; H01R 25/142; H01R 25/006; H01R 25/14; H01R 25/145; H01R 25/16; H01R 25/161; H01R 25/162; H01R 13/26; H01R 13/22; H01R 24/76
See application file for complete search history.

(56) References Cited

U.S. PATENT DOCUMENTS

| | | | | |
|---|---|---|---|---|
| 2,042,105 A | * | 5/1936 | Kelley | H01R 25/14 191/23 R |
| 2,348,665 A | * | 5/1944 | Von Gehr | H01R 25/14 439/120 |
| 3,089,042 A | * | 5/1963 | Hickey | H01R 25/14 307/147 |
| 5,052,937 A | * | 10/1991 | Glen | H01R 25/14 439/120 |
| 5,306,165 A | * | 4/1994 | Nadeau | H01R 25/14 439/115 |

(Continued)

*Primary Examiner* — Hoa C Nguyen
*Assistant Examiner* — Amol H Patel
(74) *Attorney, Agent, or Firm* — Meunier Carlin & Curfman LLC

(57) ABSTRACT

The exemplified systems and methods provide an extension cord system having a cord that is configured to slidably guide a movable plug carriage having conventional plug receptacle. In some embodiments, the movable plug carriage is configured with pierce-able conductors that can be inserted and retracted from a sealed skin of the cord. In other embodiments, the sealed skin can be fastened and unfastened by the movable plug carriage as the movable plug carriage moves over the cord. In yet other embodiments, the movable plug carriage is attachable and detachable from the cord.

19 Claims, 36 Drawing Sheets

(56) References Cited

U.S. PATENT DOCUMENTS

| | | | | |
|---|---|---|---|---|
| 5,603,621 | A * | 2/1997 | Elmouchi | H01R 13/443 439/119 |
| 7,094,077 | B1 * | 8/2006 | Chen | H01R 25/142 439/118 |
| 7,661,966 | B2 * | 2/2010 | Ohanesian | H01R 25/142 439/120 |
| 8,430,679 | B1 * | 4/2013 | Long | H01R 25/003 439/118 |
| 9,608,392 | B1 * | 3/2017 | Destro | H01R 25/145 |
| 2005/0215093 | A1 * | 9/2005 | Jong | H01R 25/14 439/110 |
| 2006/0209531 | A1 * | 9/2006 | Tiesler | H01R 25/14 362/95 |
| 2007/0181325 | A1 * | 8/2007 | Liao | H02H 11/001 174/34 |
| 2007/0218720 | A1 * | 9/2007 | Jong | H01R 25/14 439/120 |
| 2019/0237922 | A1 * | 8/2019 | Zhu | H01R 13/506 |

* cited by examiner

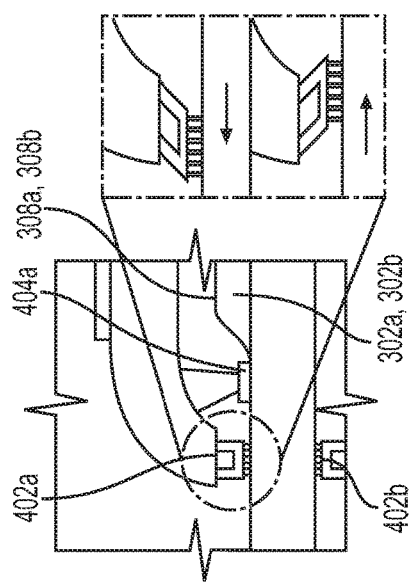
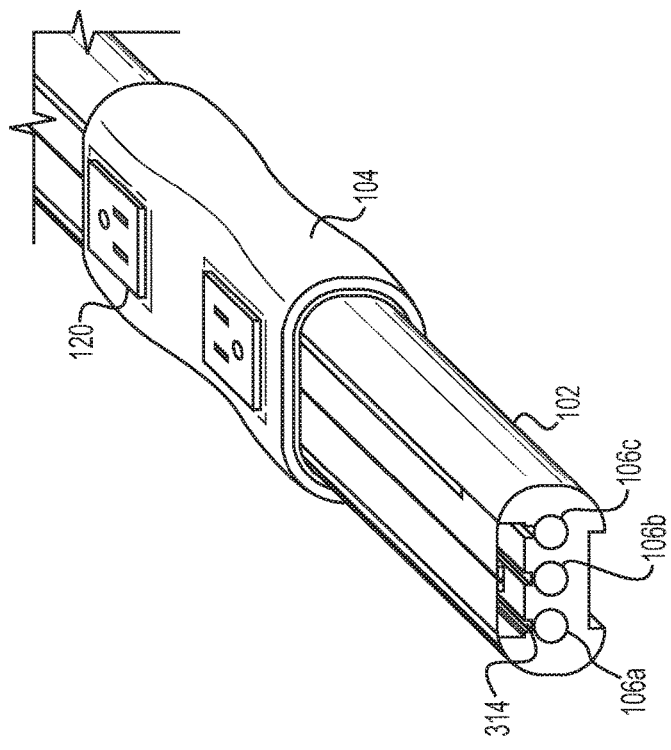
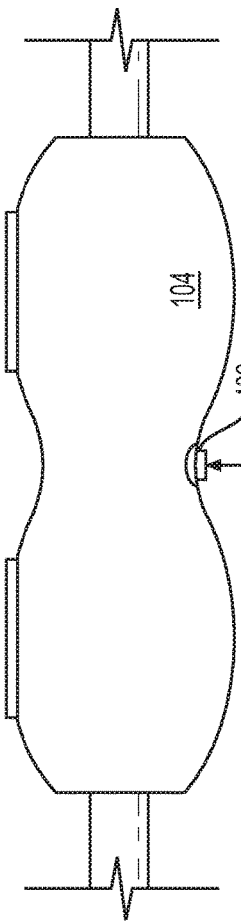
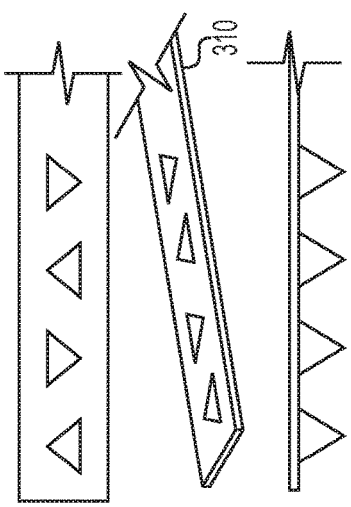

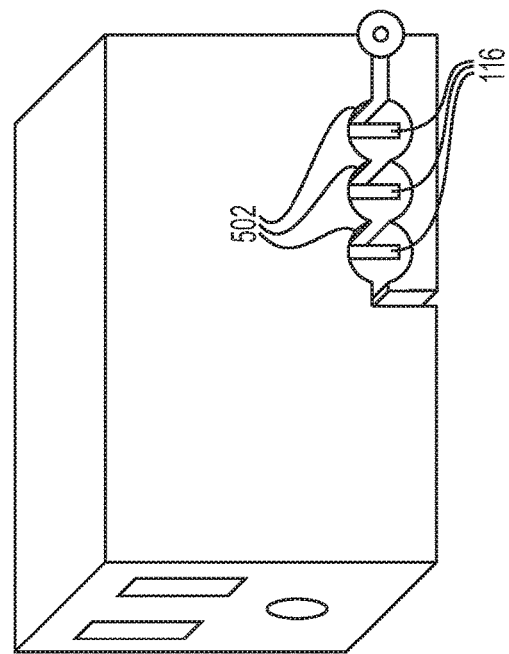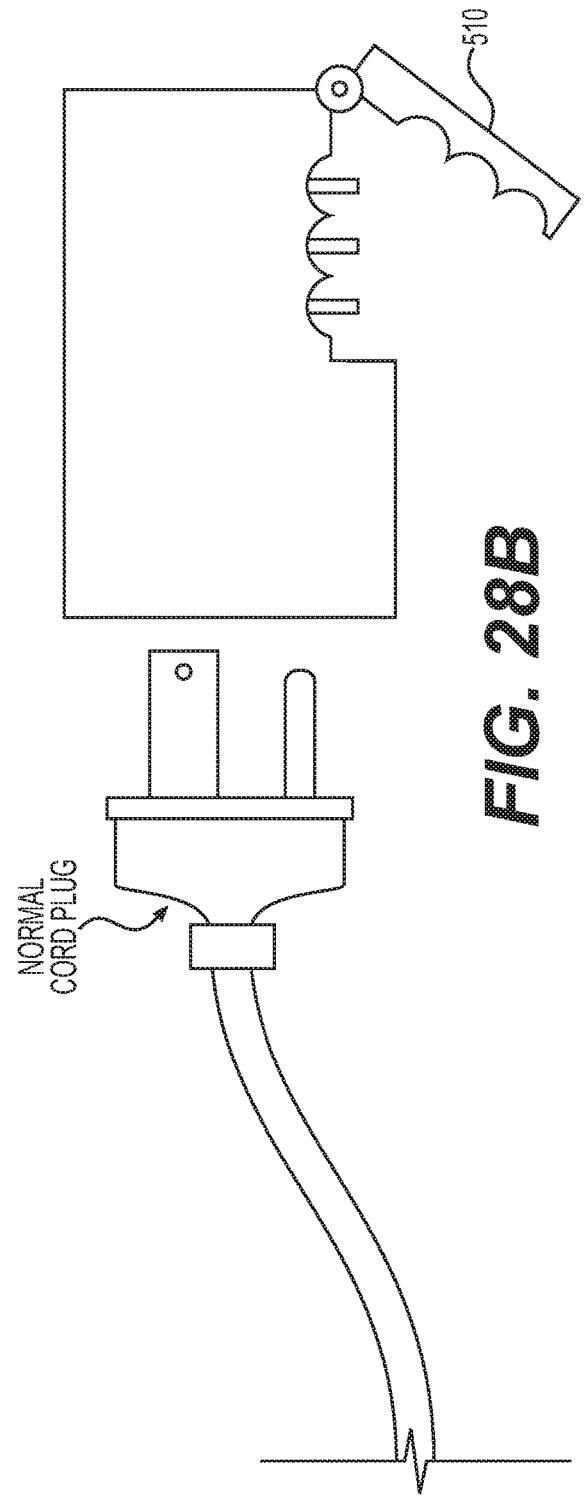

MOVABLE PLUG EXTENSION-CABLE SYSTEM AND METHODS THEREOF

RELATED APPLICATION

This application claims priority to, and the benefit of, U.S. Provisional Application No. 62/715,870, filed Aug. 8, 2018, entitled "Removable-Reattachable-Plug Extension-Cable System and Methods thereof"; U.S. Provisional Application No. 62/777,458, filed Dec. 10, 2018, entitled "Removable-Reattachable-Plug Extension-Cable System and Methods thereof"; and U.S. Provisional Application No. 62/810,576, filed Feb. 26, 2019, entitled "Slidable-Plug Extension-Cable System and Methods thereof," each of which is incorporated by reference herein in its entirety.

BACKGROUND

An extension cord is a length of flexible electrical power cable with a plug on one end and one or more sockets on the other end, which is usually of the same type as the plug. Extension cords are also referred to as power extenders, drop cords, or extension leads. Although extension cords are ubiquitous in construction sites, offices, factories, and throughout residential dwellings, and although there are numerous designs for the cable and plug, the overall design of the extension cords has not changed since their inception.

There is still a need to improve the functionality and design of extension cords.

SUMMARY

The exemplified systems and methods provide a movable extension cord system configured to guide a movable plug carriage having conventional plug receptacle (e.g., AC power, DC power, lighting, etc.) along positions on an accessible cord in a safe and re-useable manner. The exemplified cord is designed to be efficiency manufactured for any length cable (typically 2-300 feet) while providing a mechanism for the slidable plugs to move along any pre-defined sections of the cord and to establish firm electrical contact with inner conductors of the cable such that it could carry the rated current load of the cord. Typical loads for cords certified for sale and use in the United States often range between 10 Amps and 15 Amps for 16- to 10-gauge conductor wires. In addition to AC load, the exemplified systems and methods can use with, or additionally include to AC loads connectivity, DC load connectivity (e.g., via USB or firewire connectivity). The exemplified cord may be configured with a sealed conductor to allow for one or more piercing element(s) located in the slidable plugs to be inserted and retracted through the cord to establish and de-established electrical contact with the conductors of the cord. The term "movable" refers to the accessibility of the cord (e.g., for AC power, DC power, lighting, etc.) being repositionable from one place or position to another. In some embodiments, the access is move by sliding the connector along the wire. In other embodiments, the access is moved by detachable a portion of the system from the cable and reattaching it to the cable at a different location or position.

In another exemplary embodiment, the exemplified systems and methods provide an extension cord system having a specifically-designed extension cord that is configured to sealably guide a movable plug carriage having conventional plug receptacle in a safe and re-useable manner. The exemplified extension cord is designed to be efficiency manufactured for any length cable (typically 2-300 feet) while providing a mechanism for the slidable plugs to move along pre-defined sections of the extension cord and to establish firm electrical contact with inner conductors of the cable such that it could carry the rated current load of the cord.

In yet another exemplary embodiment, the exemplified systems and methods provide an extension cord system having a specifically-designed extension cord that is configured to mate with a removeable plugs in a safe and useable manner. The exemplified extension cord is designed to be efficiency manufactured for any length cable (typically 2-300 feet) while providing a mechanism for the removeable plugs to extend through the isolator cover of the extension cord and to establish firm electrical contact with inner conductors of the cable such that it could carry the rated current load of the cord.

Indeed, the exemplified extension cord system facilitates the ad-hoc placement of the slidable plug carriage along the length of the extension cord to flexibly introduce access to electrical power along the length of the extension cord without have to, for example, run additional extension cord or to move an already laid-out extension cord. In some embodiments, the slidable plug carriage provides lights and/or USB access.

In an aspect, a system is disclosed (e.g., a movable receptacle plug extension-cable system) comprising: a flexible elongated member (e.g., extension cord) comprising a plurality of electrical conductors (e.g., configured to carry residential and commercial electrical loads, 1-phase, 3-phase, etc.) surrounded by a non-conductive encapsulation, wherein each of the plurality of electrical conductors extends between a first end and a second end defining the flexible elongated member, wherein at least one of the first end or the second end terminates with a standardized electrical plug; and a receptacle plug carrier having a housing and a standardized electrical receptacle (e.g., for 240 VAC, 120 VAC and USB (DC)) configured to receive an electrical plug, the housing having a longitudinal axis that extends over a portion of the flexible elongated member, the receptacle plug carrier being configured to slidably move between the third end and the fourth end of the of the flexible elongated member.

In some embodiments, the non-conductive encapsulation comprises a set of fastening members (e.g., wherein the set of fastening members form a zipper, a set of sealable strips, or wherein each of the fastening member comprises a hook and loop unit) configured as a strip that extends between a third end and a fourth end over a portion of the flexible elongated member (e.g., at least 25% the length of the non-conductive encapsulation), wherein each fastening member of the set of fastening members is transitionable from a fastened state to an unfastened state and from the unfastened state to the fastened state, and wherein the receptacle plug carrier comprises a first fastening element and a second fastening element disposed in the housing, wherein each of the first fastening element and the second fastening element is coupled to a portion of the set of fastening members at a first position and a second position having a length there between, wherein the length between the first position and second position defines a region in the flexible elongated member at which conductors of the flexible elongated member are accessible to conductors of the standardized electrical receptacle.

In some embodiments, the first fastening element is configured, when traveling in a first direction, to unfasten a fastening member of the set of fastening member located at the first position, and to fasten the fastening member of the first position when traveling in a second direction.

In some embodiments, the second fastening element is configured, when traveling in the first direction, to fasten a fastening member of the set of fastening member located at the second position, and to unfasten the fastening member of the second position when traveling in the second direction.

In some embodiments, the housing of the receptacle plug carrier comprises a region having indentations or protrusions configured to be grasp by a hand.

In some embodiments, the receptacle plug carrier is fixed to the flexible elongated member so as to move only between the third end and the fourth end, and wherein the receptacle plug carrier is not removable from the flexible elongated member.

In some embodiments, the set of fastening members, collectively, form a zipper strip.

In some embodiments, the set of fastening members, collectively, form a strip of hook and loops (Velcro).

In some embodiments, the flexible elongated member comprises a second set of fastening members configured as a second strip that extends between a fifth end and a sixth end over another portion of the flexible elongated member (e.g., at least 25% the length of the non-conductive encapsulation), wherein each fastening member of the second set of fastening members is transitionable from a fastened state to an unfastened state and from the unfastened state to the fastened state, the system further comprising: a second receptacle plug carrier (e.g., on its own individual rail) having a housing and a standardized electrical receptacle configured to receive an electrical plug, the housing having a longitudinal axis that extends over a portion of the flexible elongated member, the second receptacle plug carrier being configured to slidably move between the fifth end and the sixth end of the of the flexible elongated member.

In some embodiments, the receptacle plug carrier comprises a pierceable element configured to be inserted through the non-conductive encapsulation to make electrical contact with the plurality of electrical conductors.

In some embodiments, the pierceable element of the receptacle plug carrier is coupled to a linear actuator located in the receptacle plug carrier.

In some embodiments, the linear actuator is actuated by linear displacement.

In some embodiments, the linear actuator is actuated by a rotational screwing displacement.

In some embodiments, the linear actuator is actuated a rotational displacement around one or more hinge-able member.

In some embodiments, the non-conductive encapsulation comprises a first layer formed of a water-proof material.

In some embodiments, the non-conductive encapsulation comprises a second layer having intertwining to form a braided cable.

In some embodiments, the system further comprises: a second receptacle plug carrier (e.g., on a shared rail) having a housing and a standardized electrical receptacle configured to receive an electrical plug, the housing having a longitudinal axis that extends over a portion of the flexible elongated member, the second receptacle plug carrier being configured to slidably move between the third end and the fourth end of the of the flexible elongated member.

In some embodiments, the plurality of electrical conductors are rated for residential electrical loads (e.g., 1-phase or 3 phase).

In some embodiments, the plurality of electrical conductors are rated for commercial electrical loads, 3-phase.

In some embodiments, the receptacle plug carrier further comprises a brake, the brake being configured to fixably lock the receptacle plug carrier to a position on the flexible elongated member when engaged.

In some embodiments, the brake is configured to fixably unlock the receptacle plug carrier from the position on the flexible elongated member when disengaged.

In some embodiments, the receptacle plug carrier further comprises a brake, the brake being configured to engage the conductors of the receptacle plug carrier to the conductors of the receptacle plug carrier when the brake is engaged.

In some embodiments, the brake is configured to disengage the conductors of the receptacle plug carrier from the conductors of the receptacle plug carrier when the brake is disengaged.

In some embodiments, the plurality of electrical conductors of the flexible elongated member is selected from the group consisting of 1 conductor, 2 conductors, 3 conductors, and 4 conductors.

In some embodiments, the receptacle plug carrier further comprises a motor and wheel assembly disposed in the housing, wherein the motor and wheel assembly is configured to rotate a wheel of the assembly that slidably moves the receptacle plug carrier over the flexible elongated member (e.g., in the first direction or the second direction).

In some embodiments, the plurality of conductors comprise two or more conductors, and wherein the non-conductive encapsulation has a substantially uniform cross-sectional profile that axially extend over the portion of the flexible elongated member.

In some embodiments, the first end terminates at a first connector having a first standardized electrical receptacle and the second end terminates at one or more second connectors each having a second standardized electrical receptacle, wherein the first standardized electrical receptacle is male, and the second standardized electrical receptacle is female.

In some embodiments, the system further comprises: a limit switch located within, or near, the first connector, wherein the limit switch is coupled to the plurality of electrical conductors and is configured to interrupt electrical conduction when current flow across one or more electrical conductor of the plurality of conductors exceeds a predefined current limit.

In some embodiments, the limit switch is located in receptacle plug carrier

In some embodiments, the limit switch is located as part of the flexible elongated member.

In some embodiments, the one or more second non-conductive encapsulations is made of a water-proof material.

In some embodiments, the one or more second non-conductive encapsulations comprises a hydro-phobic material.

In some embodiments, the one or more second non-conductive encapsulations is located external to the non-conductive encapsulation.

In some embodiments, the one or more second non-conductive encapsulations is located under the non-conductive encapsulation in the flexible elongated member.

In some embodiments, the receptacle plug carrier comprises seals at openings defined therein so form a sealed receptacle plug carrier.

In some embodiments, the receptacle plug carrier comprises a rotatable conduction and guiding members that contacts one or more of the plurality of electrical conductors to provide electrical connection to the standardized electrical plug.

In another aspect, a system (e.g., a movable receptacle plug extension-cable system) is disclosed comprising a flexible elongated member (e.g., extension cord) comprising a plurality of electrical conductors (e.g., configured to carry residential and commercial electrical loads, 1-phase, 3-phase, etc.) surrounded by a non-conductive encapsulation, wherein each of the plurality of electrical conductors extends between a first end and a second end defining the flexible elongated member, wherein at least one of the first end or the second end terminates with a standardized electrical plug, and wherein the non-conductive encapsulation comprises a set of fastening members (e.g., wherein the set of fastening members form a zipper, a set of resealable strips, or wherein each of the fastening member comprises a hook and loop unit) configured as a strip that extends between a third end and a fourth end over a portion of the flexible elongated member (e.g., at least 25% the length of the non-conductive encapsulation), wherein each fastening member of the set of fastening members is transitionable from a fastened state to an unfastened state and from the unfastened state to the fastened state. The system further includes a receptacle plug carrier having a housing and a standardized electrical receptacle (240 VAC, 120 VAC and USB (DC)) configured to receive an electrical plug (or data cable), the housing having a longitudinal axis that extends over a portion of the flexible elongated member, the receptacle plug carrier being configured to slidably move between the third end and the fourth end of the of the flexible elongated member. Other electrical standards may be used that is directed to a given electrical voltage and frequency.

In some embodiments, the receptacle plug carrier comprises a first fastening element and a second fastening element disposed in the housing, wherein each of the first fastening element and the second fastening element is coupled to a portion of the set of fastening members at a first position and a second position having a length there between, wherein the length between the first position and second position defines a region in the flexible elongated member at which conductors of the flexible elongated member are accessible to conductors of the standardized electrical receptacle.

In some embodiments, the first fastening element is configured, when traveling in a first direction, to unfasten a fastening member of the set of fastening member located at the first position, and to fasten the fastening member of the first position when traveling in a second direction.

In some embodiments, the second fastening element is configured, when traveling in the first direction, to fasten a fastening member of the set of fastening member located at the second position, and to unfasten the fastening member of the second position when traveling in the second direction.

In some embodiments, the housing of the receptacle plug carrier comprises a region having indentations or protrusions configured to be grasp by a hand.

In some embodiments, the receptacle plug carrier is fixed to the flexible elongated member so as to move only between the third end and the fourth end, and wherein the receptacle plug carrier is not removable from the flexible elongated member.

In some embodiments, the set of fastening members, collectively, form a resealable strip (e.g., a Zipper strip).

In some embodiments, the set of fastening members, collectively, form a strip of hook and loops (Velcro).

In some embodiments, the flexible elongated member comprises a second set of fastening members configured as a second strip that extends between a fifth end and a sixth end over another portion of the flexible elongated member (e.g., at least 25% the length of the non-conductive encapsulation), wherein each fastening member of the second set of fastening members is transitionable from a fastened state to an unfastened state and from the unfastened state to the fastened state, the system further comprising: a second receptacle plug carrier (e.g., on its own individual rail) having a housing and a standardized electrical receptacle configured to receive an electrical plug, the housing having a longitudinal axis that extends over a portion of the flexible elongated member, the second receptacle plug carrier being configured to slidably move between the fifth end and the sixth end of the of the flexible elongated member (e.g., in a non-overlapping manner).

In some embodiments, the system further comprises a second receptacle plug carrier (e.g., on a shared rail) having a housing and a standardized electrical receptacle configured to receive an electrical plug, the housing having a longitudinal axis that extends over a portion of the flexible elongated member, the second receptacle plug carrier being configured to slidably move between the third end and the fourth end of the of the flexible elongated member.

In some embodiments, the plurality of electrical conductors are rated for residential electrical loads, 1-phase.

In some embodiments, the plurality of electrical conductors are rated for residential electrical loads, 3-phase.

In some embodiments, the plurality of electrical conductors are rated for commercial electrical loads, 3-phase.

In some embodiments, the receptacle plug carrier further comprises a brake, the brake being configured to fixably lock the receptacle plug carrier to a position on the flexible elongated member when engaged.

In some embodiments, the brake is configured to fixably unlock the receptacle plug carrier from the position on the flexible elongated member when disengaged.

In some embodiments, the receptacle plug carrier further comprises a brake, the brake being configured to engage the conductors of the receptacle plug carrier to the conductors of the receptacle plug carrier when the brake is engaged.

In some embodiments, the brake is configured to disengage the conductors of the receptacle plug carrier from the conductors of the receptacle plug carrier when the brake is disengaged.

In some embodiments, the plurality of electrical conductors of the flexible elongated member is selected from the group consisting of 1 conductor, 2 conductors, 3 conductors, and 4 conductors.

In some embodiments, the receptacle plug carrier further comprises a motor and wheel assembly disposed in the housing, wherein the motor and wheel assembly is configured to rotate a wheel of the assembly that slidably moves the receptacle plug carrier over the flexible elongated member (e.g., in the first direction or the second direction).

In some embodiments, the plurality of conductors comprise two or more conductors, and wherein the non-conductive encapsulation has a substantially uniform cross-sectional profile that axially extend over the portion of the flexible elongated member.

In some embodiments, the first end terminates at a first connector having a first standardized electrical receptacle and the second end terminates at one or more second connectors each having a second standardized electrical receptacle, wherein the first standardized electrical receptacle is male and the second standardized electrical receptacle is female. In some embodiments, the first connector comprises USB connector and DC power circuitry.

In some embodiments, the system further includes a limit switch located within, or near, the first connector, wherein the limit switch is coupled to the plurality of electrical conductors and is configured to interrupt electrical conduction when current flow across one or more electrical conductor of the plurality of conductors exceeds a pre-defined current limit.

In some embodiments, the limit switch is located in receptacle plug carrier

In some embodiments, the limit switch is located as part of the flexible elongated member.

In some embodiments, the set of fastening members substantially extends a length selected from the group consisting of about 5 percent of the flexible elongated member, about 10 percent of the flexible elongated member, about 20 percent of the flexible elongated member, about 30 percent of the flexible elongated member, about 40 percent of the flexible elongated member, about 50 percent of the flexible elongated member, about 60 percent of the flexible elongated member, about 70 percent of the flexible elongated member, about 80 percent of the flexible elongated member, about 90 percent of the flexible elongated member, and more than 95 percent of the flexible elongated member.

In some embodiments, the flexible elongated member further includes one or more second non-conductive encapsulation, wherein the second non-conductive encapsulation comprises a second set of fastening members (e.g., wherein the set of fastening members form a zipper, a set of sealable strips, or wherein each of the fastening member comprises a hook and loop unit) configured as a strip that extends between the third end and the fourth end over a portion of the flexible elongated member, wherein each second fastening member of the second set of fastening members is transitionable from a fastened state to an unfastened state and from the unfastened state to the fastened state.

In some embodiments, the one or more second non-conductive encapsulations is made of a water-proof material.

In some embodiments, the one or more second non-conductive encapsulations comprises a hydro-phobic material.

In some embodiments, the one or more second non-conductive encapsulations is located external to the non-conductive encapsulation.

In some embodiments, the one or more second non-conductive encapsulations is located under the non-conductive encapsulation in the flexible elongated member.

In some embodiments, the receptacle plug carrier comprises seals at openings defined therein so form a sealed receptacle plug carrier.

In another aspect, an apparatus (e.g., a cable member of a removable-reattachable-plug extension-cable system) is disclosed. The apparatus comprises a flexible elongated member comprising a plurality of electrical conductors (e.g., configured to carry residential and commercial electrical loads, 1-phase, 3-phase, etc.) surrounded by a non-conductive encapsulation, wherein each of the plurality of electrical conductors extends between a first end and a second end defining the flexible elongated member, wherein the non-conductive encapsulation comprises one or more openings (e.g., slotted opening) that extends between a third end and a fourth end defined over a portion of the flexible elongated member, wherein the one or more openings define access points along the portion of the flexible elongated member for coupling of an electrically-conductive coupling element of a removable-reattachable plug connector having a housing and a standardized electrical receptacle. The apparatus further comprises a plurality of retaining members located within the flexible elongated member between the one or more openings and an associated electrical conductor of the plurality of electrical conductors, wherein the plurality of retaining members is non-conductive and substantially extends (e.g., continuous or non-continuously extend along) between the first end and the second end of the flexible elongated member.

In some embodiments, each of the plurality of retaining members substantially extends between the first end and the second end of the flexible elongated member.

In some embodiments, each of the plurality of retaining members forms an internal wire within the flexible elongated member, wherein the each of the plurality of retaining members comprises a pierce-able material through which the electrically-conductive coupling element of the removable-reattachable plug connector pierces to establish electrical contact with a conductor of the plurality of conductor.

In some embodiments, the plurality of conductors comprise two or more conductors, and wherein the non-conductive encapsulation has a substantially uniform cross-sectional profile that axially extend over the portion of the flexible elongated member.

In some embodiments, the cross-sectional profile of the flexible elongated member defines a first externally protruding surface, a second externally protruding surface, and a notch defined therebetween (e.g., wherein the first externally protruding surface, the second externally protruding surface, and the notch facilitates an align-able coupling of the removable-reattachable plug connector to the flexible elongated member).

In some embodiments, the first end terminates at a first connector having a first standardized electrical receptacle and the second end terminates at one or more second connectors each having a second standardized electrical receptacle, wherein the first standardized electrical receptacle is male, and the second standardized electrical receptacle is female.

In some embodiments, the apparatus further includes a limit switch located within, or near, the first connector, wherein the limit switch is coupled to the plurality of electrical conductors and is configured to interrupt electrical conduction when current flow across one or more electrical conductor of the plurality of conductors exceeds a pre-defined current limit.

In some embodiments, a substantial portion of the one or more openings forms a slot that extends between the third end and the fourth end.

In some embodiments, each of the plurality of retaining members substantially extends a length selected from the group consisting of about 5 percent of the flexible elongated member, about 10 percent of the flexible elongated member, about 20 percent of the flexible elongated member, about 30 percent of the flexible elongated member, about 40 percent of the flexible elongated member, about 50 percent of the flexible elongated member, about 60 percent of the flexible elongated member, about 70 percent of the flexible elongated member, about 80 percent of the flexible elongated member, about 90 percent of the flexible elongated member, and more than 95 percent of the flexible elongated member.

In another aspect, another apparatus (e.g., a slidable plug portion or a removable-reattachable-plug portion of an extension cable system) is disclosed. The apparatus includes a housing; one or more standardized electrical receptacles defined by the housing; and two or more electrically-conductive coupling elements configured to extend and to retract from a recess portion of the housing, wherein each of the two or more electrically-conductive coupling elements is configured to extend from the recess portion of the housing across, at least, a non-conductive retaining element of a flexible elongated member defining an extension cable, to contact and establish electrical contact with a corresponding conductor defined within the extension cable.

In some embodiments, the apparatus further includes an actuation element configured to move between a first position and a second position (e.g., by linear displacement, rotational screwing displacement, a rotational displacement around one or more hinge-able members), wherein the first position of the actuation element is associated with the two or more electrically-conductive coupling elements being in a retracted position, and wherein the second position of the actuation element is associated with the two or more electrically-conductive coupling elements being in an extended position.

In some embodiments, the actuation element has a surface configured to receive a thumb, and wherein the surface is moved from the first position to the second position when depressed by the thumb.

In some embodiments, the actuation element, when moved from the first position to the second position, is configured to retain-ably extend to the two or more electrically-conductive coupling elements from the retracted position to the extended position, and wherein the apparatus further comprises a releasing element configured to release the two or more electrically-conductive coupling elements from the extended position and to retract the two or more electrically-conductive elements from the extended position to the retracted position (e.g., wherein the retraction of the two or more electrically conductive elements causes the actuation element to move from the second position to the first position).

In some embodiments, the apparatus further comprising a motor mechanically linked to the actuator element, wherein the motor is configured when energized to move the actuator element between the first position and the second position.

In some embodiments, the apparatus further comprises a cable retaining member (e.g., hinge-able door or a sliding door) movably fixed to the housing, wherein the cable retaining member is configured to move between a cable retaining position and a cable inserting position, wherein in the cable retaining position, the cable retaining member contacts a surface of the flexible elongated member (e.g., to fixably retain the flexible elongated member against the recess portion of the housing).

In some embodiments, the apparatus is coupled to the extension cable and is configured to slide along the extension cable.

In another aspect, a system (a movable-plug extension-cable) is disclosed comprising: a cable member; and one or more movable-plug connectors including a first movable-plug connector that slidably couples to the cable member; wherein the first movable-plug connector comprises: a housing; one or more standardized electrical receptacles defined by the housing; and the two or more electrically-conductive coupling elements configured to extend and to retract from a recess portion of the housing, wherein each of the two or more electrically-conductive coupling elements to configured to extend from the recess portion of the housing across, at least, a non-conductive retaining element of a flexible elongated member defining an extension cable, to contact and establish electrical contact with a corresponding conductor defined within the extension cable.

In some embodiments, the one or more movable-plug connectors includes a second movable-plug connector, wherein the second movable-plug connector comprises: a housing; one or more standardized electrical receptacles defined by the housing; and two or more electrically-conductive coupling elements configured to extend and to retract from a recess portion of the housing, wherein each of the two or more electrically-conductive coupling elements to configured to extend from the recess portion of the housing across, at least, a non-conductive retaining element of a flexible elongated member defining an extension cable, to contact and establish electrical contact with a corresponding conductor defined within the extension cable.

In another aspect, a system (a removable-reattachable-plug extension-cable) is disclosed. The system comprises a cable member; and one or more removable-reattachable-plug connectors including a first removable-reattachable-plug connector that re-attachably and removably couples to the cable member. The cable member includes a flexible elongated member comprising a plurality of electrical conductors (e.g., configured to carry residential and commercial electrical loads, 1-phase, 3-phase, etc.) encapsulated by a non-conductive membrane, wherein each of the plurality of electrical conductors extends between a first end and a second end defining the flexible elongated member, wherein the non-conductive membrane comprises one or more openings (e.g., slotted opening) that extends between a third end and a fourth end defined over a portion of the flexible elongated member, wherein the one or more openings define access points along the portion of the flexible elongated member for coupling of two or more electrically-conductive coupling elements of the one or more removable-reattachable plug connectors; and a plurality of retaining members located within the flexible elongated member between the one or more openings and an associated electrical conductor of the plurality of electrical conductors, wherein the plurality of retaining members is non-conductive and substantially extends (e.g., continuous or non-continuously extend along) between the first end and the second end of the flexible elongated member. The first removable-reattachable-plug connector comprises a housing; one or more standardized electrical receptacles defined by the housing; and the two or more electrically-conductive coupling elements configured to extend and to retract from a recess portion of the housing, wherein each of the two or more electrically-conductive coupling elements to configured to extend from the recess portion of the housing across, at least, a non-conductive retaining element of a flexible elongated member defining an extension cable, to contact and establish electrical contact with a corresponding conductor defined within the extension cable.

In some embodiments, the one or more removable-reattachable-plug connectors includes a second removable-reattachable-plug connector, wherein the second removable-reattachable-plug connector comprises: a housing; one or more standardized electrical receptacles defined by the housing; and two or more electrically-conductive coupling elements configured to extend and to retract from a recess portion of the housing, wherein each of the two or more electrically-conductive coupling elements to configured to extend from the recess portion of the housing across, at least, a non-conductive retaining element of a flexible elongated member defining an extension cable, to contact and establish electrical contact with a corresponding conductor defined within the extension cable.

A method is disclosed comprising: providing a cable comprising i) a flexible elongated member, the flexible elongated member comprising a plurality of electrical conductors encapsulated by one or more non-conductive membranes, wherein each of the plurality of electrical conductors extends between a first end and a second end defining the flexible elongated member (e.g., wherein the non-conductive membrane is configured to be pierceable, or wherein the non-conductive membrane comprises one or more openings (e.g., slotted opening) that extends between a third end and a fourth end defined over a portion of the flexible elongated member, wherein the one or more openings define access points along the portion of the flexible elongated member for coupling of an electrically-conductive coupling element of a removable-reattachable plug connector having a housing and a standardized electrical receptacle; and ii) a plurality of retaining members located within the flexible elongated member between the one or more openings and an associated electrical conductor of the plurality of electrical conductors, wherein the plurality of retaining members is non-conductive and substantially extends (e.g., continuous or non-continuously extend along) between the first end and the second end of the flexible elongated member); laying the cable in a work area (e.g., construction zone, garage, or any place that is not on a manufacturing machine at a manufacturing location of the cable); and positioning a movable-plug connector at a position on the cable, wherein the positioning comprises extending two or more electrically-conductive coupling elements of the movable plug connector across, at least, the one or more non-conductive membranes to contact and establish electrical contact with corresponding conductors defined within the cable.

In some embodiments, the method further includes positioning a second movable plug connector along the cable, wherein the positioning of the second movable plug connector comprises extending two or more electrically-conductive coupling elements of the second movable plug connector across, at least, the one or more non-conductive membranes of the flexible elongated member at a second position of the cable to contact and establish electrical contact with corresponding conductors defined within the cable.

In some embodiments, the method further includes retracting the movable plug connector from the cable, wherein the retraction comprises isolating the two or more electrically-conductive coupling elements of the movable plug connector from contact with the corresponding conductors defined within the cable.

In another aspect, a method is disclosed comprising providing a cable comprising i) a flexible elongated member, the flexible elongated member comprising a plurality of electrical conductors encapsulated by a non-conductive membrane, wherein each of the plurality of electrical conductors extends between a first end and a second end defining the flexible elongated member, wherein the non-conductive membrane comprises one or more openings (e.g., slotted opening) that extends between a third end and a fourth end defined over a portion of the flexible elongated member, wherein the one or more openings define access points along the portion of the flexible elongated member for coupling of an electrically-conductive coupling element of a removable-reattachable plug connector having a housing and a standardized electrical receptacle; and ii) a plurality of retaining members located within the flexible elongated member between the one or more openings and an associated electrical conductor of the plurality of electrical conductors, wherein the plurality of retaining members is non-conductive and substantially extends (e.g., continuous or non-continuously extend along) between the first end and the second end of the flexible elongated member. The method further includes the step of laying the cable in a work area (e.g., construction zone, garage, or any place that is not on a manufacturing machine at a manufacturing location of the cable). The method further includes the step of connecting the removable-reattachable plug connector to the cable at a first location along the cable, wherein the connection comprises extending two or more electrically-conductive coupling elements of the removable-reattachable plug connector across, at least, the non-conductive retaining element of the flexible elongated member to contact and establish electrical contact with corresponding conductors defined within the cable.

In some embodiments, the method includes connecting a second removable-reattachable plug connector to the cable, wherein the connection comprises extending two or more electrically-conductive coupling elements of the second removable-reattachable plug connector across, at least, the non-conductive retaining element of the flexible elongated member to contact and establish electrical contact with corresponding conductors defined within the cable.

In some embodiments, the method includes disconnecting the removable-reattachable plug connector from the cable, wherein the disconnection comprises isolating the two or more electrically-conductive coupling elements of the removable-reattachable plug connector from contact with the corresponding conductors defined within the cable.

BRIEF DESCRIPTION OF THE DRAWINGS

FIGS. 4A, 4B, 4C, and 4D shows the slidable plug connector and features therein to facilitate slidable operations of slidable plug connector, in accordance with an illustrative embodiment.

FIGS. 28A and 28B respectively show a perspective view and a side view of an example removable-reattachable-plug portion when in an open attaching position in accordance with an illustrative embodiment.

DETAILED SPECIFICATION

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the Examples included therein and to the Figures and their previous and following description.

It is understood that throughout this specification the identifiers "first", "second", "third", "fourth", "fifth", "sixth", and such, are used solely to aid in distinguishing the various components and steps of the disclosed subject matter. The identifiers "first", "second", "third", "fourth", "fifth", "sixth", and such, are not intended to imply any particular order, sequence, amount, preference, or importance to the components or steps modified by these terms.

Figure 1:
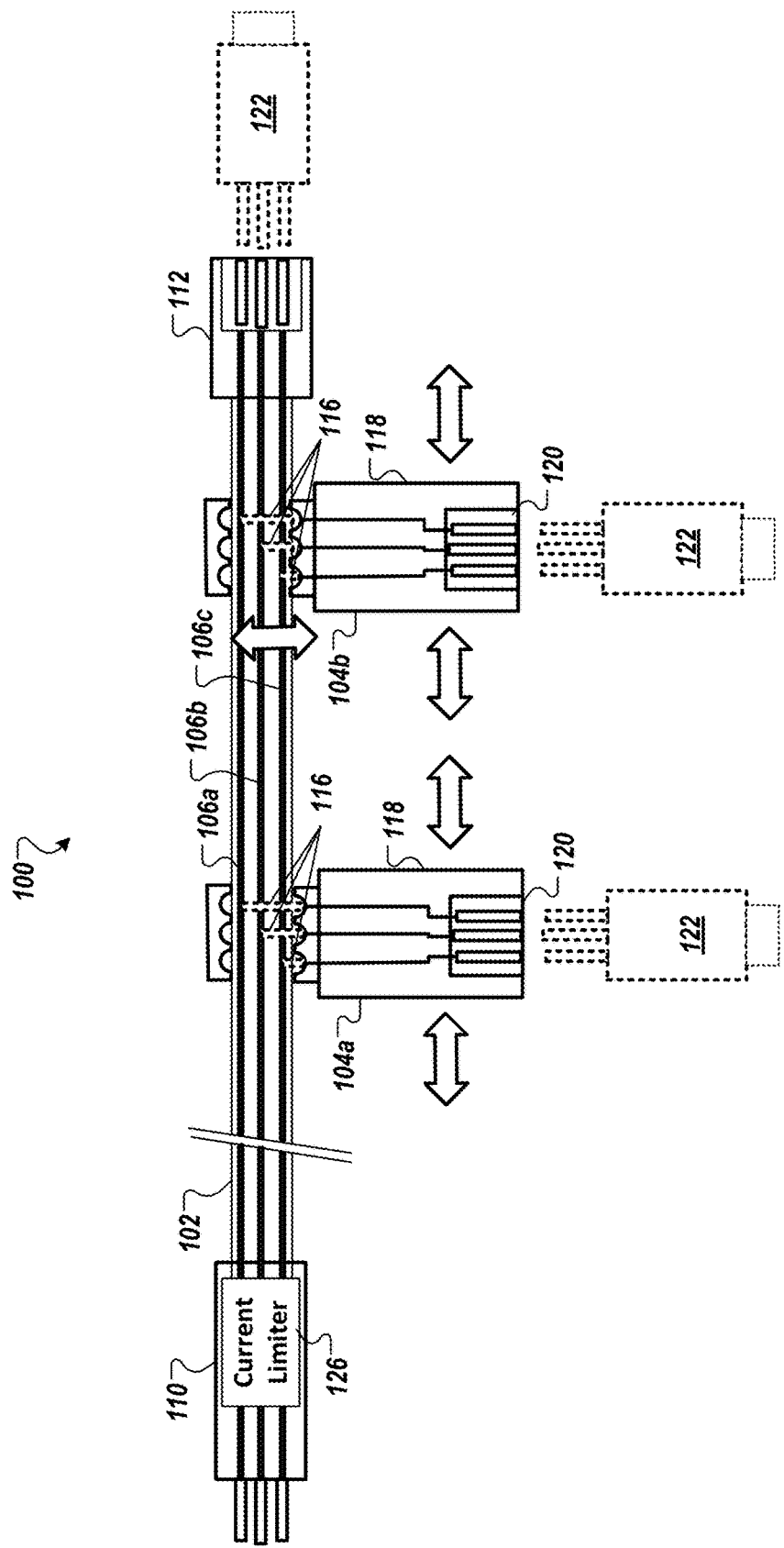
FIG. 1 is a diagram of a slidable-plug extension-cable system in accordance with an illustrative embodiment.

FIG. 1 is a diagram of a slidable-plug extension-cable system 100 in accordance with an illustrative embodiment. The extension-cable system 100 includes a cable member 102 and one or more slidable-plug portions 104 (shown as 104a and 104b) (also referred to herein as slidable plug carriage). It is contemplated that any number of slidable-plug portions 104 can be attached to the cable member 102, which can be of any standard length (e.g., between 2 feet and 300 feet, or more).

The cable member 102 has a flexible elongated structure (also referred to as a cable portion) that has a plurality of electrical conductors 106 (shown as conductor 106a, 106b, and 106c) that is encapsulated by a non-conductive layer or membrane 108. The conductors 106 are configured to carry electrical current rated for, for example, but not limited to, residential, commercial, or industrial applications, which can be direct current as well as 1-phase or 3-phase AC current, and etc. The electrical conductors 106 span the length of the cable member 102 and extend between a first connector 110 located at a first end of the cable member 102 and a second connector 112 located at a second end of the cable. As shown in FIG. 1, the first connector 110 is a male connector that is configured to be inserted into any standard electrical plug. The second connector 112 is configured as a corresponding female connector of the male connector 110 that is configured to receive a standard electrical plug. In some embodiments, the second connector 112 includes light fixture and/or USB receptacle (and, in some embodiments, corresponding AC/DC converters for a USB port).

The first connector 110 and the second connector 112 can be a two prong, a three-prong, a four-prong connector or any other standard power plug and socket.

Notably, the non-conductive membrane 108 comprises one or more openings 114 (not shown—see FIG. 7) that extend over the entire length, or a portion, of the flexible elongated member. The one or more openings 114 define points of access along the flexible elongated structure for the ad hoc slidable coupling of two or more electrically-conductive coupling elements 116 of the one or more slidable plug connectors 104.

FIG. 1 shows two slidable plug connectors 104. The slidable plug connectors 104a and 104b can be the same, for example, having the same number of sockets and socket types (as shown in FIG. 1). In some embodiments, the slidable plug connectors 104a and 104b is of the same socket types but have different number of sockets. In some embodiments, the slidable plug connectors 104a and 104b have different socket types. In some embodiments, the slidable plug connectors 104a and 104b has a female connector. In some embodiments, the slidable plug connectors 104a and 104b has a male connector. In some embodiments, the slidable plug connectors include DC power connectors (e.g., one or more USB ports). In some embodiments, the slidable plug connectors include lighting fixture (e.g., standard lighting receptacle).

As shown in FIG. 1, each of the slidable plug connectors 104a and 104b has a housing 118 and a standard electrical receptacle 120 to receive a standard plug 122 (or has a standard lighting fixture). In some embodiments, the standard electrical receptacle 120 is a two prong, a three-prong, a four-prong connector or any other standard female socket. In other embodiments, the standard electrical receptacle 120 is a two prong, a three-prong, a four-prong connector or any other standard power male plug.

As shown in FIG. 1, the cable member 102, in some embodiments, includes a limit switch 126 that is located within, or near, the first connector 110. The limit switch 126 is coupled to the plurality of electrical conductors 106 and is configured to interrupt electrical conduction when current flow across the plurality of conductors 106 exceeds a pre-defined current limit. In some embodiments, the limit switch 126 is located in the slidable plug connector 104 (not shown).

In some embodiments, the cable member 102 is configured with fasteners that can be unfastened and re-fastened by the slidable plug connectors (e.g., 104a, 104b). Indeed, in such embodiments, the slidable plug connectors is configured with fastening and unfastening mechanisms to fasten and unfasten the fasteners of the cable member. Further description is provided below.

In other embodiments, the cable member 102 is configured to be pierced by pierceable elements of the slidable plug connectors. To this end, the slidable plug connectors can move, when in an unpierced configuration (or undeployed configuration), to a desired location along the cable member and the piercing element can be deployed at such location to make electrical contact with the conductors in the cable member 102. In some embodiments, the cable member 102 is configured with two or more layers that encapsulates the inner conductors, including an inner layer configured to provide moisture/water protection and an outer layer that provide abrasion protection, e.g., from external abrasion and from the slidable plug connectors.

Example Method of Operation for Fasten-Able Slidable Plug Connectors

Figure 2:
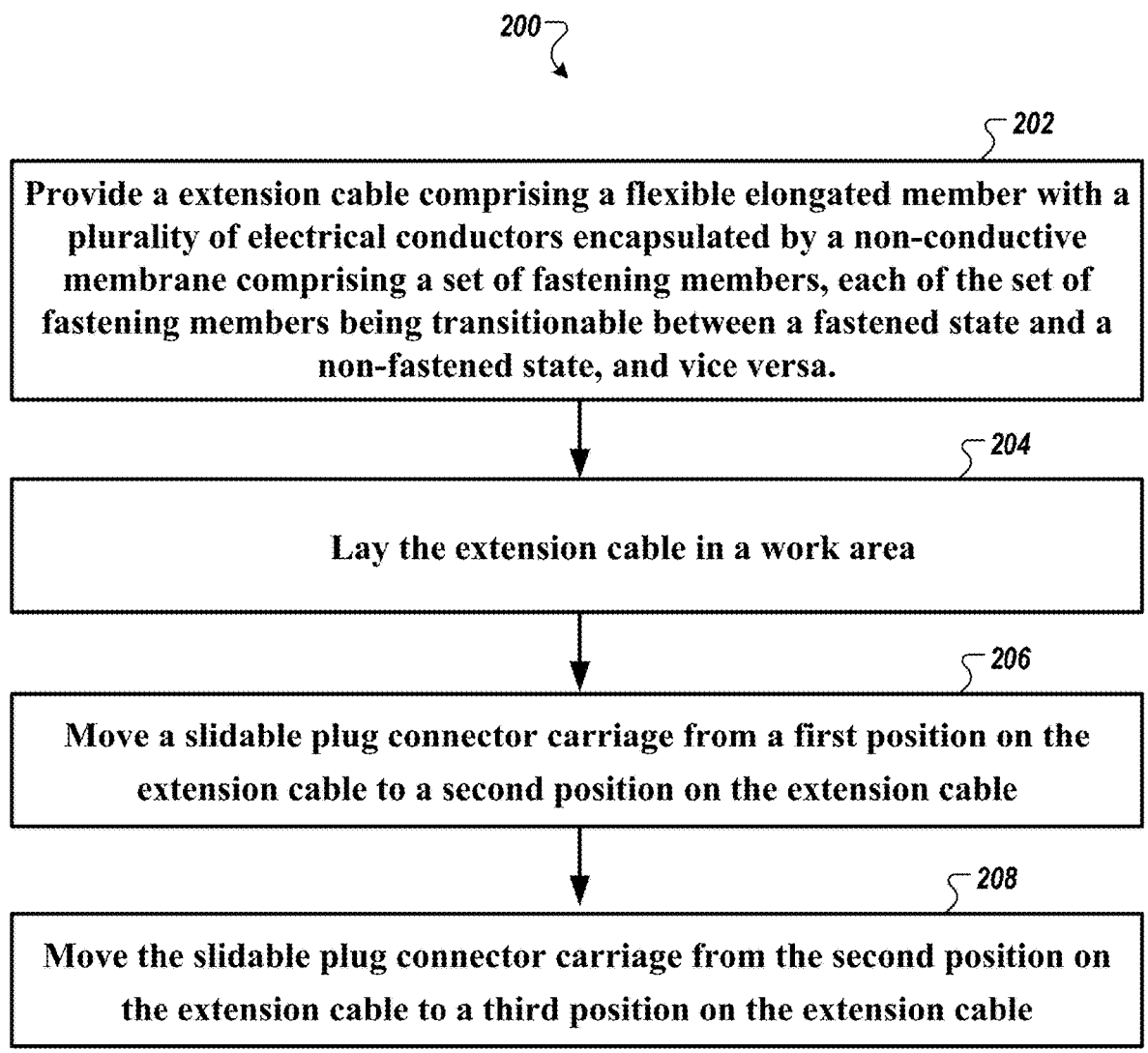
FIG. 2 is a diagram of a method of operating the slidable-plug extension-cable system in accordance with an illustrative embodiment.

FIG. 2 is a diagram of a method 200 of operating the slidable-plug extension-cable system in accordance with an illustrative embodiment. The method 200 includes providing (step 202) a cable member 102 comprising a flexible elongated member or structure having a plurality of electrical conductors 106 encapsulated by a non-conductive membrane or layer 108. Each of the plurality of electrical conductors 106 extends between a first end 110 and a second end 112 defining the flexible elongated member. The non-conductive membrane or layer 108 comprises one or more openings 114 (e.g., slotted opening) that extends between a third end and a fourth end defined over a portion of the flexible elongated member. In some embodiments, the third end and fourth end coincide with the first end 110 and the second 112. In other embodiments, the third end and fourth end associated with the one or more openings 114 correspond to a portion of the flexible elongated member defined between the first end 110 and the second 112. The one or more openings 114 define access points along the portion of the flexible elongated member for coupling of a slidable electrically-conductive coupling element 116 of a slidable plug connector (e.g., 104a or 104b) having a housing 118 and a standardized electrical receptacle 120.

The non-conductive membrane or layer (also referred to herein as a "non-conductive encapsulation") comprises a set of fastening members configured as a strip that extends between a third end and a fourth end over a portion of the flexible elongated member (e.g., at least 25% the length of the non-conductive encapsulation). Each fastening member of the set of fastening members is transitionable from a fastened state to an unfastened state and from the unfastened state to the fastened state. In some embodiments, the set of fastening members form a zipper. In some embodiments, the set of fastening members form a sealable strip (e.g., similar to that of a Ziploc® strip). In some embodiments, each of the fastening member comprises a hook and loop unit (e.g., similar to that of a Velcro® strip).

The method 200 further includes laying (step 204) the cable in a work area (e.g., construction zone, garage, or any place that is in essence not on a manufacturing machine at a manufacturing location of the cable). That is, the cable member 102 can be laid at any location or environment that extension cords are conventionally used and is then used as a substitute for such extension cord. In other embodiments, the cable member 102 can be laid in any locations where wirings are installed and is then used as a substitute for such writing. In some embodiments, the cable member 102 are laid in walls of residential, commercial, and industrial locations and facilitate quick installations of new wall sockets.

The method 200 further includes moving (step 206) a slidable plug connector (e.g., 104a) from a first location or position on the cable member 102 to a second location or position on the cable member 102 by sliding the plug connector over the fastening members. Indeed, as the slidable plug connector (e.g., 104a) moves along the cable member 102 and over the fastening members, the front portion of the slidable plug connector unfastens the approaching fastening members and the rear portion of the slidable plug connector fastens the trailing fastening members. The designation of the front portion and rear portion and leading/trailing fastening members will reverse when the slidable plug connector is traveling in the opposite direction.

The method 200 further includes moving (step 208) the slidable plug connector (e.g., 104a) from the second location or position on the cable member 102 to a third location or position on the cable member 102 by sliding the plug connector over the fastening members.

Indeed, the slidable action of the slidable plug connector 104 in this manner provides a point of access for the slidable plug connector to contact the underlying electrical conductors (e.g., 106a-106c) of the cable member 102 in a region defined by the length of the slidable plug connector, or the fastening/unfastening mechanisms located therein, while providing a sealed encapsulation of the cable member 102 over regions of the cable outside the slidable plug connector.

Examples of Cable Member with Fasteners

Figure 3:
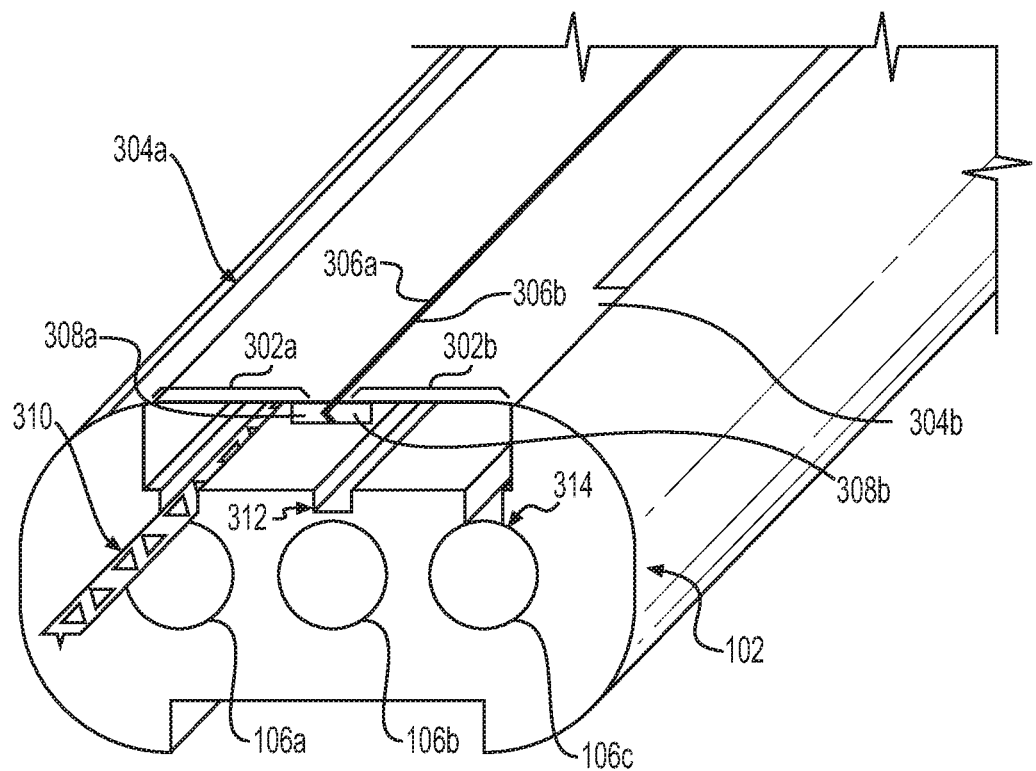
FIG. 3 shows an example cross-sectional profile of a member cable for the slidable-plug extension-cable system, in accordance with an illustrative embodiment.

FIG. 3 show an example cross-sectional profile of a cable member (e.g., 102) for the slidable-plug extension-cable system 100, in accordance with an illustrative embodiment.

As shown in FIG. 3, the cable member 102 includes a cable portion 102 that encapsulates a set of conductors 106a-106c. As discussed above, the set of conductors can include two conductors (not shown), three conductors (shown in FIG. 3), four conductors (not shown), among others. In some embodiments, the set of conductors includes a second set of conductors for DC power. In some embodiments, the set of conductors includes fiber optic cables or smaller gauge wires to carry control signals (e.g., less than 1 Amp). The cable member 102 can be made of a waterproof, flexible, cut-and-tear resistant material. The cable of FIG. 3 includes a thinner encapsulation 302 (shown as 302a and 302b) (also referred to herein as the "unfastenable encapsulation" 302) that based on its geometry can be allowed to flexibly bend back, or separated, with respect to the other portion of the cable member 102. As shown in FIG. 3, a first side of the first unfastenable encapsulation (e.g., 302a) is fixably attached (e.g., along 304a) to the body of the cable member 102 and a first side of the second unfastenable encapsulation (e.g., 304b) is fixably attached (e.g., along 304b) to the body of the cable member 102. Each of the first unfastenable encapsulation 302a and second unfastenable encapsulation 304b at a second side 306a, 306b includes corresponding sets of fastening members 308a, 308b configured to fasten to one another.

In some embodiments, the set of fastening members 308a, 308b form a zipper. In some embodiments, the set of fastening members 308a, 308b form a sealable strip (e.g., similar to that of a Ziploc® strip). In some embodiments, each of the fastening member (e.g., 308a, 308b) comprises a hook and loop unit (e.g., similar to that of a Velcro® strip).

In some embodiments, e.g., as shown in FIG. 3, the cable member 102 includes a thin piece of metal 310 that can act as a track for smooth operation and to provide better conductivity. In some embodiments, the track includes cutoff 312 (e.g., triangular cutouts) that are folded down to penetrate the conductor. In other embodiments, the cable member 102 includes a slot grove 314, which can be made of a non-conductive material. It is noted that, each of the conductors (e.g., 106a, 106b, 106c) includes a guide comprising the same, or similar, style thin metal 310 guide. In some embodiments, each of the conductors (e.g., 106a, 106b, 106c) includes a guide comprising the same, or similar, style of cutoff 312. In some embodiments, each of the conductors (e.g., 106a, 106b, 106c) includes a guide comprising the same, or similar, style of slot grove 314.

In some embodiments, rather than dual set of unfastenable encapsulation (e.g., 302a and 302b), only a single unfastenable encapsulation is used. For example, in such embodiments, a single unfastenable encapsulation 302a is dimensioned to extend across the opening defining a channel to access the conductors (106a, 106b, 106c) and includes a first part of the set of fastening members 308a while the second part of the set of fastening members 308b is located on the body of the cable member 102 (e.g., at an edge defined in the body or along a side wall surface of the channel). The embodiments may be useful for smaller diameter cable, e.g., having two conductors or smaller gauge conductors.

Examples of Fasten-Able Slidable Plug Assembly

FIGS. 4A, 4B, 4C, and 4D shows the slidable plug connector 104 and features therein to facilitate slidable operations of slidable plug connector 104, in accordance with an illustrative embodiment.

FIG. 4A shows a front angle view of the extension cable system 100 with a slidable plug connector 104 (also referred to as a sliding outlet receptacle unit as well as a slidable plug carriage) with standardized electrical receptacles 120. The cable member 102 of FIGS. 4A-4D is shown with a cross-section area of FIG. 3 in which each conductor (e.g., 106a, 106b, and 106c) includes a slot grove 314.

FIG. 4B shows a front seal 402 (shown having a top seal portion 402a and a bottom seal portion 402b) and a rear seal (not shown) of the slidable plug connector 104. As also shown in Element B, the slidable plug connector 104 includes a first fastening/unfastening mechanism (shown as 404a) located at a first side of the slidable plug connector 104 and a second fastening/unfastening mechanism (referenced as 404b, see FIG. 6) located at a second side of the slidable plug connector 104. The fastening/unfastening mechanism (e.g., 404a) is configured to unfasten the fastening members 308a, 308b attached to the unfastenable encapsulations 302a, 302b at a leading location of the slidable plug connector 104 when the slidable plug connector 104 is moved in a first direction and the fastening/unfastening mechanism (e.g., 404b) is configured to fasten the fastening members 308a, 308b. Similarly, the fastening/unfastening mechanism (e.g., 404a) is configured to fasten the fastening members 308a, 308b attached at a trailing location of the slidable plug connector 104 when the slidable plug connector 104 is moved in a second direction (opposite the first direction) and the fastening/unfastening mechanism (e.g., 404b) is configured to unfasten the fastening members 308a, 308b.

FIG. 4C shows different views of an example of optional metal strip 310 that can be implemented in the cable member 102 and use to facilitate the sliding of the slidable plug connector 104.

FIG. 4D shows an example side profile of the slidable plug connector 104. In FIGS. 4A-4D, the slidable plug connector 104 is shown with an optional button 406 located at the bottom of the unit that serves as a brake/stopper, e.g., to lock the slidable plug connector 104 in place with respect to the cable member 102. It should be appreciated that the lock button 406 can be placed at other location on the housing 104 of the slidable plug connector 104.

Figure 5:
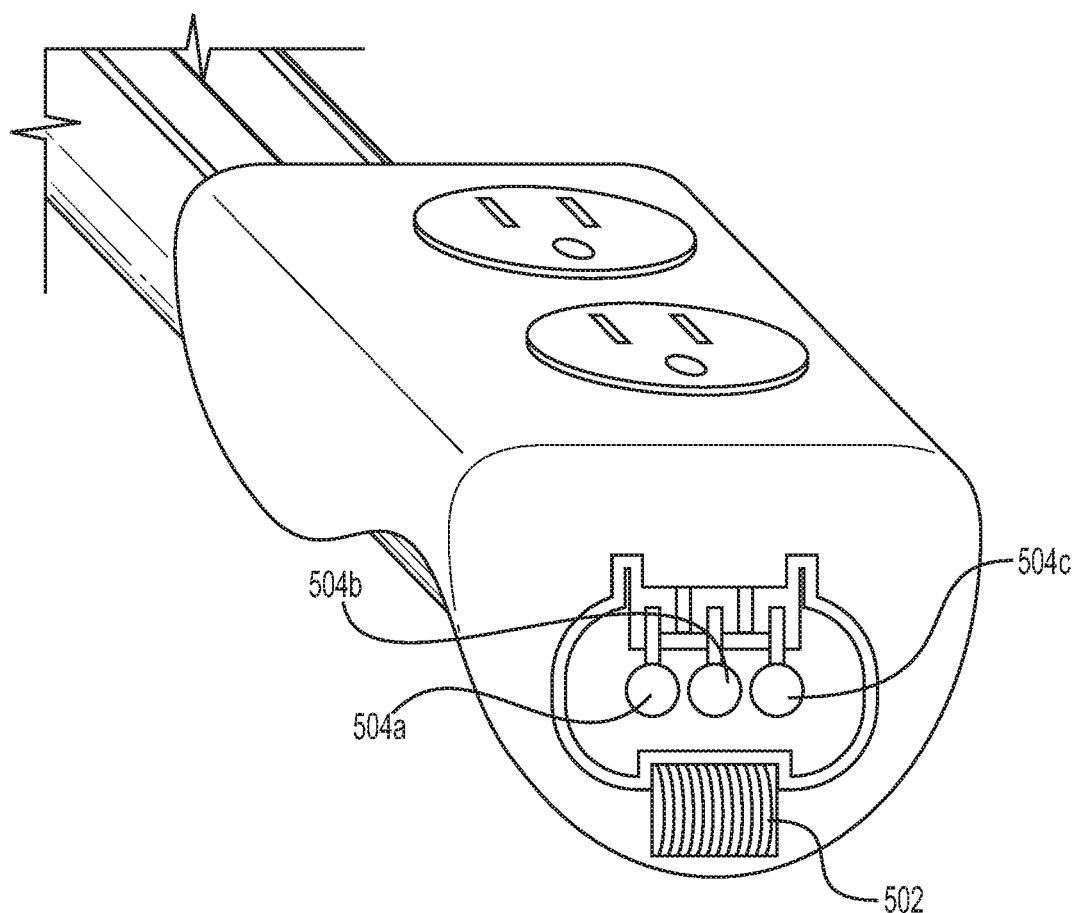
FIG. 5 is a diagram showing an example internal structure of the slidable plug connector, in accordance with an illustrative embodiment.

FIG. 5 is a diagram showing an example internal structure of the slidable plug connector 104, in accordance with an illustrative embodiment. As shown in FIG. 5, the unit can include, e.g., at a bottom location, a set of one or more optional roller wheels or low friction element (502) configured to guide the slidable plug connector 104 over the cable member 102. FIG. 5 further shows three wheels or prongs (shown as 504a, 504b, 504c) that can be positioned over the conductive wires to form a closed electrical circuit when the receptable unit is attached and engaged to the cable. As shown in FIG. 3, the cable can include two flaps made of flexible material that can return to its original sealable configuration when the slidable plug connector 104 is moved.

Figure 6:
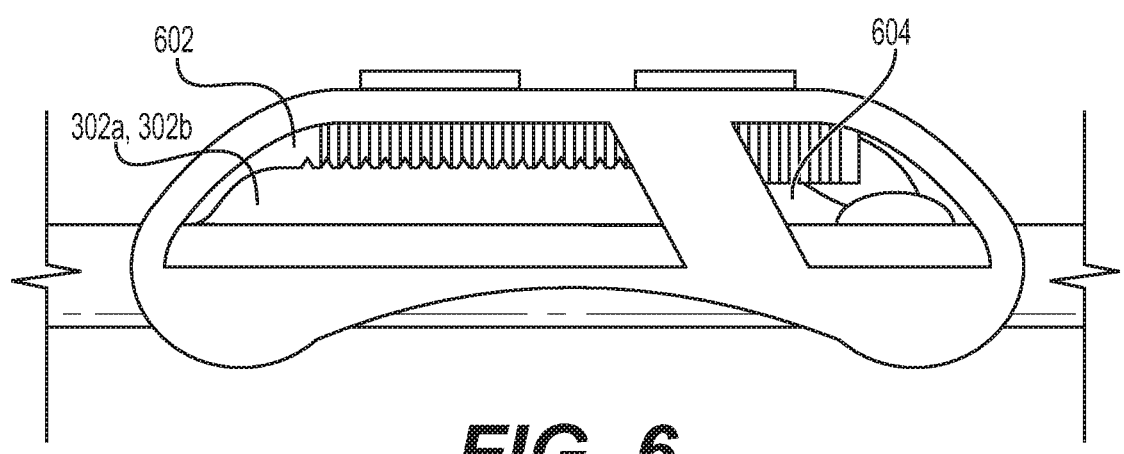
FIG. 6 shows a partial cut-off side profile of the slidable plug connector, in accordance with an illustrative embodiment.

FIG. 6 shows a partial cut-off side profile of the slidable plug connector 104. The left opening 602 of FIG. 6 shows the flexible material comprising the unfastenable encapsulations 302a, 302b being opened. Behind the unfastenable encapsulations 302a, 302b is the fastening/unfastening mechanism 404a as shown and discussed in relation to FIGS. 4A-4D. The right side 604 shows the second fastening/unfastening mechanism 404b. Indeed, FIG. 6 shows the fastening/unfastening mechanism (e.g., 404a) unfastening the fastening members 308a, 308b attached to the unfastenable encapsulations 302a, 302b at a leading location of the slidable plug connector 104 when the slidable plug connector 104 is moved in a first direction and the fastening/unfastening mechanism (e.g., 404b) is configured to fasten the fastening members 308a, 308b.

Figure 7:
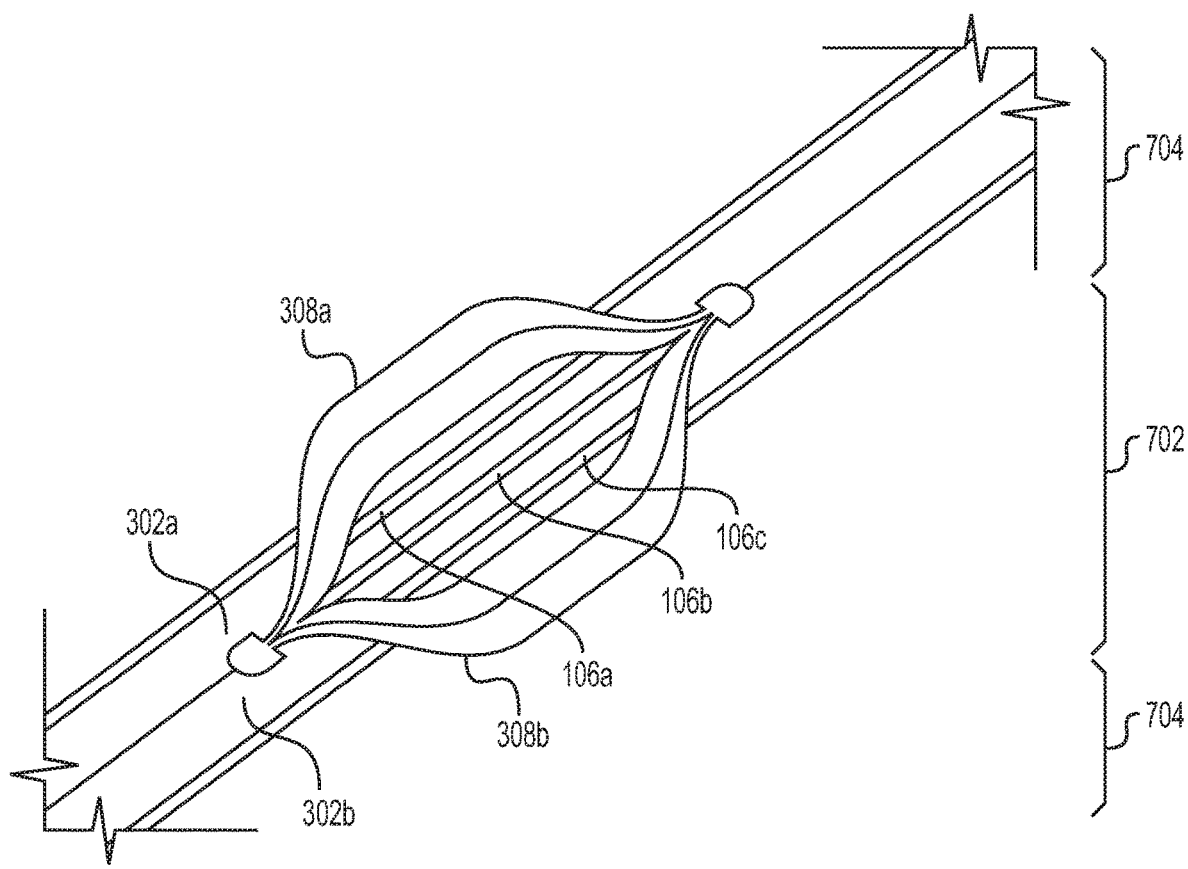
FIG. 7 is a diagram showing a top view of the cable member with a portion of the flexible material comprising a portion of the unfastenable encapsulations in an opened/unfastened configuration and exposing the conductive components and a portion of the unfastenable encapsulations in a closed/fastened configuration, in accordance with an illustrative embodiment.

FIG. 7 is a diagram showing a top view of the cable member 102 with a portion of the flexible material (i.e., flap) comprising a portion 702 of the unfastenable encapsulations 302a, 302b in an opened/unfastened configuration and exposing the conductive components (e.g., 106a, 106b, 106c) and a portion 704 of the unfastenable encapsulations 302a, 302b in a closed/fastened configuration, in accordance with an illustrative embodiment.

FIGS. 8A, 8B, 8C, 8D, 9A, 9B are diagrams showing another example of the slidable-plug extension-cable system (referenced as 100a), in accordance with another embodiment.

Figure 8A:
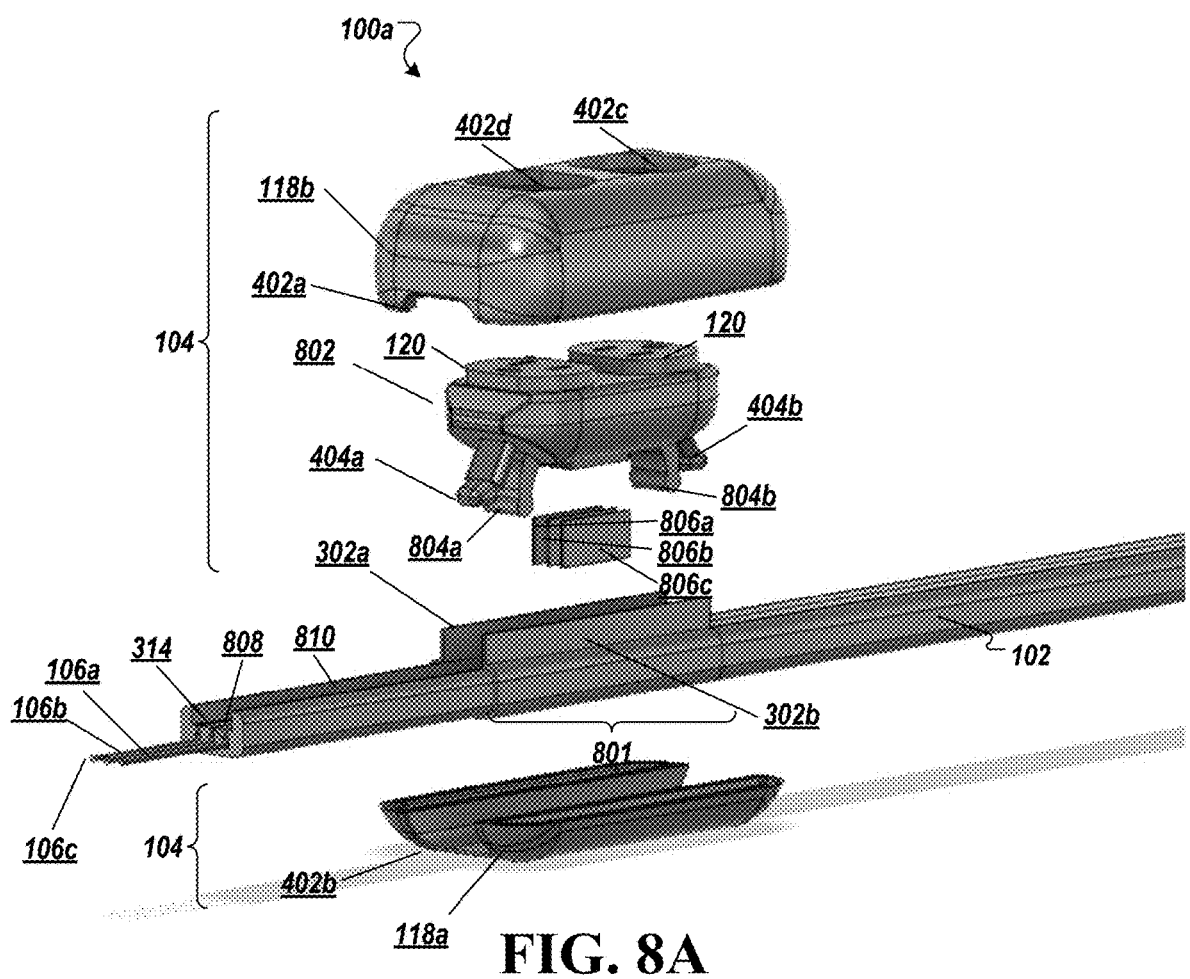
FIGS. 8A, 8B, 8C, 8D, 9A, 9B are diagrams showing another example of the slidable-plug extension-cable system, in accordance with another embodiment.
Figure 8B:
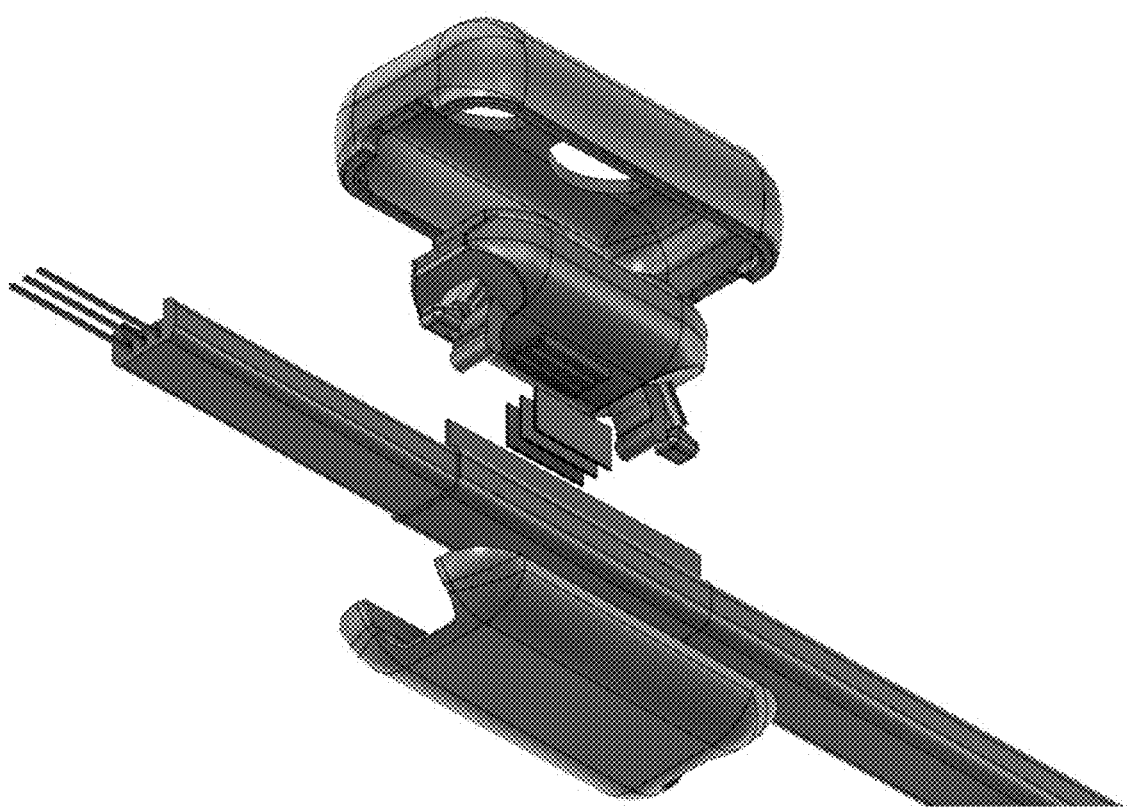
Figure 8C:
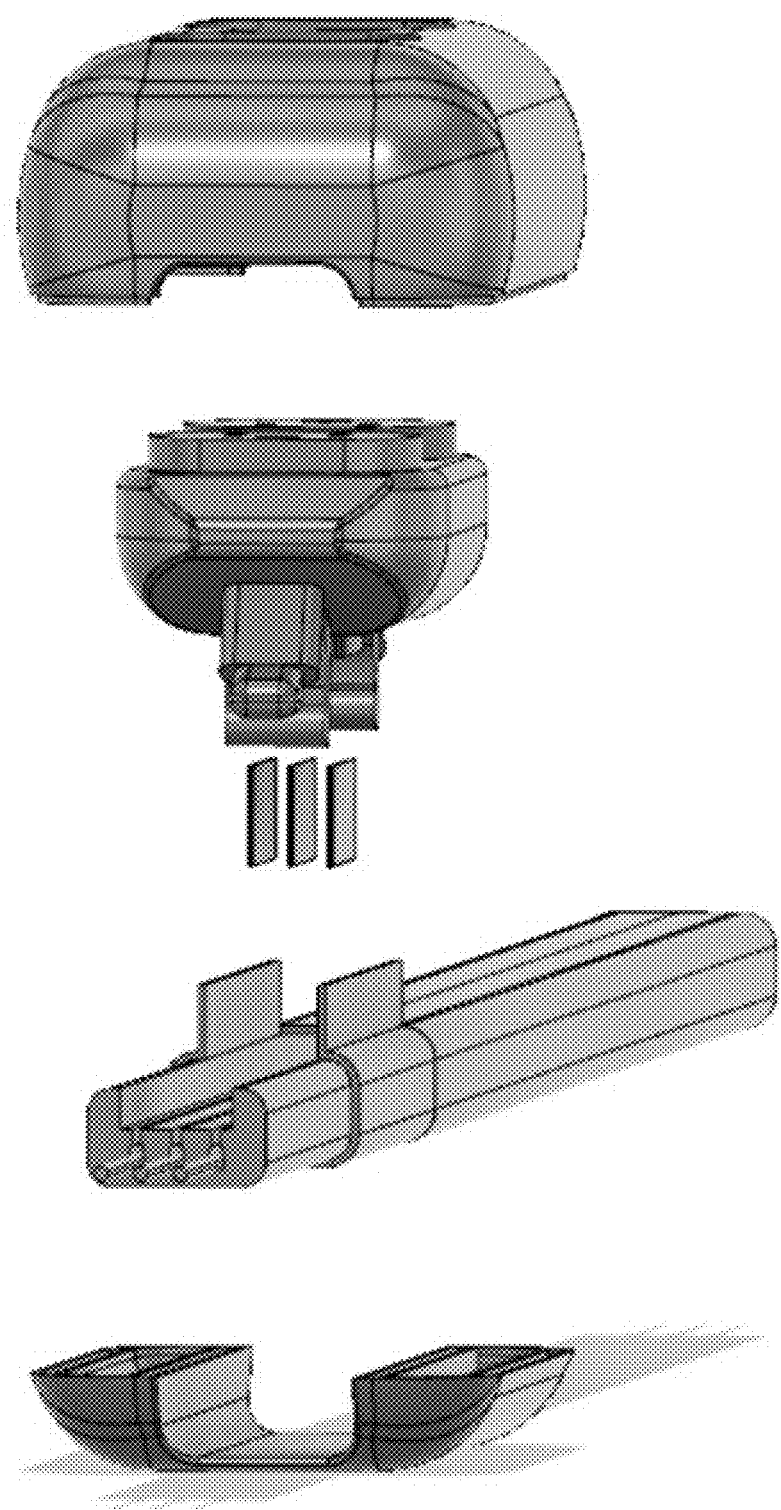
Figure 8D:
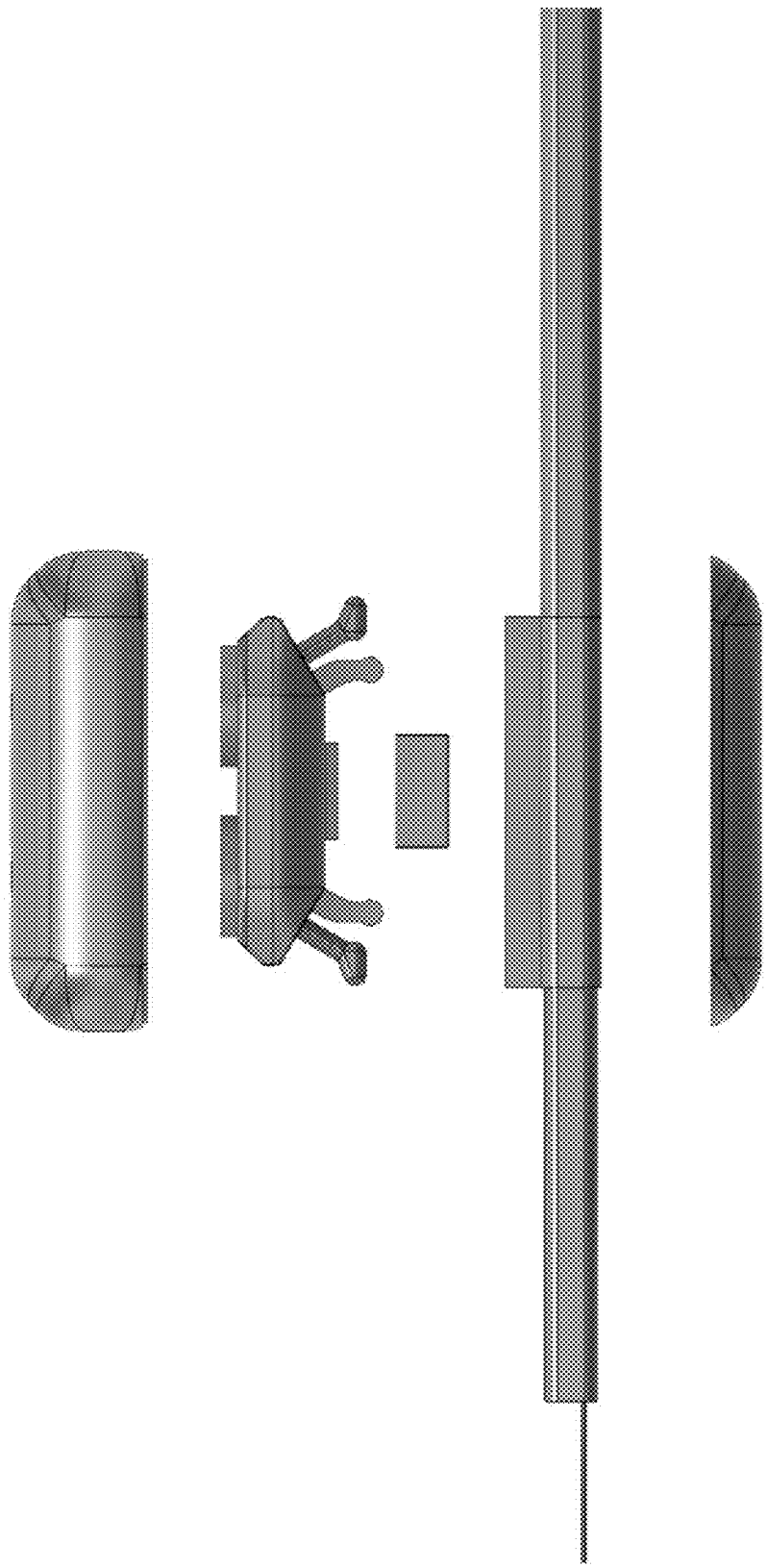

FIG. 8A shows an exploded perspective view of the unassembled slidable-plug extension-cable system 110a. FIG. 8B shows the same exploded configuration of the unassembled slidable-plug extension-cable system of FIG. 8A from a bottom perspective. FIG. 8C shows the same exploded configuration of the unassembled slidable-plug extension-cable system in another perspective view. FIG. 8D shows the same exploded configuration of the unassembled slidable-plug extension-cable system in a side view.

Figure 9A:
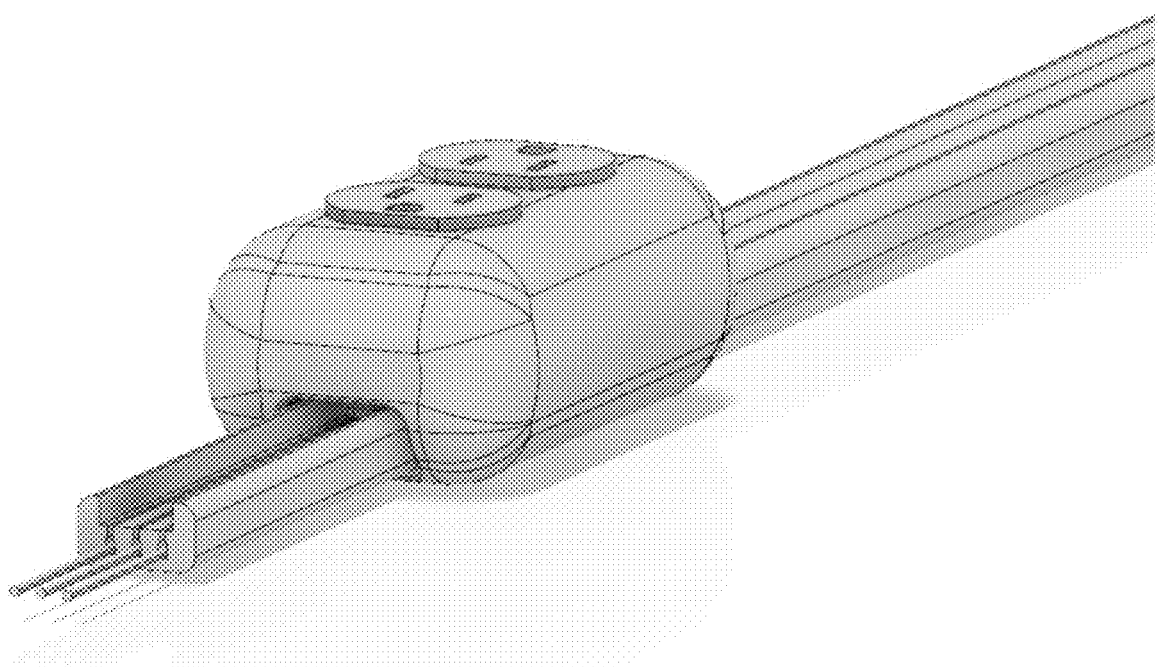
Figure 9B:
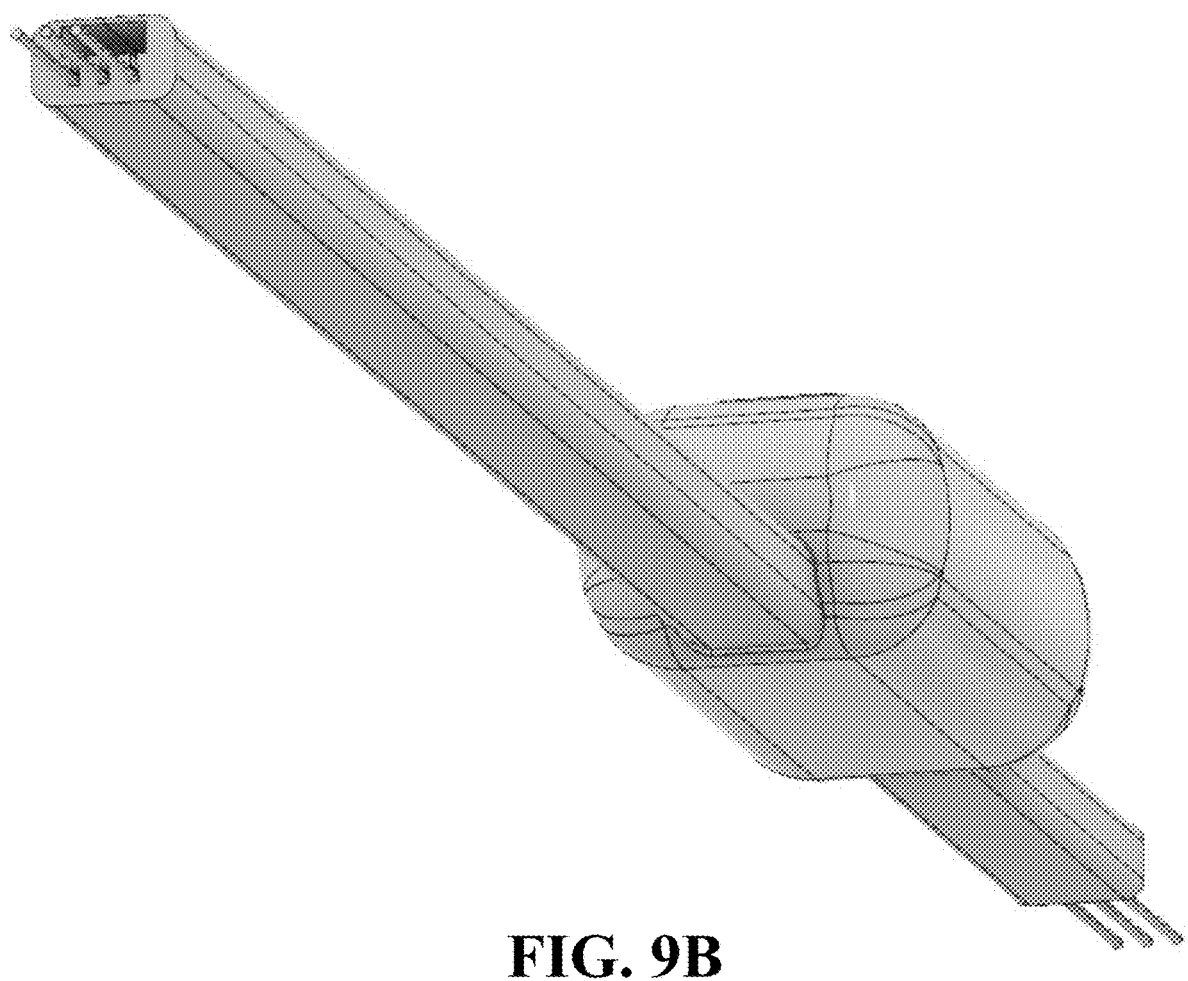

FIG. 9A shows a first perspective view of the slidable-plug extension-cable system 110a of FIGS. 8A-8D in an assembled configuration. FIG. 9B shows a second perspective view of the slidable-plug extension-cable system 110a of FIGS. 8A-8D in an assembled configuration.

In FIG. 8A, the cable member 102 is shown with a cross-sectional profile similar to that described in FIGS. 4A-4D. The cable member 102 includes a set of three conductors 106a, 106b, 106c each configured with a slot grove 314. The cable member 102 forms an encapsulation with an unfastenable encapsulation portion 302a, 302b. In FIG. 8A (as well as FIGS. 8B-8D and 9A-9B), the encapsulation of the cable member 102 is shown with respect to the unfastened region 801 as defined between the fastening/unfastening mechanisms (e.g., 404a, 404b) of the slidable plug connector 104.

Figure 10A:
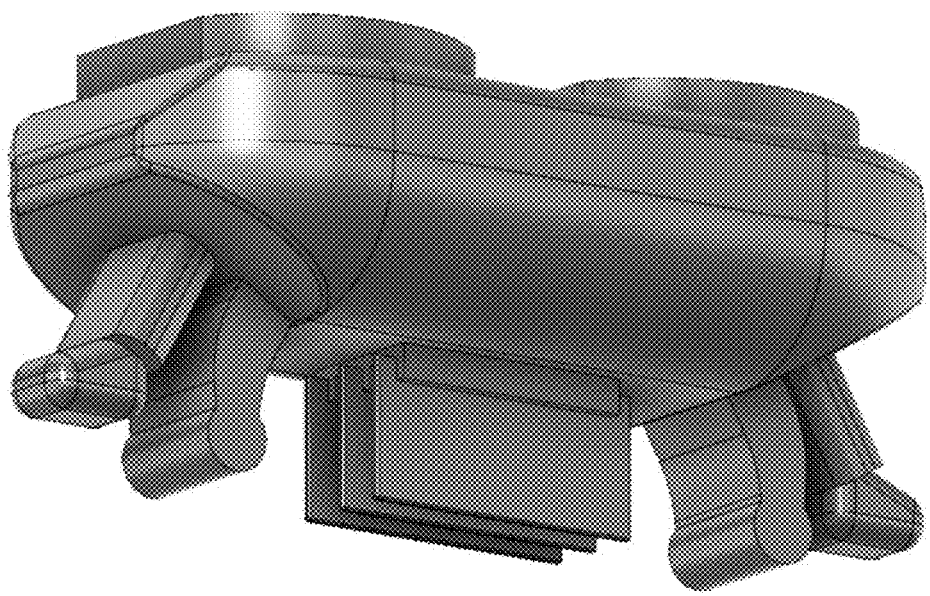
FIGS. 10A and 10B each shows a more detailed view of the internal carriage of FIGS. 8A-8D and 9A-9B, in accordance with an illustrative embodiment.
Figure 10B:
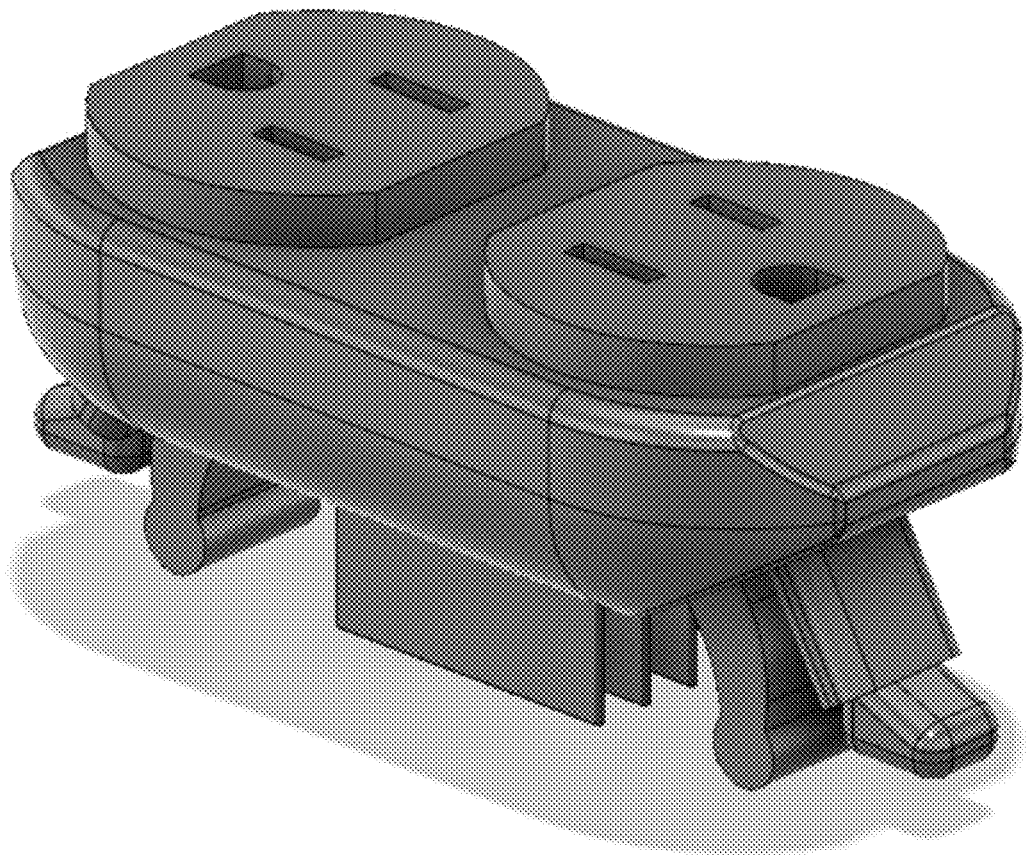

The slidable plug connector 104 includes an internal carriage 802 that houses the standardized electrical receptacles 120 that electrically contacts a set of conduction/guiding plates (806a, 806b, and 806c). FIGS. 10A and 10B shows a more detailed view of the internal carriage 802 of FIGS. 8A-8D and 9A-9B, in accordance with an illustrative embodiment. Referring still to FIG. 8A, the conduction/guiding plates (806a, 806b, and 806c) are dimensioned to extend the slot grove 314 to contact the conductors (e.g., 106a, 106b, 106c) when the slidable plug connector 104 is assembled over the cable member 102. FIGS. 10A and 10B shows the internal carriage 802 being assembled with the conduction/guiding plates (806a, 806b, and 806c).

Referring still to FIG. 8A, the internal carriage 802 is covered by an exterior housing 118 formed of two shells (shown as upper shell 118a and lower shell 118b). In some embodiments, the housing 118a, 118b includes seals (e.g., 402a, 402b, 402c, and 402d) that are configured to seal the slidable plug connector 104 when assembled.

FIG. 8A further shows the internal carriage 802 includes a set of one or more optional rollers (804a, 804b) configured to contact a surface 808 in the channel 810 defined in the body of the cable member 102. In some embodiments, the rollers (e.g., 804a, 804b) are rotatable. In other embodiments, the rollers (e.g., 804a, 804b) are configured with low-friction surface to guide and glide over surface 808.

Examples of Multi-Encapsulation Extension Cord

Figure 11:
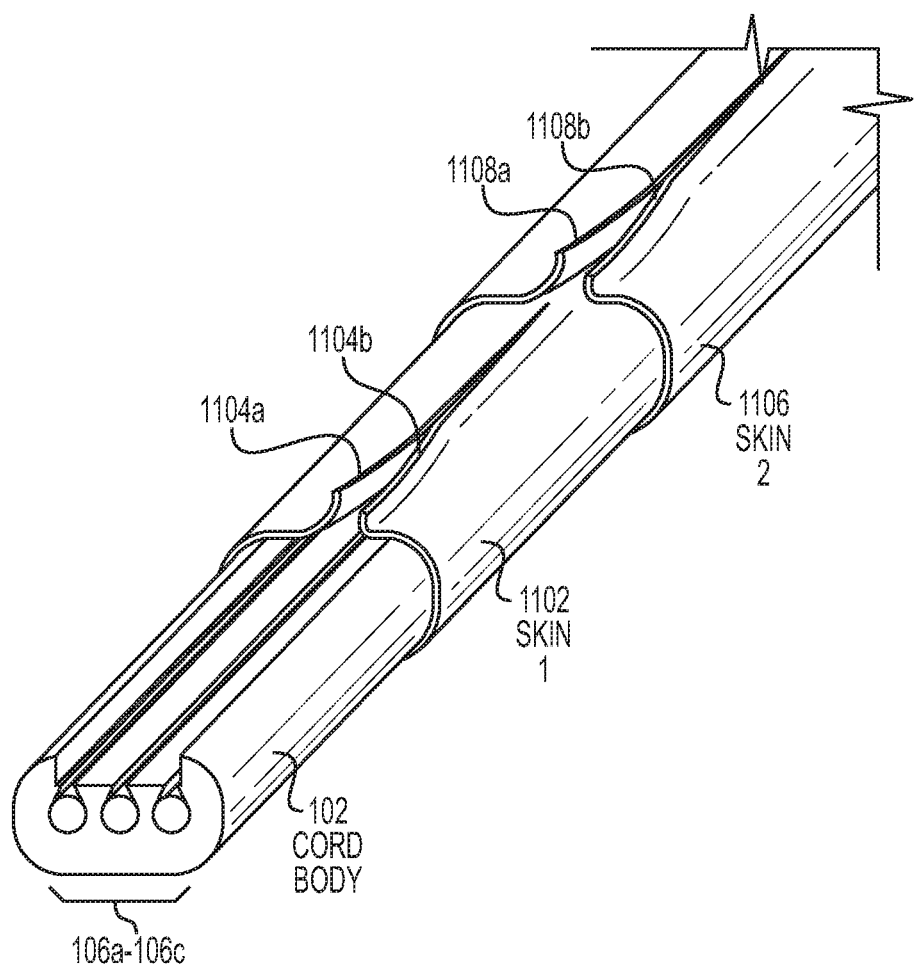
FIGS. 11 and 12 each shows an example cross-sectional profile of a cable member for a slidable-plug extension-cable system in which the cable member is configured with two or more encapsulations, in accordance with an illustrative embodiment.
Figure 12:
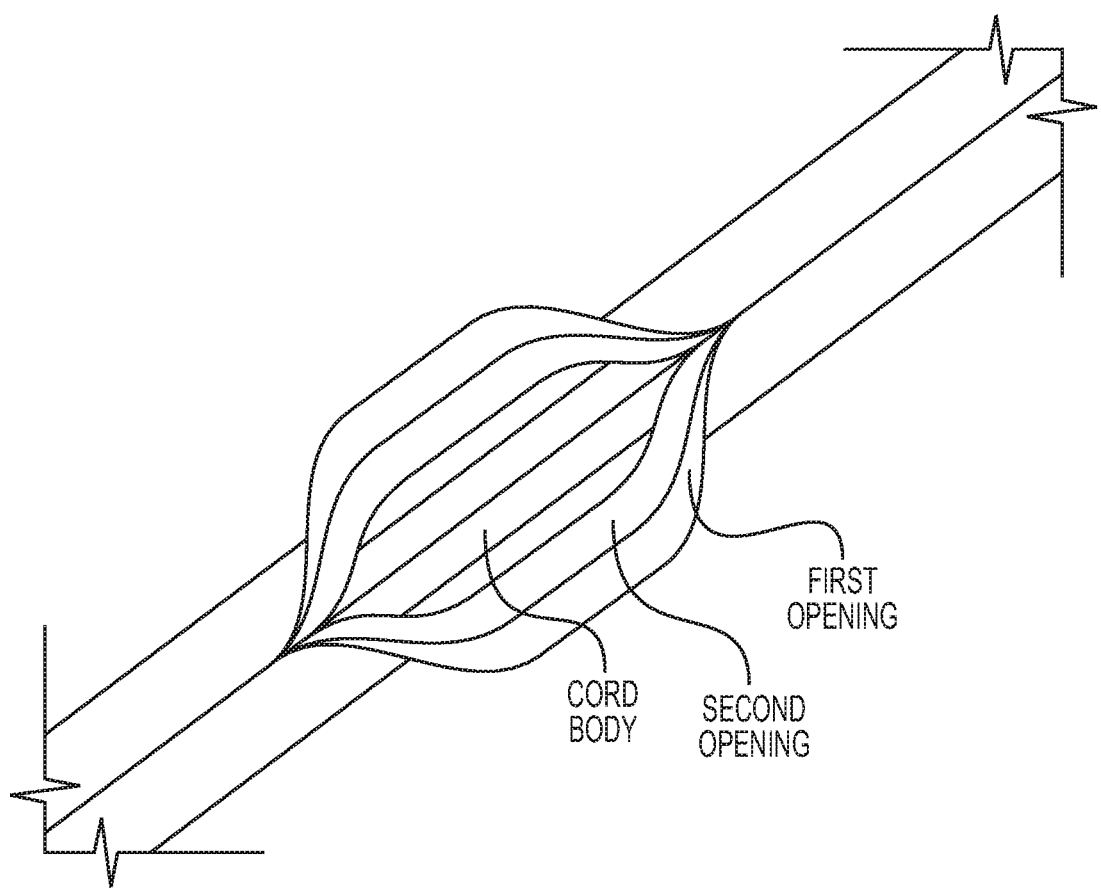

FIGS. 11 and 12 each shows an example cross-sectional profile of a cable member (e.g., 102a) for the slidable-plug extension-cable system 100 in which the cable member (102a) is configured with two or more encapsulations, in accordance with an illustrative embodiment.

Indeed, in some embodiments, optional water-proof sealable set of fasteners (previously referenced as 308a and 308b) encapsulate the body of the cable member 102 to provide a complete, or near-completely, sealable extension cord cable.

In FIG. 11, two or more sets of encapsulation and corresponding set of fasteners are used in which a first encapsulation 1102 and corresponding first set of fasteners (shown as 1104a, 1104b) is used to mechanically isolate the conductors (106a-106c) from contact via an external object and a second encapsulation 1106 and corresponding second set of fasteners (shown as 1108a, 1108b) are used to seal the body of the cable member 102 and its internal components from water and/or moisture.

In some embodiments (not shown), the second encapsulation 1106 and corresponding second set of fasteners (shown as 1108a, 1108b) used to seal the body of the cable member 102 and its internal components from water and/or moisture are located under the first encapsulation 1102 and corresponding first set of fasteners (1104a, 1104b).

Indeed, in some embodiments, optional water-proof sealable set of fasteners (previously referenced as 308a and 308b) encapsulate the body of the cable member 102 to provide a complete, or near-completely, sealable extension cord cable.

In FIG. 11, two or more sets of encapsulation and corresponding set of fasteners are used in which a first encapsulation 1102 and corresponding first set of fasteners (shown as 1104a, 1104b) is used to mechanically isolate the conductors (106a-106c) from contact via an external object and a second encapsulation 1106 and corresponding second set of fasteners (shown as 1108a, 1108b) are used to seal the body of the cable member 102 and its internal components from water and/or moisture.

In some embodiments (not shown), second sets of encapsulations and corresponding sets of fasteners are used to seal the body of the cable member 102 and its internal components from water and/or moisture in which the first of such encapsulation is located under the first encapsulation 1102 and corresponding first set of fasteners (1104a, 1104b) and the second of such encapsulation is located over the first encapsulation 1102 and corresponding first set of fasteners (1104a, 1104b).

Examples of Multi-body Member Fasten-Able Slidable Plug Cable System

FIGS. 13A, 13B, 13C, 13D, 14, 15A, 15B, 15C, 16A, 16B, 16C, 16D, 17A, 17B, 18A, and 18B are diagrams showing another example of the slidable-plug extension-cable system (referenced as 100b), in accordance with another embodiment.

Figure 13A:
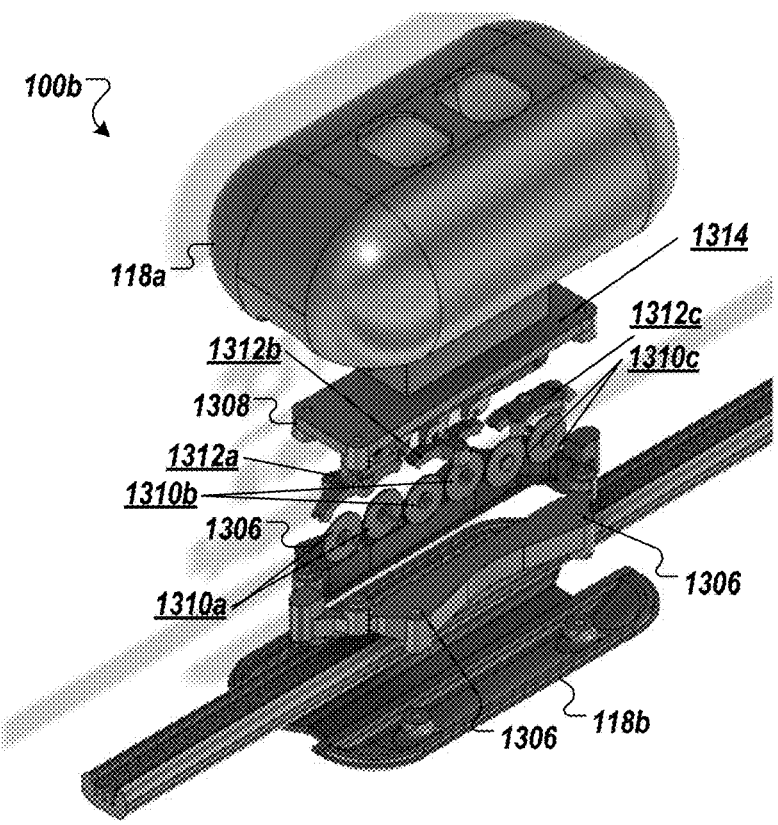
FIGS. 13A, 13B, 13C, 13D, 14, 15A, 15B, 15C, 16A, 16B, 16C, 16D, 17A, 17B, 18A, and 18B are diagrams showing another example of the slidable-plug extension-cable system, in accordance with another embodiment.
Figure 13B:
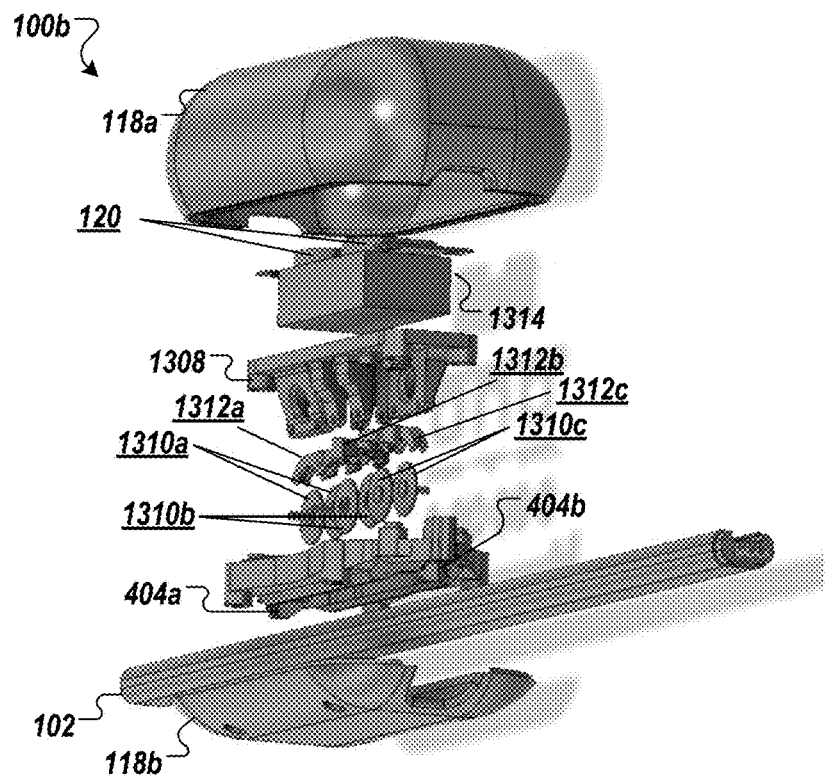
Figure 13D:
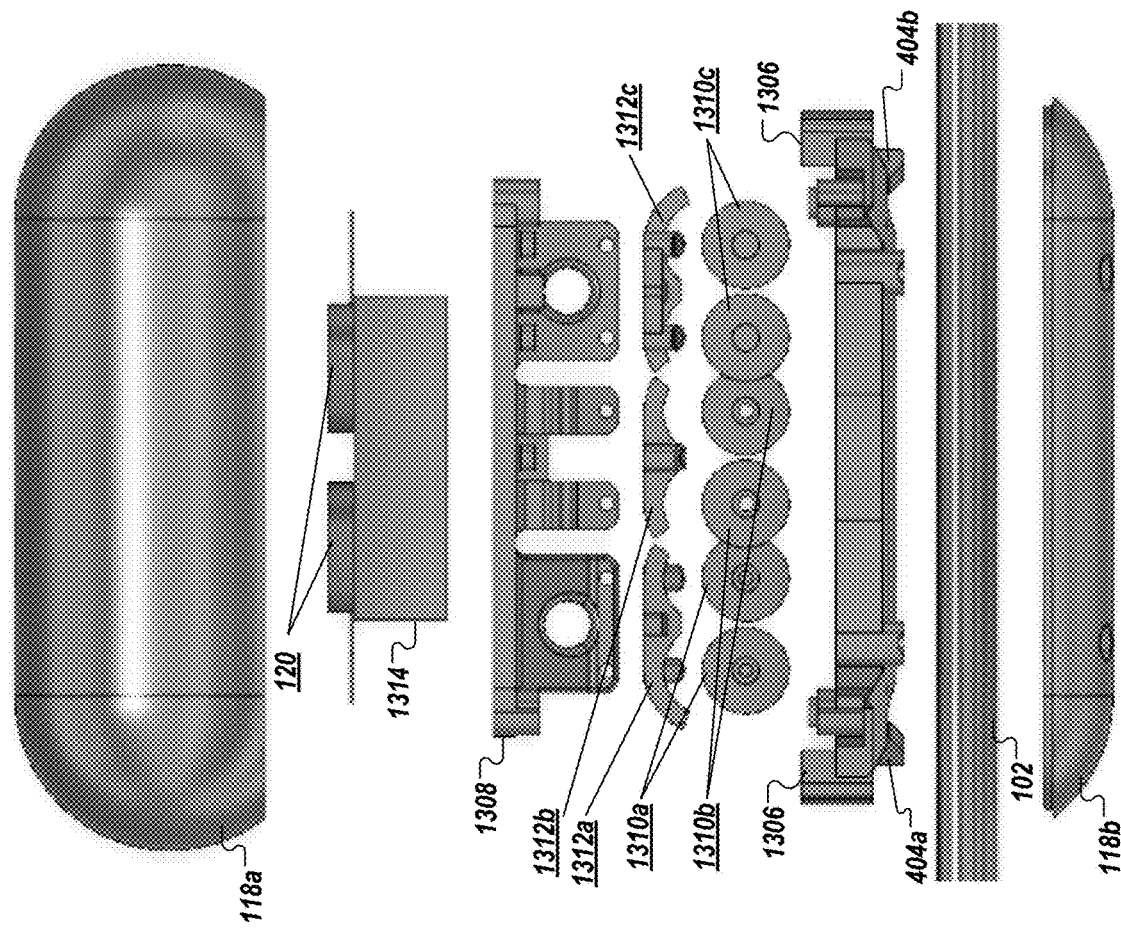
Figure 13C:
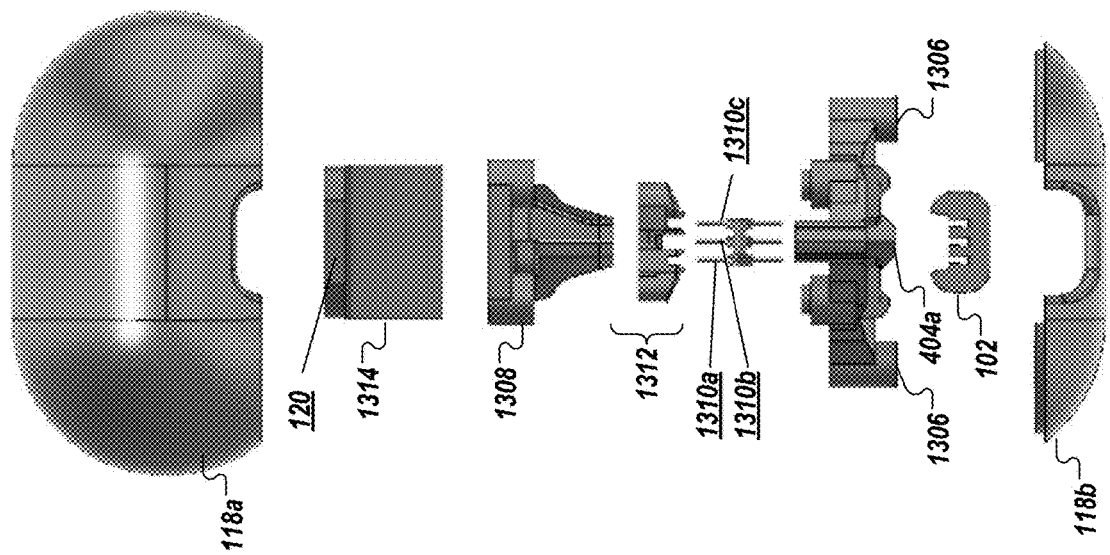
Figure 14:
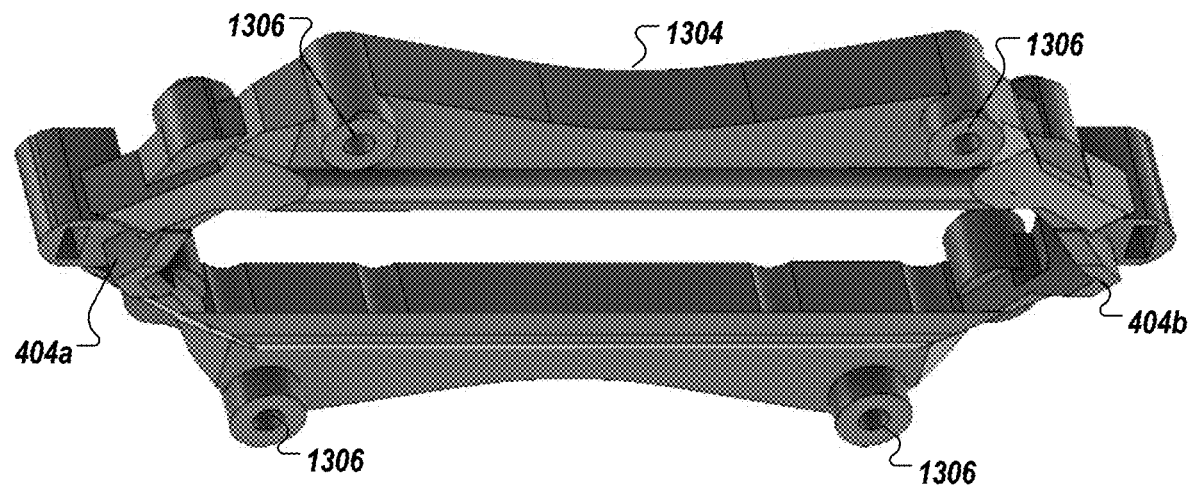

FIGS. 13A and 13B each shows exploded perspective views of an unassembled slidable-plug extension-cable system 110b. FIG. 13C shows the same exploded configuration of the unassembled slidable-plug extension-cable system of FIGS. 13A and 13B from a front perspective. FIG. 13D shows the same exploded configuration of the unassembled slidable-plug extension-cable system of FIGS. 13A and 13B from a side perspective. As shown in FIGS. 13A-13D, the slidable-plug extension-cable system 100b includes a multi-body member slidable plug connectors 1302 (previously referenced as slidable plug connector 104). The multi-body member slidable plug connectors 1302 includes a first internal body member 1304 configured to mate with a bottom portion of the exterior housing 118b to position the multi-body member slidable plug connectors 1302 around the cable member 102. FIG. 14 is a detailed perspective view of the first internal body member 1304 of FIGS. 13A-13D, in accordance with an illustrative embodiment. In other embodiments, the first internal body member 1304 is configured to mate with another internal body member (not shown) to which the bottom portion of the exterior housing 118b is fixably attached.

Figure 15A:
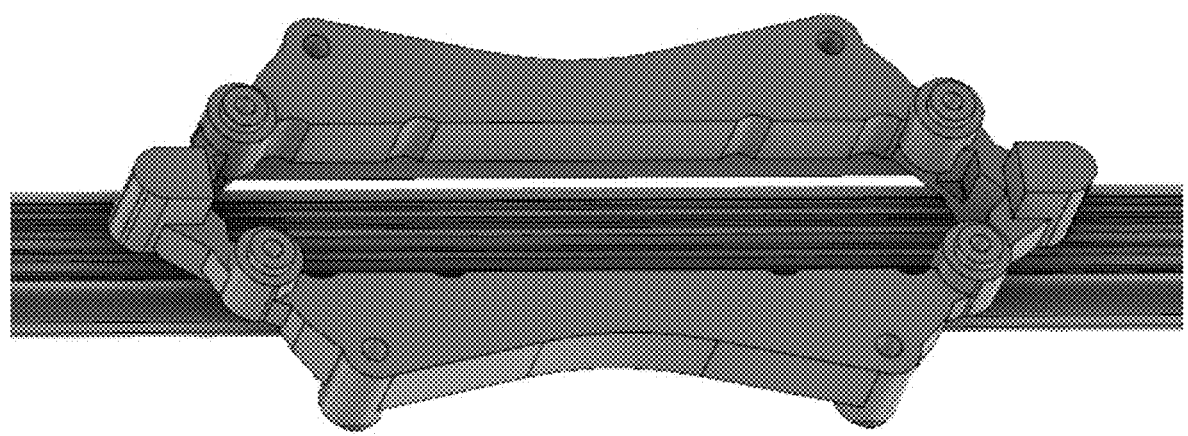
Figure 15B:
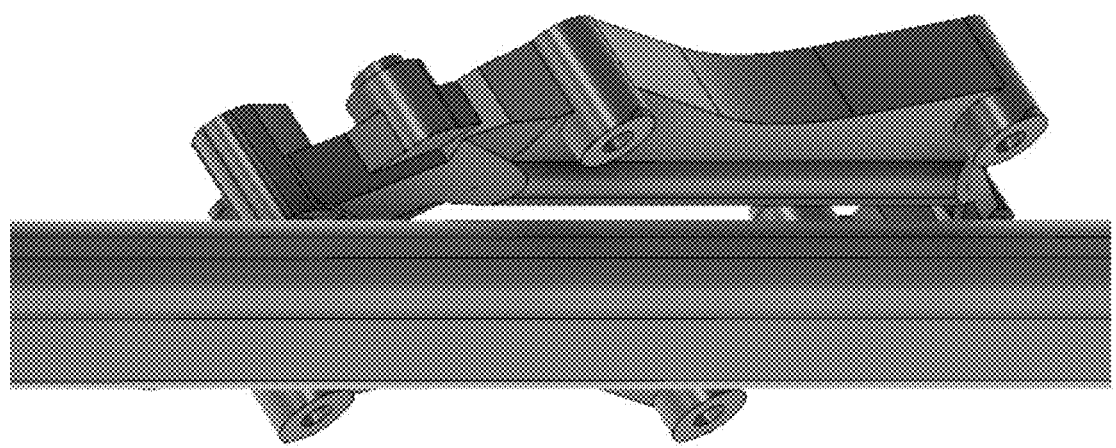
Figure 15C:
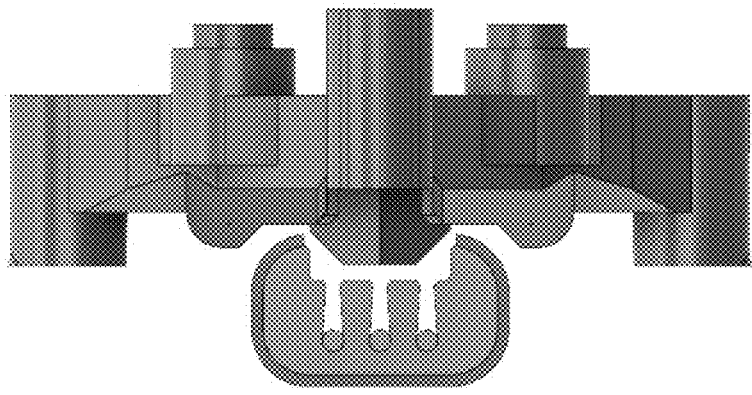

The first internal body member 1304 provides a base for the multi-body member slidable plug connectors 1302 to retain the multi-body member slidable plug connectors on the cable member 102 and also retains the multi-body member slidable plug connectors in a specific offset from the cable member 102. This offset facilitates the alignment of the first internal body member 1304 is fastening and unfastening the fasteners of 308 of the cable member 102. FIGS. 15A and 15B each provides perspective views of the first internal body member 1304 as positioned on the cable member 102, in accordance with an illustrative embodiment. FIG. 15C shows a front view of the first internal body member 1304 as positioned on the cable member 102 of FIGS. 15A and 15B, in accordance with an illustrative embodiment.

In FIGS. 13A-13D, 14, and 15A-15C the first internal body member 1304 includes a first set of holes 1306 through which hardware fasteners (not shown) (e.g., bolts, screws, pins, nails, etc.) can be inserted, drilled, to fasten/join the first internal body member 1304 to the bottom portion of the exterior housing 118b. In other embodiments, the first internal body member 1304 is configured with snap-fitting components or is configured to be connected with the exterior housing via adhesives. In FIGS. 13A-13D, 14, and 15A-15C, the first internal body member 1304 includes fastening/unfastening mechanisms 404a and 404b, e.g., for a Zipper strip.

Referring back to FIGS. 13A-13D, the multi-body member slidable plug connectors 1302 includes a second internal body member 1308 configured to mate with the first internal body member 1304. As shown in FIG. 13A, the first internal body member 1304 and second internal body member 1308 each includes corresponding second set of holes 1310 through which hardware fasteners (not shown) (e.g., bolts, screws, pins, nails, etc.) can be inserted, drilled, to fasten/join the first internal body member 1304 to the bottom portion of the second internal body member 1308. In other embodiments, the first internal body member 1304 and/or the second internal body member 1308 are configured with snap-fitting components or are configured to be connected to one another via adhesives.

The second internal body member 1308 includes surface structures to couple to rotatable conduction/guiding members 1310 (shown as 1310a, 1310b, and 1310c) that are placed in contact with a conductor (e.g., 106a, 106b, 106c) of the cable member 102. Although shown as to separate members, the first internal body member 1304 and second internal body member 1308 are configured, e.g., manufactured, in some embodiments, as a single unitary body. Indeed, in some embodiments, the first internal body member 1304 includes surface structures to couple to rotatable conduction/guiding members 1310

In FIGS. 13A-13D, the multi-body member slidable plug connectors 1302 includes three sets of two rotatable conduction/guiding members 1310, each set comprising two rotatable conduction/guiding members 1310 being configured to be placed in contact with a conductor (e.g., 106a, 106b, 106c) of the cable member 102. As shown in FIGS. 13A-13D, each of the set of rotatable conduction/guiding member 1310 for each conductor includes a support member 1312 (shown as 1312a, 1312b, 1312c) to connect the rotatable conduction/guiding member 1310 to the multi-body member slidable plug connectors 1302 (e.g., to the second internal body member 1308). In addition to support, the support member 1312 as shown in FIGS. 13A-13D provides conduction between the rotatable conduction/guiding member 1310 and the receptacles (not shown) of the standardized electrical receptacles 120, shown as part of a third internal body member 1314 of the multi-body member slidable plug connectors 1302.

As shown in FIGS. 13A-13D, the third internal body member 1314 includes the housing for the standardized electrical receptacles 120. The third internal body member 1314 includes a third set of holes through which hardware fasteners (not shown) (e.g., bolts, screws, pins, nails, etc.) can be inserted, drilled, to fasten/join the third internal body member 1314 to the multi-body member slidable plug connectors 1302, e.g., to the second internal body member 108. In other embodiments, the third internal body member 1314 is configured with snap-fitting components or is configured to be connected with the exterior housing via adhesives. In other embodiments, the third internal body member 1314 is integrated into the multi-body member slidable plug connectors 1302 as a single unitary body, e.g., to the second internal body member 1308 or the first internal body member 1306.

Figure 16A:
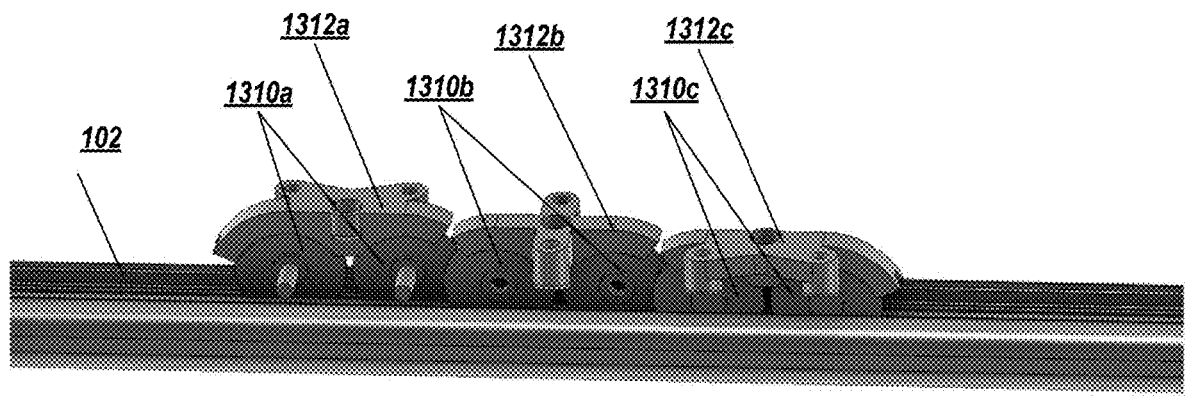
Figure 16B:
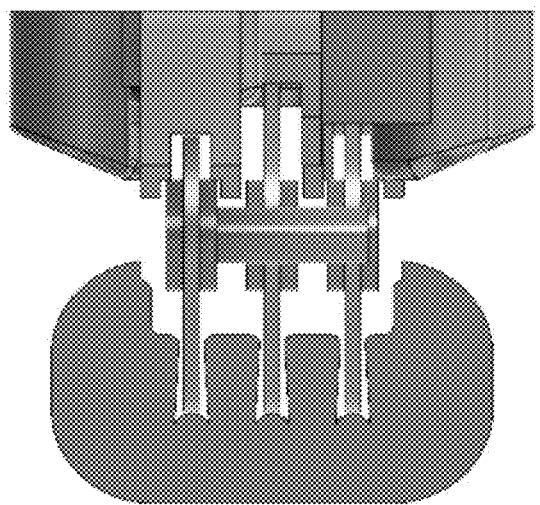
Figure 16C:
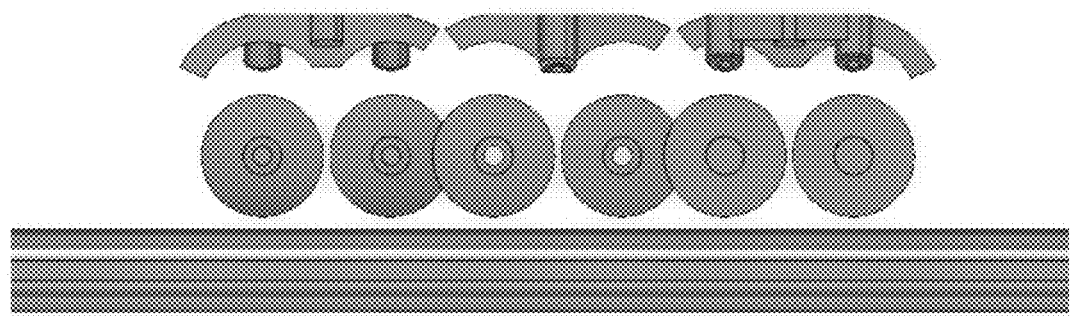
Figure 16D:
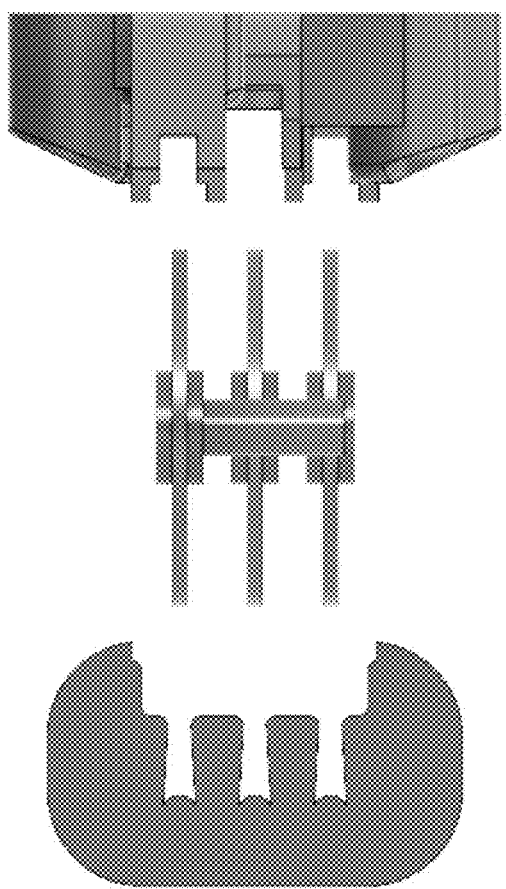

FIG. 16A shows a perspective view of the rotatable conduction/guiding member 1310 of FIGS. 13A-13D assembled with the cable member 102, in accordance with an illustrative embodiment. FIG. 16B shows a front view of the rotatable conduction/guiding member 1310 of FIG. 14A. FIG. 16C shows a side view of the rotatable conduction/guiding member 1310 of FIG. 14A in an unassembled view. FIG. 16D shows a front view of the rotatable conduction/guiding member 1310 of FIG. 14A in an unassembled view.

Figure 17A:
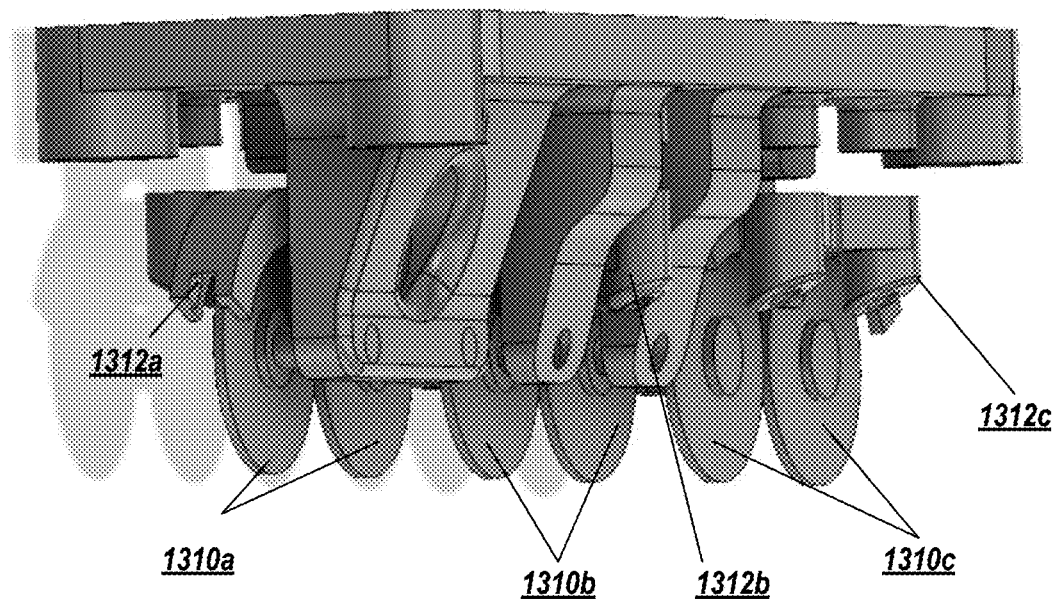
Figure 17B:
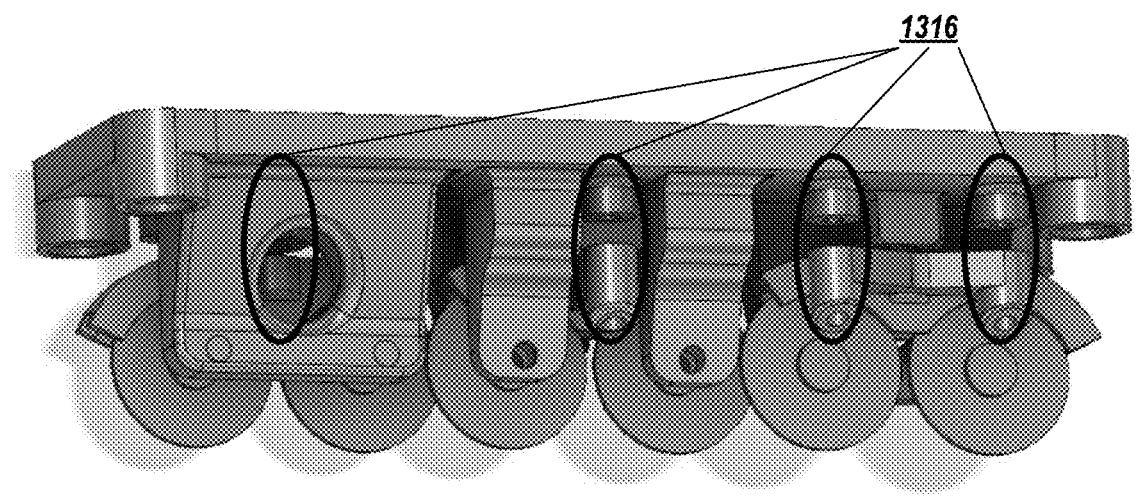

In some embodiments, the multi-body member slidable plug connectors 1302 includes one or more springs (e.g., at locations shown via circles 1316) disposed between one or more of the support members 1312 and the second internal body member 1308. FIGS. 17A and 17B each shows a perspective view of an assembly comprising the rotatable conduction/guiding member 1310, the support member 1312, and the second internal body member 1308. The springs 1316, in some embodiments, serves to push the rotatable conduction/guiding member 1310 against the conductors of the cable member 102 to maintain consistent electrical contact there between.

In some embodiments, the support member 1312 includes a conductor to provide electrical contact between the rotatable conduction/guiding member 1310 and the multi-body member slidable plug connectors 1302, e.g., to receptacles of the standardized electrical receptacles 120. In some embodiments, the multi-body member slidable plug connectors 1302 includes a single rotatable conduction/guiding members 1310 that serves as a mounting point for the other rotatable conduction/guiding members 1310 (not shown).

In some embodiments, the multi-body member slidable plug connectors 1302 includes a single rotatable conduction/guiding member 1310 for each conductor. In other embodiments, the multi-body member slidable plug connectors 1302 includes 3 or 4 rotatable conduction/guiding member 1310 for each conductor. In some embodiments, the multi-body member slidable plug connectors 1302 includes a rotatable set of one or more conduction/guiding members 1310 for each conductor—indeed, for two conductor cable, the multi-body member slidable plug connectors 1302 may include two sets of rotatable conduction/guiding member.

Figure 18A:
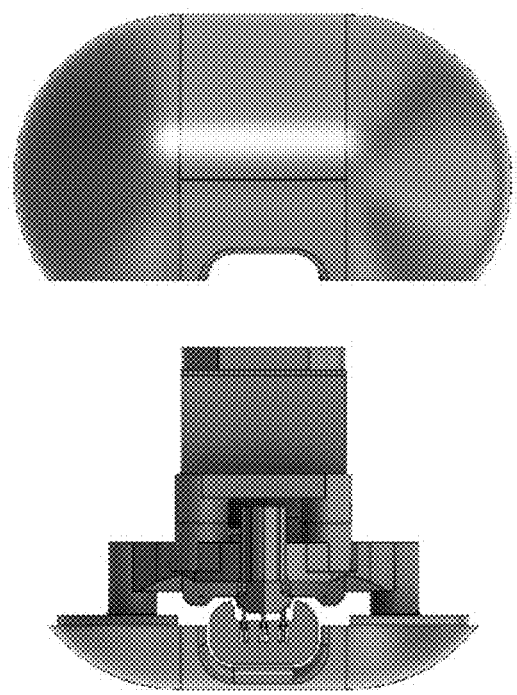
Figure 18B:
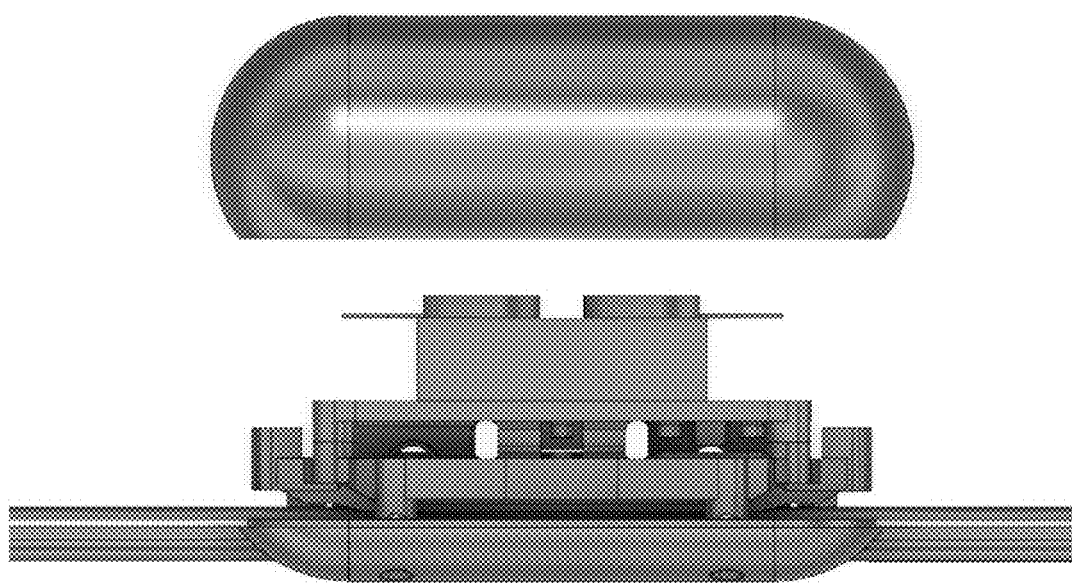

FIGS. 18A and 18B each shows a front and side view, respectively, of the multi-body member slidable plug connectors 1302 with the top portion 118a of an exterior housing removed, in accordance with an illustrative embodiment. The top portion 118a, in some embodiments, includes sealing member to form a seal with the bottom portion 118b when attached to one another (e.g., via fasteners, adhesives, snap-fit configuration, etc.).

Examples of Slidable Plug Cable System with Pierceable Element

As discussed above, in some embodiments, the cable member is configured to be pierced by pierceable elements of a slidable plug connector. To this end, the slidable plug connectors can move, when in an unpierced configuration (or undeployed configuration), to a desired location along the cable member and the piercing element can be deployed at such location to make electrical contact with the conductors in the cable member 102. In some embodiments, the cable member 102 is configured with two or more layers that encapsulates the inner conductors, including an inner layer configured to provide moisture/water protection and an outer layer that provide abrasion protection, e.g., from external abrasion and from the slidable plug connectors.

Figure 19:
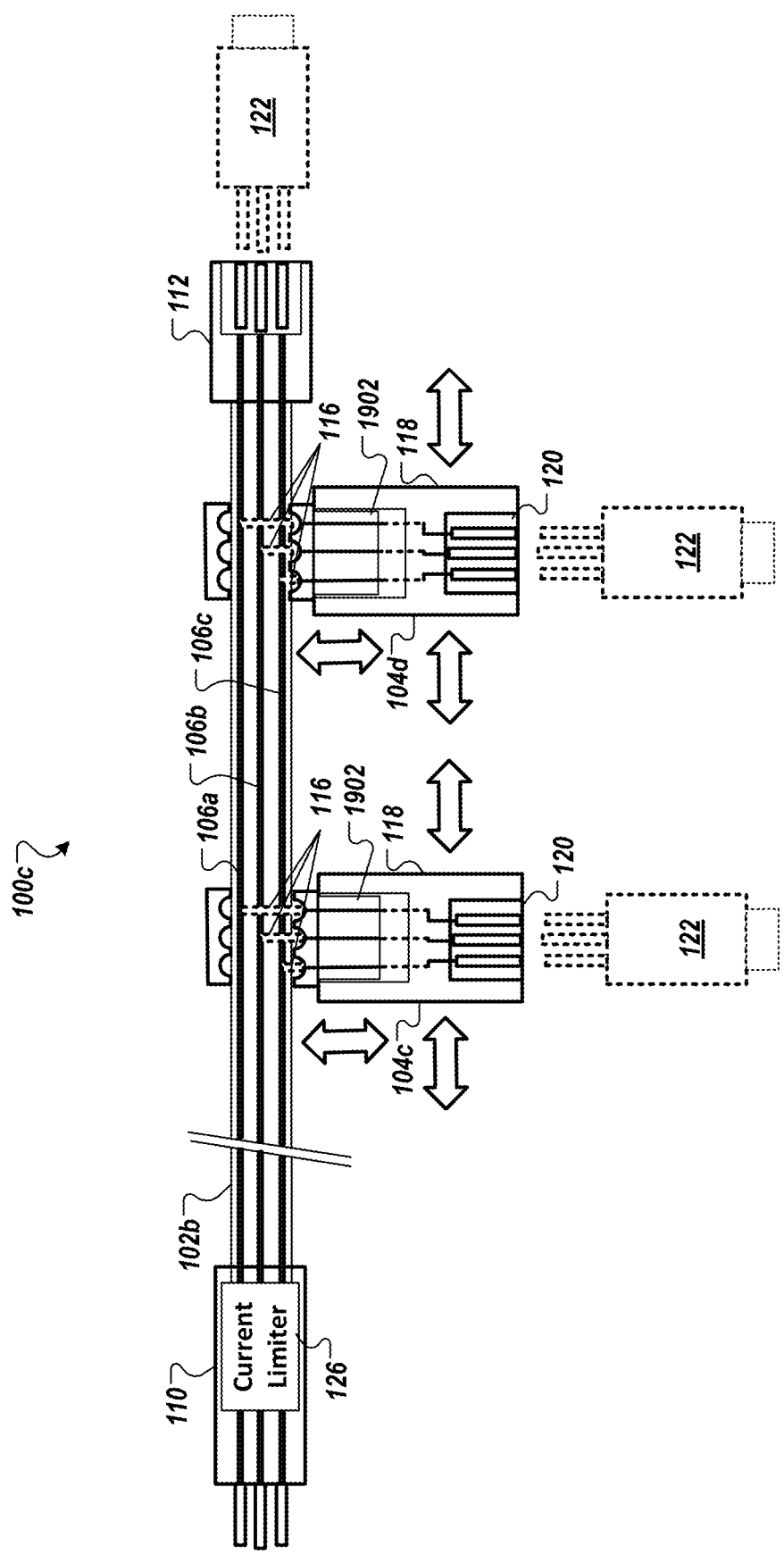
FIG. 19 is a diagram of another slidable-plug extension-cable system in accordance with an illustrative embodiment.

FIG. 19 is a diagram of another slidable-plug extension-cable system 100 (shown as 100c) in accordance with an illustrative embodiment. The extension-cable system 100c includes a cable member 102 (shown as 102b) and one or more slidable-plug portions 104 (shown as 104c and 104d) in which the electrically-conductive coupling elements 116 of the slidable plug 106c are configured a pierceable elements.

As shown in FIG. 19, the electrically-conductive coupling elements 116 are disposed on an inner movable component 1902 that is configured to move between a first position and a second position in the slidable-plug portion (e.g., 104c, 104d).

Figure 20:
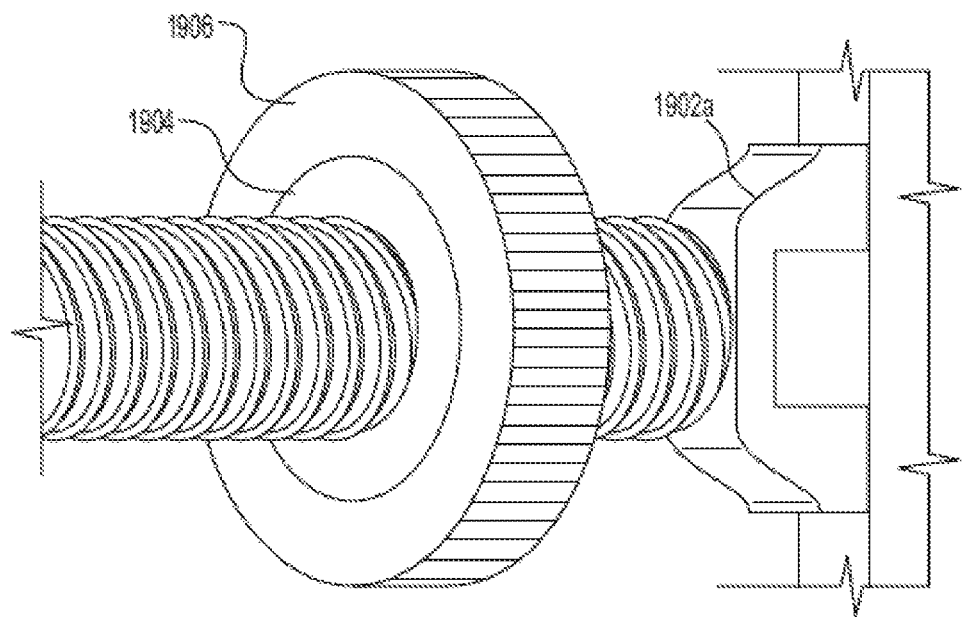
FIG. 20 shows an example inner movable component configured as a linear actuator using worm gears or drive in accordance with an illustrative embodiment.

FIG. 20 shows an example inner movable component 1902 (shown as 1902a) configured as a linear actuator using worm gears or drive in accordance with an illustrative embodiment. The inner movable components 1902 includes threads operates with a corresponding nut 1904 coupled to a wheel 1906. The nut is retained at a pre-defined position in the housing 118 and is allowed to rotate.

Figure 21:
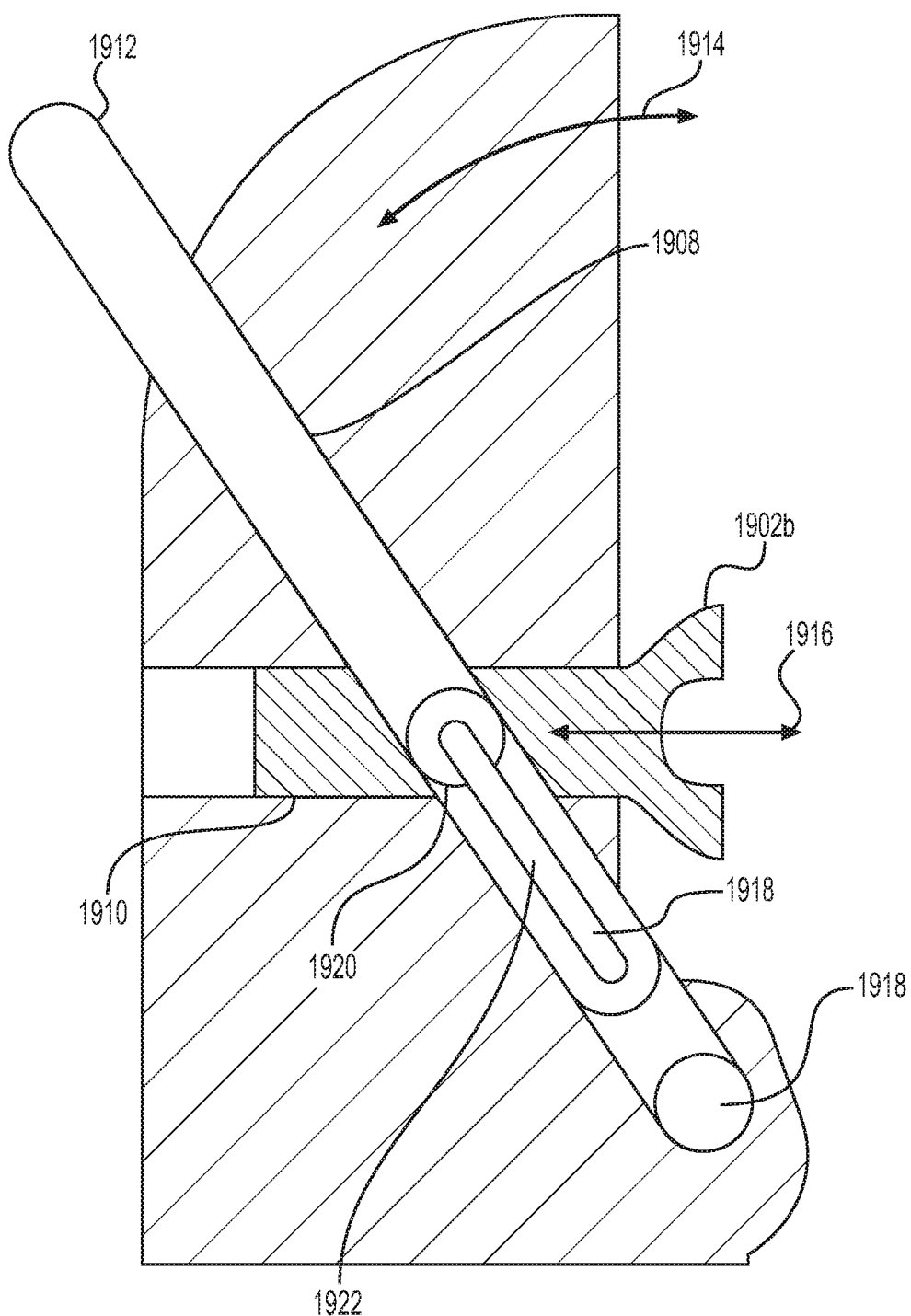
FIG. 21 shows another example inner movable component configured as a linear actuator using a cantilever hinge in accordance with an illustrative embodiment.

FIG. 21 shows another example inner movable component 1902 (shown as 1902b) configured as a linear actuator using a cantilever hinge 1908 in accordance with an illustrative embodiment. The inner movable component 1902b includes track elements to operate along a track 1910 defined by the housing 118. As the handle 1912 of the cantilever hinge 1908 rotates (shown as 1914), the rotation results in a linear displacement (shown as 1916) of the inner movable component 1902b. That is, the cantilever hinge 1908 is allowed to rotate around a fixed axis at first position 1918. The cantilever hinge 1908 is connected to the inner movable component 1902b via a shaft of the component 1902b at a second position 1920. The cantilever hinge 1908 has a slot opening that allows the cantilever hinge 1908 to move with respect to the shaft of the inner movable component 1902b to translate the rotational movement of the hinge about the axis 1918 into a linear displacement for the inner movable component 1902b.

Indeed, the inner movable component 1902b includes one or more electrically-conductive coupling elements 116 (not shown) to move between a first position and a second position in the slidable-plug portion (e.g., 104c, 104d) to make electrical contact with the conductors of the cable member.

Figure 22A:
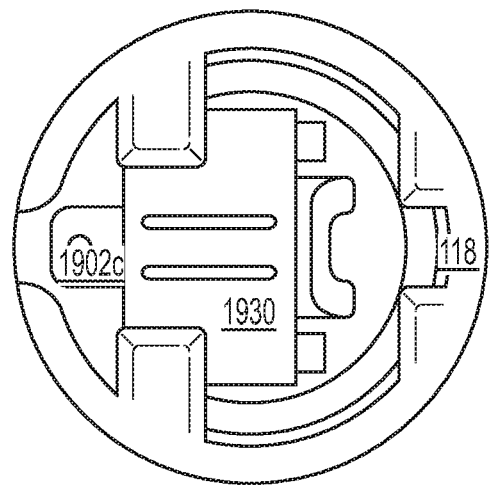
FIGS. 22A, 22B, 22C, 22D, and 22E show different views of another example inner movable component configured as a linear actuator using a rotatable slotted hinge in accordance with an illustrative embodiment.
Figure 22B:
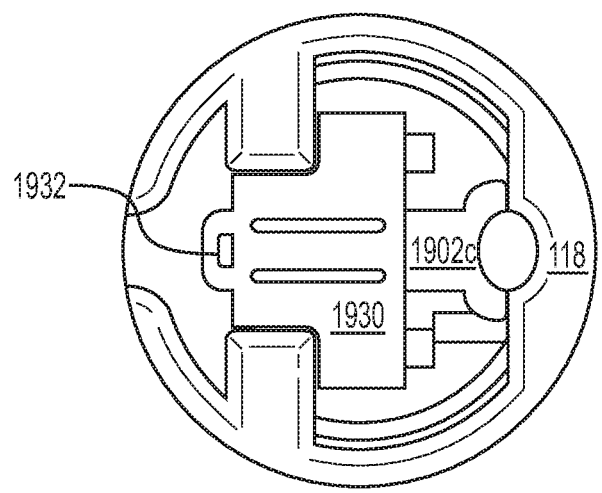
Figure 22C:
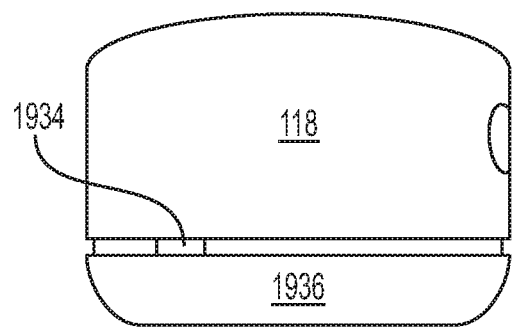
Figure 22D:
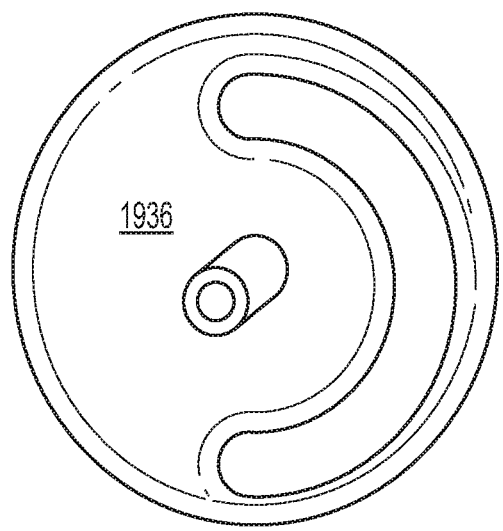
Figure 22E:
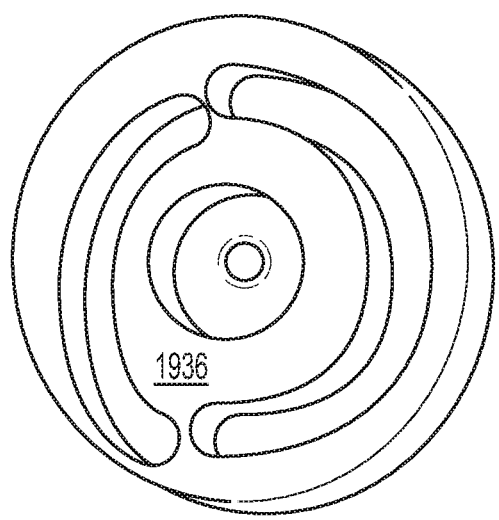

FIGS. 22A, 22B, 22C, 22D, and 22E show different views of another example inner movable component 1902 (shown as 1902c) configured as a linear actuator using a rotatable slotted hinge in accordance with an illustrative embodiment. In FIG. 22A, the movable component 1902c is shown retained by a block 1930 that allows the movable component 1902 (e.g., 1902c) to linearly move between a first position (shown in FIG. 22A) and a second position (shown in FIG. 22B). The movable component 1902 (e.g., 1902c) is shaped as a Y-beam to retain the cable member in conjunction with the housing 118. The movable component 1902c also includes a slot 1932 to which a shaft 1934 (see FIG. 22C) is inserted. In FIG. 22C, the assembly is shown as having a rotatable component 1936 that rotates with respect to the housing 118. As the rotatable component 1936 rotates, the shaft 1934 (also referred to as bolt) that is fixably connected to the rotatable component 1936 is rotationally displaced in the slot 1932 of the Y-beam causing the Y-beam to move along a linear displacement defined by the housing 118. FIG. 22D shows an outside view of the rotatable component 1936. FIG. 22E shows an internal view of the rotatable component 1936. In FIG. 22E, the rotatable component includes a slot for a cable to be placed therethough. The cable connects the pierceable elements of the Y-beam to the electrical receptacles 120 so to establish electrical connection between the electrical receptacles 120 and the conductors of the cord when the movable component 1902 is in a deployed configuration (i.e., inserted configuration).

As discussed above, it is also contemplated that any number of slidable-plug portions 104 (e.g., 104c, 104d) can be attached to the cable member 102 (e.g., 102b), which can be of any standard length (e.g., between 2 feet and 300 feet, or more).

As shown in FIG. 19, the cable member 102 (e.g., 102b) has a flexible elongated structure that has a plurality of electrical conductors 106a-106c that is encapsulated by a non-conductive layer or membrane 108. In some embodiments, the non-conductive layer or membrane 108 comprises two or more layers that encapsulates the inner conductors, including an inner layer (e.g., made of silicone, or the like) configured to provide moisture/water protection and an outer layer that provide abrasion protection, e.g., from external abrasion and from the slidable plug connectors. In some embodiments, the outer layer is a nylon (e.g., nylon fabric). Other plastic material suitable for cable construction (e.g., residential and/or commercial) may be used. In some embodiments, the outer layer may form a braided cable. The outer layer may provide protection of the inner layer and hide and/or assist in the sealing of the inner layer after the inner layer has been pierced. Indeed, the outer layer and inner layer operates in conjunction with one another to provide self-sealing properties and/or capabilities for the non-conductive layer or membrane 108.

The conductors 106 are configured to carry electrical current rated for, for example, but not limited to, residential, commercial, or industrial applications, which can be direct current as well as 1-phase or 3-phase AC current, and etc. The electrical conductors 106 span the length of the cable member 102 (e.g., 102b) and extend between a first connector 110 located at a first end of the cable member 102 (e.g., 102b) and a second connector 112 located at a second end of the cable. As shown in FIG. 1, the first connector 110 is a male connector that is configured to be inserted into any standard electrical plug. The second connector 112 is configured as a corresponding female connector of the male connector 110 that is configured to receive a standard electrical plug. In some embodiments, the second connector 112 includes light fixture and/or USB receptacle (and, in some embodiments, corresponding AC/DC converters for a USB port).

The first connector 110 and the second connector 112 can be a two prong, a three-prong, a four-prong connector or any other standard power plug and socket.

FIG. 19 shows two slidable plug connectors (e.g., 104*c*, 104*d*). The slidable plug connectors 104*c* and 104*d* can be the same, for example, having the same number of sockets and socket types (as shown in FIG. 1). In some embodiments, the slidable plug connectors 104*c* and 104*d* is of the same socket types but have different number of sockets. In some embodiments, the slidable plug connectors 104*c* and 104*d* have different socket types. In some embodiments, the slidable plug connectors 104*c* and 104*d* has a female connector. In some embodiments, the slidable plug connectors 104*c* and 104*d* has a male connector. In some embodiments, the slidable plug connectors include DC power connectors (e.g., one or more USB ports). In some embodiments, the slidable plug connectors include lighting fixture (e.g., standard lighting receptacle).

As shown in FIG. 19, each of the slidable plug connectors 104*c* and 104*d* has a housing 118 and a standard electrical receptacle 120 to receive a standard plug 122 (or has a standard lighting fixture). In some embodiments, the standard electrical receptacle 120 is a two prong, a three-prong, a four-prong connector or any other standard female socket. In other embodiments, the standard electrical receptacle 120 is a two prong, a three-prong, a four-prong connector or any other standard power male plug.

As shown in FIG. 19, the cable member 102*b*, in some embodiments, includes a limit switch 126 that is located within, or near, the first connector 110. The limit switch 126 is coupled to the plurality of electrical conductors 106 and is configured to interrupt electrical conduction when current flow across the plurality of conductors 106 exceeds a pre-defined current limit. In some embodiments, the limit switch 126 is located in the slidable plug connector 104 (not shown).

Example Removable-Reattachable-Plug Extension-Cable System

As noted above, in some embodiments, the exemplified systems and methods provide an extension cord system having an extension cord that is configured to mate with a removeable plugs.

Figure 23:
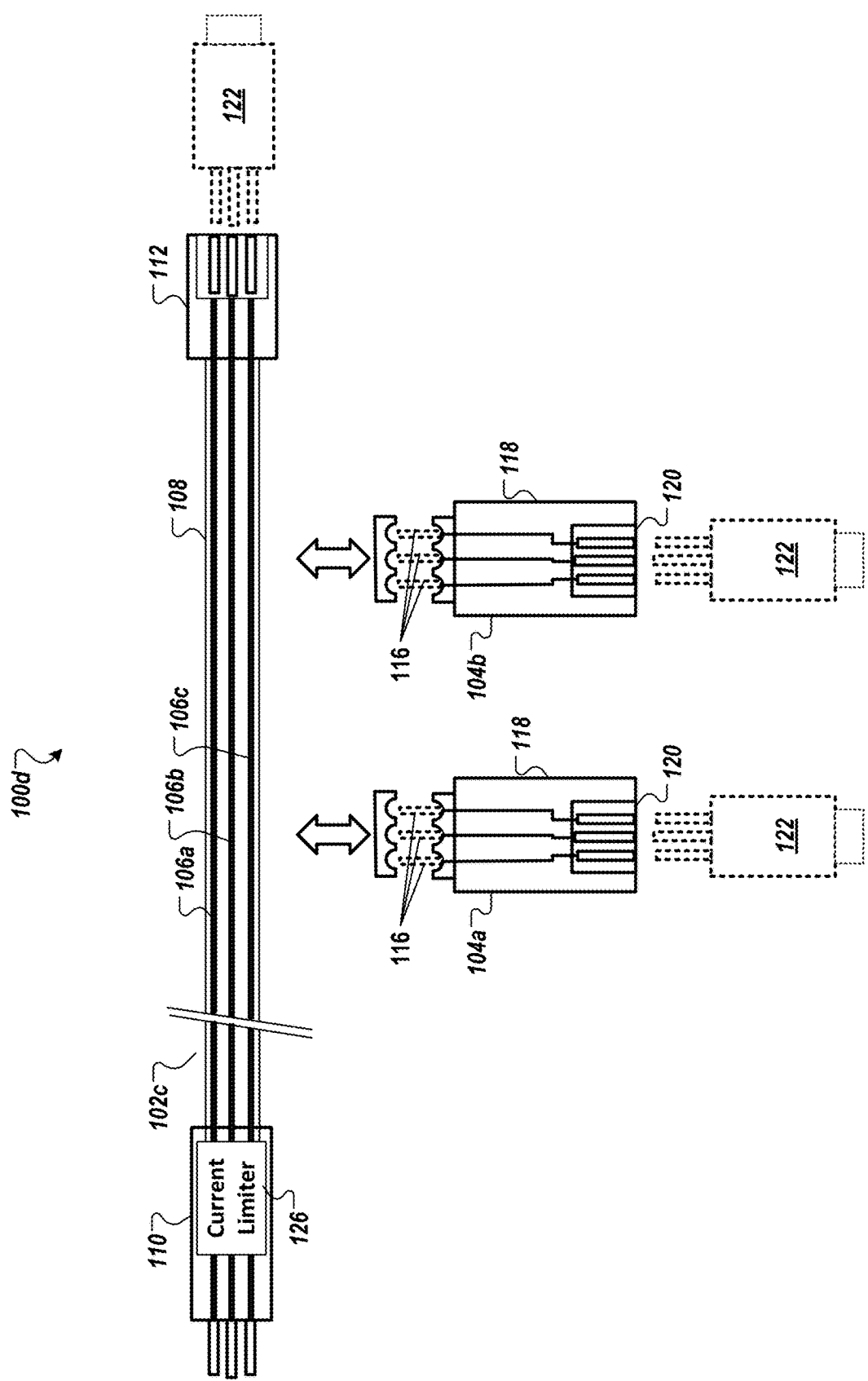
FIG. 23 is a diagram of a removable-reattachable-plug extension-cable system in accordance with an illustrative embodiment.

FIG. 23 is a diagram of a removable-reattachable-plug extension-cable system 100 (shown as 100*d*) in accordance with an illustrative embodiment. The extension-cable system 100*d* includes a cable member 102*c* and one or more removable-reattachable-plug portions 104 (shown as 104*c* and 104*d*). It is contemplated that any number of removable-reattachable-plug portions 104 (e.g., 104*c*, 104*d*) can be attached to the cable member 102 (e.g., 102*c*), which can be of any standard length (e.g., between 2 feet and 300 feet, or more).

The cable member 102*c* has a flexible elongated structure (also referred to as a cable portion) that has a plurality of electrical conductors 106*a*, 106*b*, and 106*c* that is encapsulated by a non-conductive layer or membrane 108. The conductors 106 are configured to carry electrical current rated for, for example, but not limited to, residential, commercial, or industrial applications, which can be direct current as well as 1-phase or 3-phase AC current, and etc. The electrical conductors 106 span the length of the cable member 102 (e.g., 102*c*) and extend between a first connector 110 located at a first end of the cable member 102 (e.g., 102*c*) and a second connector 112 located at a second end of the cable. As shown in FIG. 23, the first connector 110 is a male connector that is configured to be inserted into any standard electrical plug. The second connector 112 is configured as a corresponding female connector of the male connector 110 that is configured to receive a standard electrical plug. The first connector 110 and the second connector 112 can be a two prong, a three-prong, a four-prong connector or any other standard power plug and socket.

Notably, the non-conductive membrane 108 comprises one or more openings 114 (not shown—see FIG. 26) that extend over the entire length, or a portion, of the flexible elongated member. The one or more openings 114 define access points along the flexible elongated structure for ad hoc removable and reattachable coupling of two or more electrically-conductive coupling elements 116 of the one or more removable-reattachable plug connectors 104 (e.g., 104*c*, 104*d*). The cable member 102 (e.g., 102*c*) further includes a plurality of retaining members 124 (not shown—see FIG. 6) located within the flexible elongated member between the one or more openings 114 and an associated electrical conductor (e.g., 106*a*, 106*b*, 106*c*).

FIG. 23 shows two removable-reattachable plug connectors 104 (e.g., 104*c*, 104*d*). The removable-reattachable plug connectors 104*c* and 104*d* can be the same, for example, having the same number of sockets and socket types (as shown in FIG. 23). In some embodiments, the removable-reattachable plug connectors 104*a* and 104*b* is of the same socket types but have different number of sockets. In some embodiments, the removable-reattachable plug connectors 104*c* and 104*d* have different socket types. In some embodiments, the removable-reattachable plug connectors 104*c* and 104*d* has a female connector. In some embodiments, the removable-reattachable plug connectors 104*c* and 104*d* has a male connector.

As shown in FIG. 23, each of the removable-reattachable plug connectors 104*c* and 104*d* has a housing 118 and a standard electrical receptacle 120 to receive a standard plug 122. In some embodiments, the standard electrical receptacle 120 is a two prong, a three-prong, a four-prong connector or any other standard socket. In other embodiments, the standard electrical receptacle 120 is be a two prong, a three-prong, a four-prong connector or any other standard power plug.

As shown in FIG. 23, the cable member 102 (e.g., 102*c*), in some embodiments, includes a limit switch 126 that is located within, or near, the first connector 110. The limit switch 126 is coupled to the plurality of electrical conductors 106 and is configured to interrupt electrical conduction when current flow across the plurality of conductors 106 exceeds a pre-defined current limit.

Figure 24:
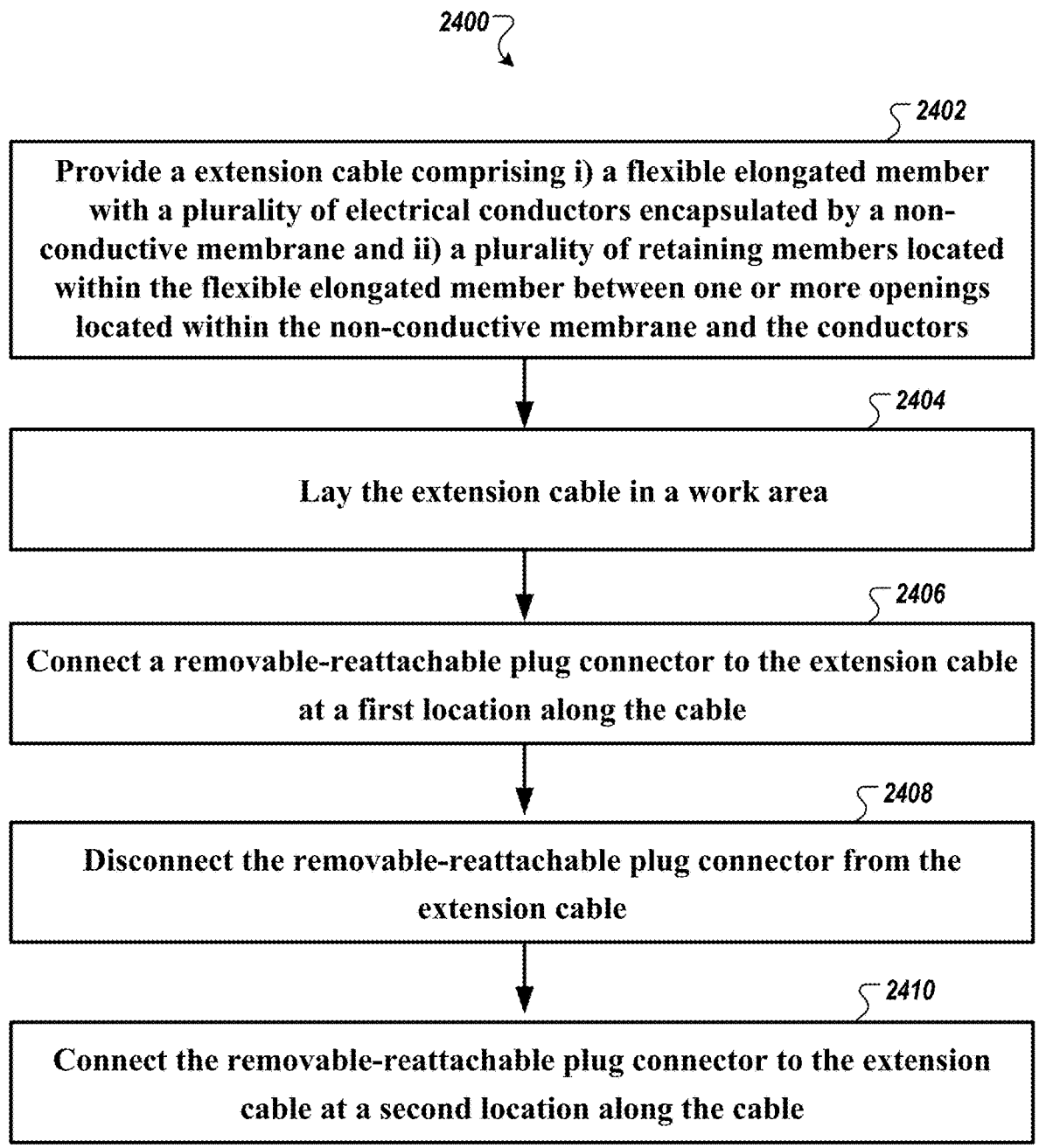
FIG. 24 is a diagram of a method of operating the removable-reattachable-plug extension-cable system in accordance with an illustrative embodiment.

FIG. 24 is a diagram of a method 2400 of operating the removable-reattachable-plug extension-cable system in accordance with an illustrative embodiment. The method 2400 includes providing (step 2402) a cable member 102 (e.g., 102*c*) comprising a flexible elongated member or structure having a plurality of electrical conductors 106 encapsulated by a non-conductive membrane or layer 108. Each of the plurality of electrical conductors 106 extends between a first end 110 and a second end 112 defining the flexible elongated member. The non-conductive membrane or layer 108 comprises one or more openings 114 (e.g., slotted opening) that extends between a third end and a fourth end defined over a portion of the flexible elongated member. In some embodiments, the third end and fourth end coincide with the first end 110 and the second 112. In other embodiments, the third end and fourth end associated with the one or more openings 114 correspond to a portion of the flexible elongated member defined between the first end 110 and the second 112. The one or more openings 114 define access points along the portion of the flexible elongated member for coupling of an electrically-conductive coupling element 116 of a removable-reattachable plug connector (e.g., 104c or 104d) having a housing 118 and a standardized electrical receptacle 120. The cable member 102 (e.g., 102c) further includes a plurality of retaining members 124 located within the flexible elongated member between the one or more openings and an associated electrical conductor of the plurality of electrical conductors. The plurality of retaining members, in some embodiments, is non-conductive and substantially extends (e.g., continuous or non-continuously extend along) between the first connector 110 and the second connector 112 of the flexible elongated member.

The method 2400 further includes laying (step 2404) the cable in a work area (e.g., construction zone, garage, or any place that is in essence not on a manufacturing machine at a manufacturing location of the cable). That is, the cable member 102 (e.g., 102c) can be laid at any location or environment that extension cords are conventionally used and is then used as a substitute for such extension cord. In other embodiments, the cable member 102 (e.g., 102c) can be laid in any locations where wirings are installed and is then used as a substitute for such writing. In some embodiments, the cable member 102 (e.g., 102c) are laid in walls of residential, commercial, and industrial locations and facilitate quick installations of new wall sockets.

The method 2400 further includes connecting (step 2406) the removable-reattachable plug connector (e.g., 104a) to the cable member 102 (e.g., 102c) (e.g., at a first location). The connection, in some embodiments, includes extending two or more electrically-conductive coupling elements (e.g., 116) of the removable-reattachable plug connector (e.g., 104a) across, at least, the non-conductive retaining element 124 of the flexible elongated member to contact and establish electrical contact with corresponding conductors 106 (e.g., located at the first location of the cable) within the cable member 102 (e.g., 102c). In some embodiments, the method 2400 includes disconnecting (step 208) the removable-reattachable plug connector (e.g., 104a) from the cable member 102 (e.g., 102c) (e.g., at the first location). The disconnection, in some embodiments, includes isolating the two or more electrically-conductive coupling elements 116 of the removable-reattachable plug connector (e.g., 104a) from electrical contact and/or physical contact with the corresponding conductors 106 defined within the cable member 102 (e.g., 102c).

The method 2400 includes, in some embodiments, connecting (step 210) the removable-reattachable plug connector (e.g., 104a) to the cable member 102 (e.g., 102c) at a second location of the cable member 102 (e.g., 102c). The connection also includes extending two or more electrically-conductive coupling elements 116 of the second removable-reattachable plug connector (e.g., 104b) across, at least, the non-conductive retaining element 114 at the second location on the flexible elongated member to contact and establish electrical contact with corresponding conductors 106 at that second location located within the cable member 102 (e.g., 102c).

Figure 25:
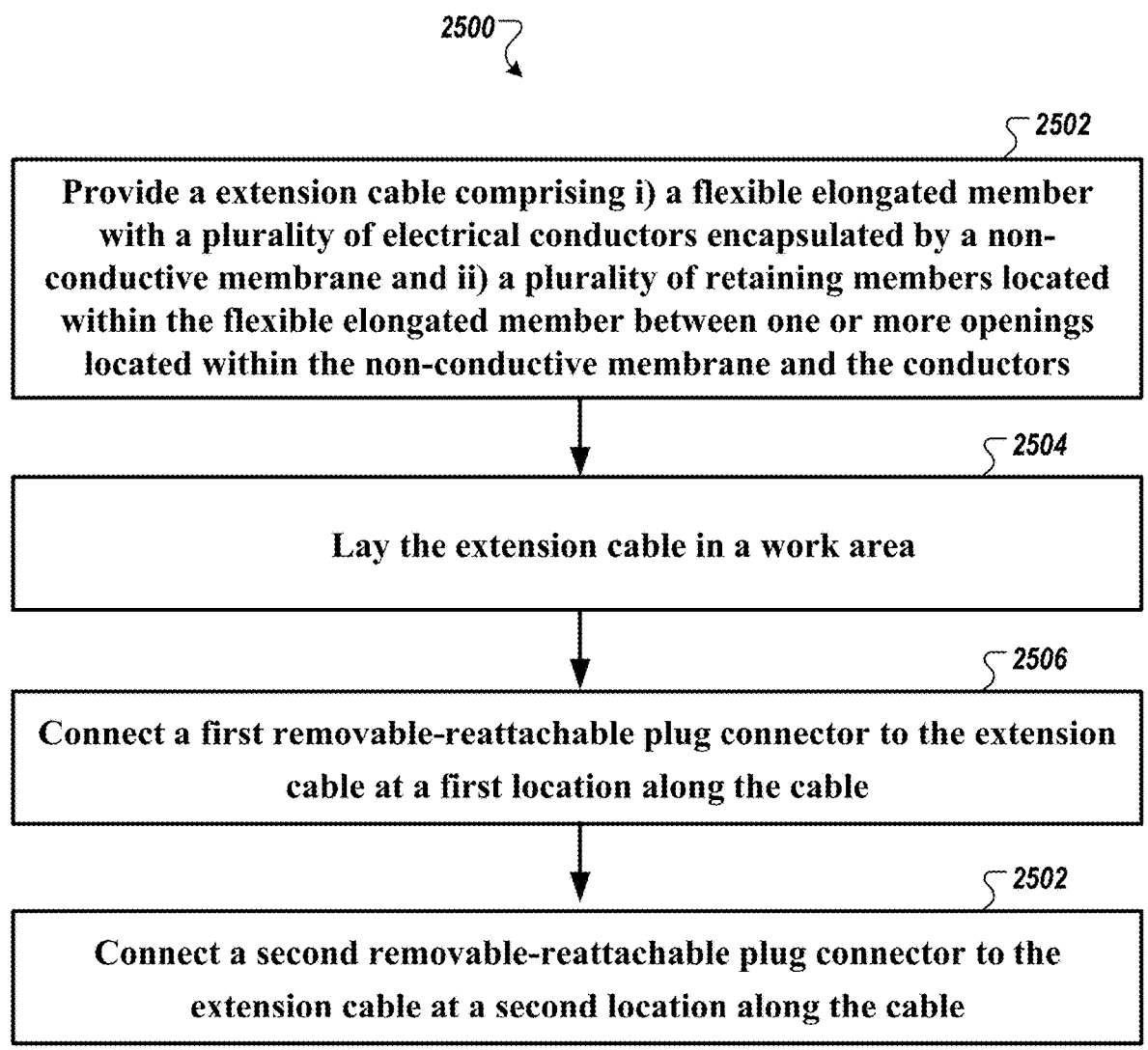
FIG. 25 is a diagram of another method of operating the removable-reattachable-plug extension-cable system in accordance with another illustrative embodiment.

FIG. 25 is a diagram of another method of operating the removable-reattachable-plug extension-cable system in accordance with another illustrative embodiment.

In addition to performing the steps 2502, 2504, 2506 as described in relation to FIG. 24, the method 2500 includes connecting (step 2502) a second removable-reattachable plug connector (e.g., 104d) to the cable member 102 (e.g., 102c) in which the connection also includes extending two or more electrically-conductive coupling elements 116 of the second removable-reattachable plug connector (e.g., 104d) across, at least, the non-conductive retaining element 114 of the flexible elongated member to contact and establish electrical contact with corresponding conductors 106 defined within the cable member 102 (e.g., 102c).

Figure 26:
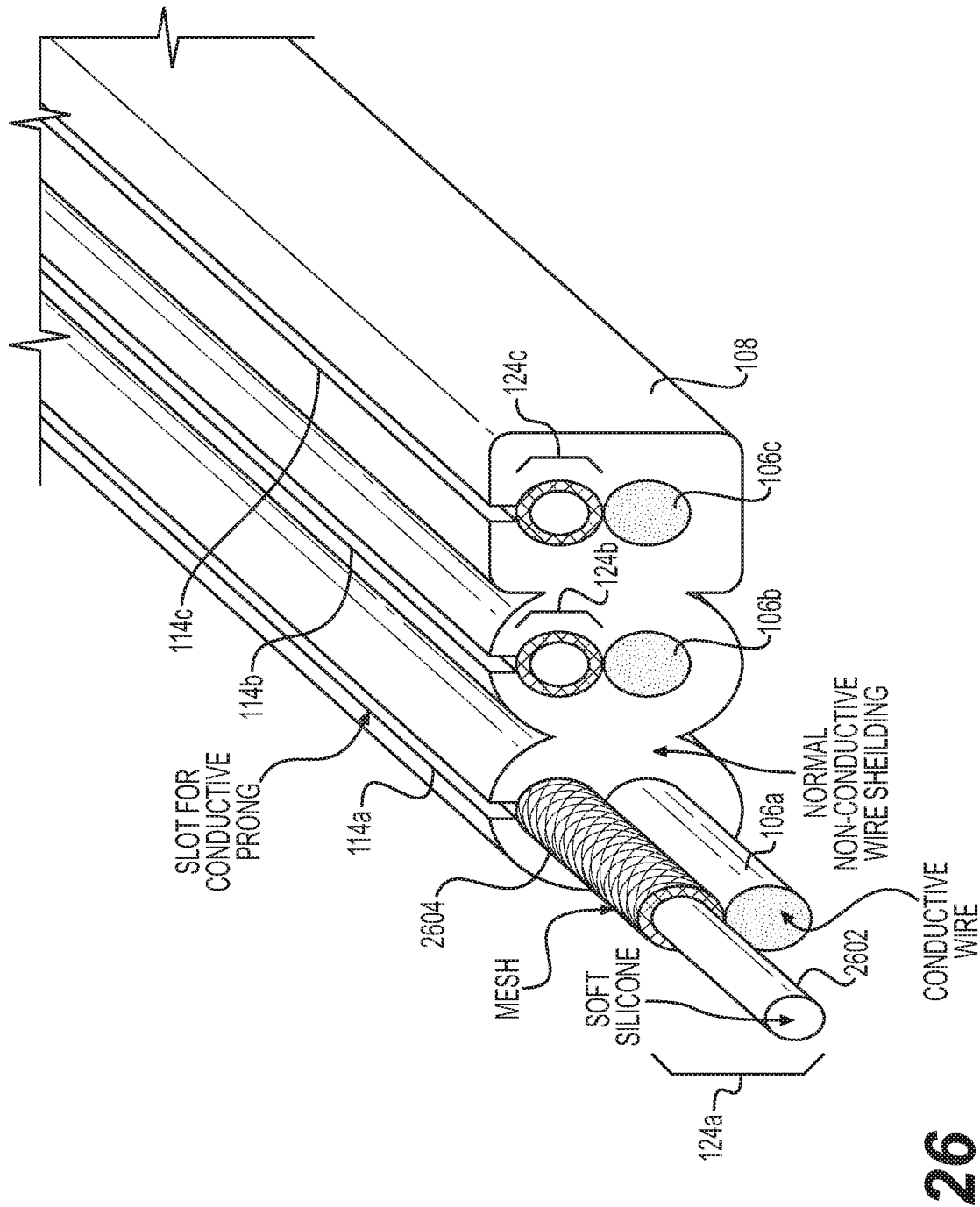
FIG. 26 is a diagram of an example cable member of the removable-reattachable-plug extension-cable system of FIG. 23 in accordance with an illustrative embodiment.

FIG. 26 is a diagram of an example cable member 102 (e.g., 102c) of the removable-reattachable-plug extension-cable system 100d of FIG. 23 in accordance with an illustrative embodiment. As shown in FIG. 26, the cable member 102 (e.g., 102c), in some embodiments, includes a plurality of electrical conductors 106a, 106b, and 106c that is encapsulated by a non-conductive layer or membrane or layer 108. The cable member 102 (e.g., 102c) further includes a plurality of retaining members 124 (shown as 124a, 124b, 124c) located within the flexible elongated member of the cable member 102 (e.g., 102c) between one or more openings defined in the non-conductive layer or membrane 108 and an associated electrical conductor of the plurality of electrical conductors. The retaining members 124 are non-conductive to isolate the electrical conductors 106 from external contact while being suitable for insertion by the electrically-conductive coupling elements 116 of the removable-reattachable plug connectors 104.

As shown in FIG. 26, the retaining members 124, in some embodiments, include a non-conductive flexible inner wire member 2602 that is encapsulated by a non-conductive flexible mesh layer 2604. As used herein, the term "flexible" refers the material and topology of a material that lend itself to being bent or move easily. In some embodiments, the non-conductive inner wire member 2602 is composed of a material such as silicone through which the electrically-conductive coupling elements 116 can readily be pierced, though other types of non-conductive polymers and thermosets may be used.

The non-conductive flexible mesh layer 2604, in some embodiments, is also made a material such as silicone. In some embodiments, the non-conductive flexible inner wire member 2602 can be made of the same material as the non-conductive flexible mesh layer 2604. In other embodiment, the non-conductive flexible inner wire member 2602 is made of a different material than the non-conductive flexible mesh layer 2604. Indeed, the non-conductive flexible mesh layer 2604 has a porous topology that can assist in the centering of the electrically-conductive coupling elements 116 while retaining the non-conductive flexible inner wire member 2602 in its general position and shape in the cable member 102 (e.g., 102c), including when the electrically-conductive coupling elements 116 is inserted into the cable member 102 (e.g., 102c) to establish electrical contact with the electrical conductors 106. In some embodiments, the non-conductive flexible mesh layer 2604 is made of material having a higher strength than the flexible inner wire member 2602 (as the mesh material does not have to be physically pierce for the electrical conductors 106 to move therethrough).

As shown in FIG. 26, the opening 114 and retaining members 124 substantially extends (e.g., continuous or non-continuously extend along) between the entire length of the first end and the second end of the flexible elongated member or a portion thereof. In some embodiments, the retaining members substantially extends a length selected from the group consisting of about 5 percent of the flexible elongated member, about 10 percent of the flexible elongated member, about 20 percent of the flexible elongated member, about 30 percent of the flexible elongated member, about 40 percent of the flexible elongated member, about 50 percent of the flexible elongated member, about 60 percent of the flexible elongated member, about 70 percent of the flexible elongated member, about 80 percent of the flexible elongated member, about 90 percent of the flexible elongated member, and more than 95 percent of the flexible elongated member.

The electrical conductors 106 can be made of multiple strands of smaller diameter conductors that in their aggregate can carry current rating of 10 Amps and 15 Amps for (e.g., 16- to 10-gauge conductor wires). The multiple strands may facilitate solid physical contact between the electrical conductors 106 and the electrically-conductive coupling elements 116 in allowing the electrically-conductive coupling elements 116 to contact a portion of the inner conductors within the multiple strands of conductors. In some embodiments, the electrical conductors 106 is made of a single or dual strand of wire that is configured to carry current rating of 10 Amps and 15 Amps for (e.g., 16- to 10-gauge conductor wires). In some embodiments, the dual strand of each conductor is configured to allow the electrically-conductive coupling elements 116 to be inserted therebetween. In some embodiments, the electrical conductors 106 form a substantially uniform cross-sectional profile that axially extend over the portion of the flexible elongated member of the cable member 102 (e.g., 102c).

Figure 27A:
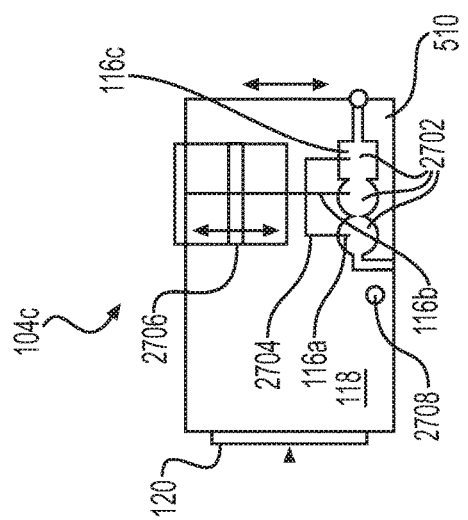
FIGS. 27A and 27B respectively show a side view and a perspective view of an example removable-reattachable-plug portion of the removable-reattachable-plug extension-cable system of FIG. 23 when in a closed position in accordance with an illustrative embodiment.
Figure 27B:
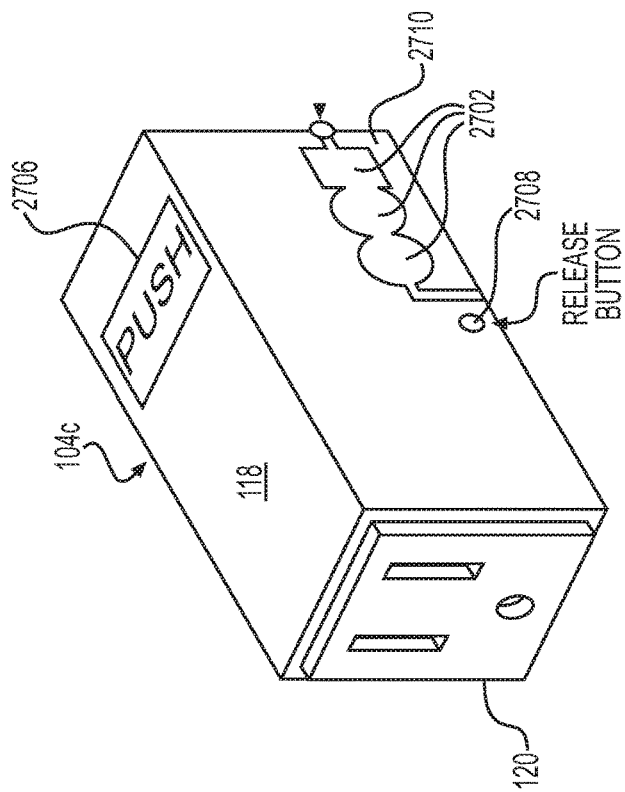

FIGS. 27A and 27B respectively show a side view and a perspective view of an example removable-reattachable-plug portion 104 (shown as 104c) of the removable-reattachable-plug extension-cable system 100 of FIG. 23 when in a closed position in accordance with an illustrative embodiment. The removable-reattachable-plug portion 104 (e.g., 104c, 104d) includes a housing 118 that defines one or more standardized electrical receptacles 120. As shown in FIG. 27A, the removable-reattachable-plug portion 104 (e.g., 104c, 104d) includes two or more electrically-conductive coupling elements 116 (shown as 116a, 116b, and 116c) that are configured to extend and to retract from a recess portion 502 of the housing such that the two or more electrically-conductive coupling elements extend across, at least, the non-conductive retaining element 124 of a flexible elongated member of the cable member 102 (e.g., 102c) and contact and establish electrical contact with a corresponding conductor (e.g., 106a, 106b, 106c) located within the cable member 102 (e.g., 102c).

The recess portion 2702, in some embodiments, has a cross-sectional profile corresponding to the shape of the flexible elongated member including a first externally protruding surface and a second externally protruding surface that defines a notch therebetween. The first and second protruding surfaces and notch facilitate an align-able coupling between the removable-reattachable plug connector 104 to the flexible elongated member of the cable member 102 (e.g., 102c).

The removable-reattachable-plug portion 104 (e.g., 104c, 104d), in some embodiments, includes an actuation element 2704 configured to move between a first position and a second position (e.g., by linear displacement, rotational screwing displacement, a rotational displacement around one or more hinge-able members). As shown in FIGS. 27A and 27B, the actuation element 2704 operates with a linear guide formed in the housing 118 and is coupled to a button 2706 configured to receive a thumb that can linearly displace the electrically-conductive coupling elements 116 from a retracted position to an extended position. The actuation element 2704 may include latching mechanisms to retain the actuation element 2704 in the extended position and thereby maintain the electrically-conductive coupling elements in the extended position.

In some embodiments, the removable-reattachable-plug portion 104 (e.g., 104c, 104d) includes a motor (not shown) that is mechanically linked to the actuator element 2704. The motor, in some embodiments, is configured when energized to move the actuator element 104 between retracted position to an extended position. In addition to linear displacement, other mechanisms to cause movement of the actuation element 2704 between the retracted position to the extended position, including, for example, but not limited to, rotational screwing displacement, rotational displacement around one or more hinge-able members, and etc.

As shown in FIGS. 27A and 27B, the removable-reattachable-plug portion 104 (e.g., 104c, 104d), in some embodiments, includes a releasing element 2708 configured to release the two or more electrically-conductive coupling elements from the extended position and to retract the two or more electrically-conductive elements from the extended position to the retracted position (e.g., wherein the retraction of the two or more electrically conductive elements causes the actuation element to move from the second position to the first position). The releasing element 2708 may include a spring configured to assist in the retraction of the electrically-conductive coupling elements 116 from the cable member 102 (e.g., 102c) when the electrically-conductive coupling elements 116 is moved from the extended position to the retracted position.

As shown in FIGS. 27A and 27B, the removable-reattachable-plug portion 104, in some embodiments, includes a cable retaining member 2710 (e.g., hinge-able door or a sliding door) that is movably fixed to the housing. The cable retaining member 2710, in some embodiments, is configured to move between a cable retaining position (e.g., in a closed position as shown in FIGS. 27A and 27B) and a cable inserting position (e.g., in an open position as shown in FIG. 6B). Referring still to FIGS. 27A and 27B, in the cable retaining position, the cable retaining member 2710 is configured to contact a surface of the flexible elongated member of the cable member 102 (e.g., 102c). The cable retaining member 2710, in some embodiments, includes corresponding curved surfaces to that of the recess portion 2702 to fixably retain the flexible elongated member of the cable member 102 (e.g., 102c) against the recess portion 2702 of the housing 118.

FIGS. 28A and 28B respectively show a perspective view and a side view of an example removable-reattachable-plug portion when in an open attaching position in accordance with an illustrative embodiment. Further, FIGS. 28A and 28B show the removable-reattachable-plug portion 104 (e.g., 104c, 104d) having a fixed electrically-conductive coupling elements 116 that extends from the recess portion 2702.

Figure 29:
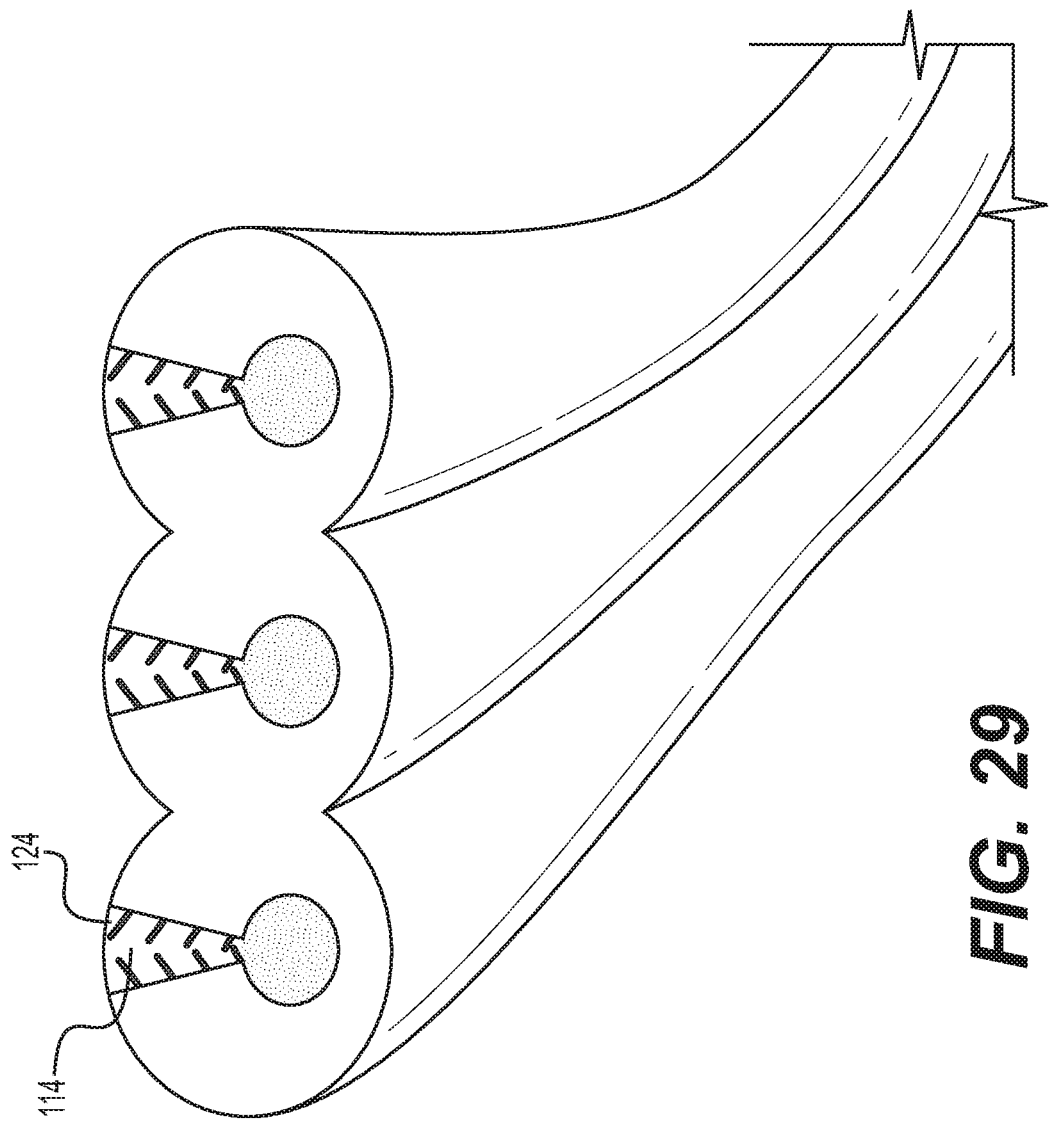
FIG. 29 is a diagram of another example cable member of the removable-reattachable-plug extension-cable system of FIG. 23 in accordance with another illustrative embodiment.

FIG. 29 is a diagram of another example cable member 102 (e.g., 102c) of the removable-reattachable-plug extension-cable system 100 of FIG. 23 in accordance with another illustrative embodiment. In FIG. 29, the plurality of retaining members 124 are flaps that are located in openings 114 of the cable member 102 (e.g., 102c). Similar to the embodiments of FIG. 6, the retaining members 124 are non-conductive to isolate the electrical conductors 106 from external contact while being suitable for insertion by the electrically-conductive coupling elements 116 of the removable-reattachable plug connectors 104 (e.g., 104c, 104d). The openings 114 can substantially extend along the entire length of the first end and the second end of the flexible elongated member or a portion thereof.

Other configuration of the plug connectors can be used without departing from the spirit of the disclosure.

Example of Use of Exemplary Extension-Cable System

In some embodiments, the movable-plug extension-cable system (e.g., 100, 100a, 100b, 100c, 100d) is configured for use on a commercial or residential construction or renovation job site/work site. In such use, the slidable-plug extension-cable system can be laid out across, or throughout, the site to provide access to electrical power via the slidable-plug portions 104. The slidable-plug portions 104 can be positioned at a given location on the cable that is associated with a location at the site e.g., during a given phase of the project. Subsequently, the slidable-plug portions 104 can be positioned by the user to another location on the cable that is associated with another location at the site, e.g., during anther phase of the project. Indeed, the slidable-plug extension-cable system facilitates reuse of the same equipment (here, the cable member) without need to lay out additional power cord. Particularly, where the site has multiple floors, this application would be very cost-effective.

In some embodiments, the movable-plug extension-cable system (e.g., 100, 100a, 100b, 100c, 100d) (e.g., slidable-plug extension-cable system, removable reattachable extension-cable system) is configured to use in providing electrical access in rooms and desks. For example, the slidable-plug extension-cable system (e.g., 100, 100a, 100b, 100c, 100d) can be used in classroom where there are rows or circles of desks and be slidable-plug portions 104 (e.g., 104a, 104b, 104c, 104d) can be moved along with changes to the classroom or desk configuration.

The movable extension-cable system (e.g., 100, 100a, 100b, 100c, 100d) (e.g., slidable-plug extension-cable system, removable reattachable extension-cable system) is configured, in some embodiments, for use in home areas to allow electrical access to be moved, e.g., along with furniture. This can be particularly useful for home lighting and decorative lighting (internal and external to the dwelling structure).

The movable extension-cable system (e.g., 100, 100a, 100b, 100c, 100d) (e.g., slidable-plug extension-cable system, removable reattachable extension-cable system) is configured, in some embodiments, for use in office work space areas to allow electrical access to be moved, e.g., along with connected computers, printers, paper shredders, and other electrically powered office equipment.

The movable extension-cable system (e.g., 100, 100a, 100b, 100c, 100d) (e.g., slidable-plug extension-cable system, removable reattachable extension-cable system) is configured, in some embodiments, for use in a manufacturing work space to allow electrical access to be moved, e.g., along with manufacturing equipment (e.g., sewing machine). In such embodiments, the extension-cable system (e.g., 100, 100a, 100b, 100c, 100d) (e.g., slidable-plug extension-cable system, removable reattachable extension-cable system) may include multiple slidable-plug portions 104 (e.g., 10+) where each multiple slidable-plug portion 104 is deployed at a given manufacturing station.

The movable extension-cable system (e.g., 100, 100a, 100b, 100c, 100d) (e.g., slidable-plug extension-cable system, removable reattachable extension-cable system) is configured, in some embodiments, for use with exterior lighting to allow electrical access to be moved, e.g., along with lighting. This would reduce the number of conventional cords that may be needed to lay out across a given building or dwelling structure.

The movable extension-cable system (e.g., 100, 100a, 100b, 100c, 100d) (e.g., slidable-plug extension-cable system, removable reattachable extension-cable system) is configured, in some embodiments, for use with seasonal decoration and lighting (e.g., Christmas decorations and lighting).

The movable extension-cable system (e.g., 100, 100a, 100b, 100c, 100d) (e.g., slidable-plug extension-cable system, removable reattachable extension-cable system) is configured, in some embodiments, for use at an event or gathering of people (e.g., weddings, parties, etc.), e.g., to consolidate cabling needed for electrical access.

The movable extension-cable system (e.g., 100, 100a, 100b, 100c, 100d) (e.g., slidable-plug extension-cable system, removable reattachable extension-cable system) is configured, in some embodiments, for use at fair grounds, e.g., to consolidate cabling needed for electrical access to music system, popcorn machine, electrically powered keg, etc.

The movable extension-cable system (e.g., 100, 100a, 100b, 100c, 100d) (e.g., slidable-plug extension-cable system, removable reattachable extension-cable system) is configured, in some embodiments, for use at a convention center or exhibition hall. In some embodiments, the cable member (e.g., 102a, 102b, 102c) may be permanently or fixably laid out and attached to floors, walls, or ceilings in convention center, e.g., to consolidate cabling needed for electrical access in the center. In some embodiments, the cable member (e.g., 102) may be used to provide electrical access at tables, booths, and displays at a convention center or exhibition hall.

The movable extension-cable system (e.g., 100, 100a, 100b, 100c, 100d) (e.g., slidable-plug extension-cable system, removable reattachable extension-cable system) is configured, in some embodiments, for use in recreational vehicle or mobile home, e.g., to consolidate cabling needed for electrical access at a camp site or home site.

The movable extension-cable system (e.g., 100, 100a, 100b, 100c, 100d) (e.g., slidable-plug extension-cable system, removable reattachable extension-cable system) is configured, in some embodiments, for use in a commercial kitchen, e.g., to consolidate cabling needed for electrical access in the kitchen space.

The movable extension-cable system (e.g., 100, 100a, 100b, 100c, 100d) (e.g., slidable-plug extension-cable system, removable reattachable extension-cable system) is configured, in some embodiments, to provide USB or smartphone/portable device charging access.

The movable extension-cable system (e.g., 100, 100a, 100b, 100c, 100d) (e.g., slidable-plug extension-cable system, removable reattachable extension-cable system) is configured, in some embodiments, as a lighting source.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

What is claimed is:

1. A system comprising:
a flexible elongated member comprising a plurality of electrical conductors surrounded by a non-conductive encapsulation, wherein each of the plurality of electrical conductors extends between a first end and a second end defining the flexible elongated member, wherein at least one of the first end or the second end terminates with a standardized electrical plug; and
a receptacle plug carrier having a housing and a standardized electrical receptacle configured to receive an electrical plug, the housing having a longitudinal axis that extends over a portion of the flexible elongated member, the receptacle plug carrier being configured to slidably move between a third end and a fourth end of the of the flexible elongated member
wherein the non-conductive encapsulation comprises a set of fastening members configured as a strip that extends between the third end and the fourth end over a portion of the flexible elongated member, wherein each fastening member of the set of fastening members is transitionable from a fastened state to an unfastened state and from the unfastened state to the fastened state, and wherein the receptacle plug carrier comprises a first fastening element and a second fastening element disposed in the housing, wherein each of the first fastening element and the second fastening element is coupled to a portion of the set of fastening members at a first position and a second position having a length there between, wherein the length between the first position and second position defines a region in the flexible elongated member at which conductors of the flexible elongated member are accessible to conductors of the standardized electrical receptacle.

2. The system of claim 1, wherein the first fastening element is configured, when traveling in a first direction, to unfasten a fastening member of the set of fastening member located at the first position, and to fasten the fastening member of the first position when traveling in a second direction.

3. The system of claim 2, wherein the second fastening element is configured, when traveling in the first direction, to fasten a fastening member of the set of fastening member located at the second position, and to unfasten the fastening member of the second position when traveling in the second direction.

4. The system of claim 1, wherein the housing of the receptacle plug carrier comprises a region having indentations or protrusions configured to be grasp by a hand.

5. The system of claim 1, wherein the receptacle plug carrier is fixed to the flexible elongated member so as to move only between the third end and the fourth end, and wherein the receptacle plug carrier is not removable from the flexible elongated member.

6. The system of claim 1, wherein the set of fastening members, collectively, form a zipper strip.

7. The system of claim 1, wherein the set of fastening members, collectively, form a strip of hook and loops.

8. The system of claim 1, wherein the flexible elongated member comprises a second set of fastening members configured as a second strip that extends between a fifth end and a sixth end over another portion of the flexible elongated member, wherein each fastening member of the second set of fastening members is transitionable from a fastened state to an unfastened state and from the unfastened state to the fastened state,
the system further comprising:
a second receptacle plug carrier having a housing and a standardized electrical receptacle configured to receive an electrical plug, the housing having a longitudinal axis that extends over a portion of the flexible elongated member, the second receptacle plug carrier being configured to slidably move between the fifth end and the sixth end of the of the flexible elongated member.

9. The system of claim 1, wherein the receptacle plug carrier comprises a pierceable element configured to be inserted through the non-conductive encapsulation to make electrical contact with the plurality of electrical conductors.

10. The system of claim 9, wherein the pierceable element of the receptacle plug carrier is coupled to a linear actuator located in the receptacle plug carrier.

11. The system of claim 10, wherein the linear actuator is actuated by linear displacement.

12. The system of claim 10, wherein the linear actuator is actuated by a rotational screwing displacement.

13. The system of claim 10, wherein the linear actuator is actuated a rotational displacement around one or more hinge-able member.

14. The system of claim 9, wherein the non-conductive encapsulation comprises a first layer formed of a waterproof material.

15. The system of claim 14, wherein the non-conductive encapsulation comprises a second layer having intertwining to form a braided cable.

16. The system of claim 1, further comprising:
a second receptacle plug carrier having a housing and a standardized electrical receptacle configured to receive an electrical plug, the housing having a longitudinal axis that extends over a portion of the flexible elongated member, the second receptacle plug carrier being configured to slidably move between the third end and the fourth end of the of the flexible elongated member.

17. The system of claim 1 further comprising:
a limit switch located within, or near, the first connector, wherein the limit switch is coupled to the plurality of electrical conductors and is configured to interrupt electrical conduction when current flow across one or more electrical conductor of the plurality of conductors exceeds a pre-defined current limit.

18. A system comprising:
a cable member; and
one or more movable-plug connectors including a first movable-plug connector that slidably couples to the cable member, wherein the first movable-plug connector comprises:
a housing;
one or more standardized electrical receptacles defined by the housing; and
the two or more electrically-conductive coupling elements configured to extend and to retract from a recess portion of the housing, wherein each of the two or more electrically-conductive coupling elements configured to extend from the recess portion of the housing across, at least, a non-conductive retaining element of a flexible elongated member defining an extension cable, to contact and establish electrical contact with a corresponding conductor defined within the extension cable.

19. The system of claim 18, wherein the one or more movable-plug connectors includes a second movable-plug connector, wherein the second movable-plug connector comprises:
- a housing;
- one or more standardized electrical receptacles defined by the housing; and
- two or more electrically-conductive coupling elements configured to extend and to retract from a recess portion of the housing, wherein each of the two or more electrically-conductive coupling elements to configured to extend from the recess portion of the housing across, at least, a non-conductive retaining element of the flexible elongated member defining the extension cable, to contact and establish electrical contact with a corresponding conductor defined within the extension cable.

\* \* \* \* \*